United States Patent
Nishida et al.

(10) Patent No.: US 6,924,863 B2
(45) Date of Patent: Aug. 2, 2005

(54) IN-PLANE SWITCHING MODE ACTIVE MATRIX TYPE LIQUID CRYSTAL DISPLAY DEVICE AND METHOD OF FABRICATING THE SAME

(75) Inventors: Shinichi Nishida, Tokyo (JP); Kimikazu Matsumoto, Tokyo (JP); Takahisa Hannuki, Tokyo (JP); Kunimasa Itakura, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 62 days.

(21) Appl. No.: 10/081,800

(22) Filed: Feb. 22, 2002

(65) Prior Publication Data

US 2002/0159016 A1 Oct. 31, 2002

(30) Foreign Application Priority Data

Feb. 23, 2001 (JP) ........................................ 2001-048473
Nov. 15, 2001 (JP) ........................................ 2001-350620

(51) Int. Cl.[7] .......................................... G02F 1/1343
(52) U.S. Cl. ..................................................... 349/141
(58) Field of Search ........................................... 349/141

(56) References Cited

U.S. PATENT DOCUMENTS

| | | | | |
|---|---|---|---|---|
| 6,219,019 B1 | * | 4/2001 | Hasegawa et al. ............. | 345/96 |
| 6,356,331 B1 | * | 3/2002 | Ono et al. ................... | 349/141 |
| 2002/0057411 A1 | * | 5/2002 | Kim et al. ................... | 349/141 |

FOREIGN PATENT DOCUMENTS

| | | | | |
|---|---|---|---|---|
| JP | 6-202127 | 7/1994 | ......... | G02F/1/1343 |
| JP | 7-36058 | 2/1995 | ........... | G02F/1/136 |
| JP | 9-236820 | 9/1997 | ........... | G02F/1/136 |
| JP | 10-26767 | 1/1998 | ......... | G02F/1/1343 |
| JP | 10-186407 | 7/1998 | ........... | G02F/1/136 |
| JP | 10-307295 | 11/1998 | ......... | G02F/1/1343 |
| JP | 11-119237 | 4/1999 | ......... | G02F/1/1343 |
| JP | 2000-326814 | 10/2000 | ......... | G02F/1/1335 |
| KR | 1998-033299 | 7/1998 | ......... | G02F/1/1343 |
| KR | 2001-0006187 | 1/2001 | ........... | G02F/1/136 |

* cited by examiner

*Primary Examiner*—Tarifur R. Chowdhury
*Assistant Examiner*—Jeanne Andrea Di Grazio
(74) *Attorney, Agent, or Firm*—Hayes & Soloway P.C.

(57) ABSTRACT

An in-plane switching mode active matrix type liquid crystal display device includes a first substrate, a second substrate located opposing the first substrate, and a liquid crystal layer sandwiched between the first and second substrates. The first substrate includes a thin film transistor, a pixel electrode each associated to a pixel to be driven, a common electrode to which a reference voltage is applied, data lines, a scanning line, and common electrode lines. Molecular axes of liquid crystal are rotated in a plane parallel with the first substrate by an electric field substantially parallel with a plane of the first substrate to thereby display certain images. The common electrode is composed of transparent material, and are formed on a layer located closer to the liquid crystal layer than the data lines. The common electrode entirely overlaps the data lines except an area where the data lines are located in the vicinity of the scanning line. The liquid crystal display device further includes a light-impermeable layer in an area where the common electrode entirely overlaps the data lines. The light-impermeable layer is comprised of a black matrix layer having a width smaller than a width of the common electrode.

28 Claims, 77 Drawing Sheets

LIGHT PATH

OPENING OP (A) LAYERS OTHER THAN ITO LAYER (B) ITO LAYER

L(COM) > L(D)

LAYERS OTHER
THAN ITO LAYER

ITO LAYER

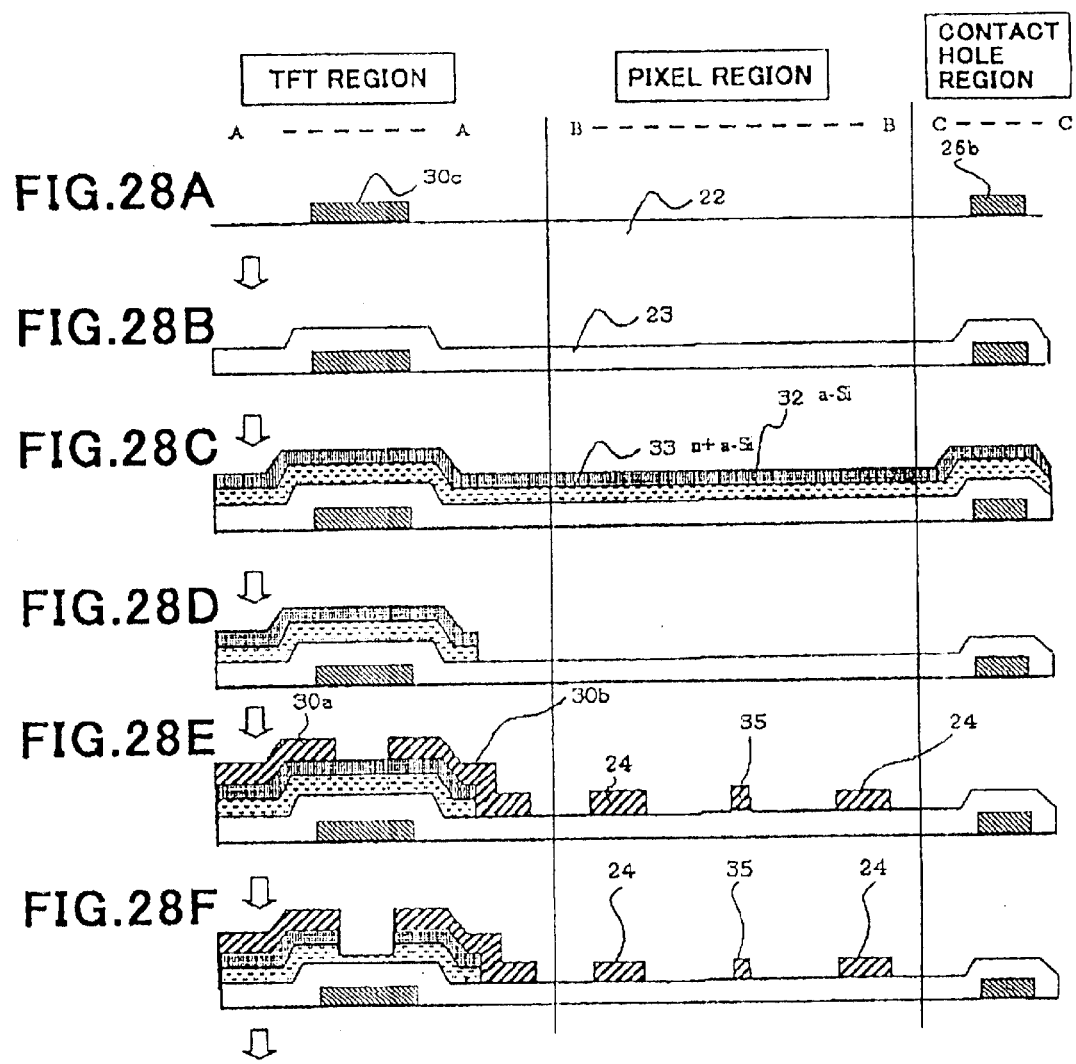

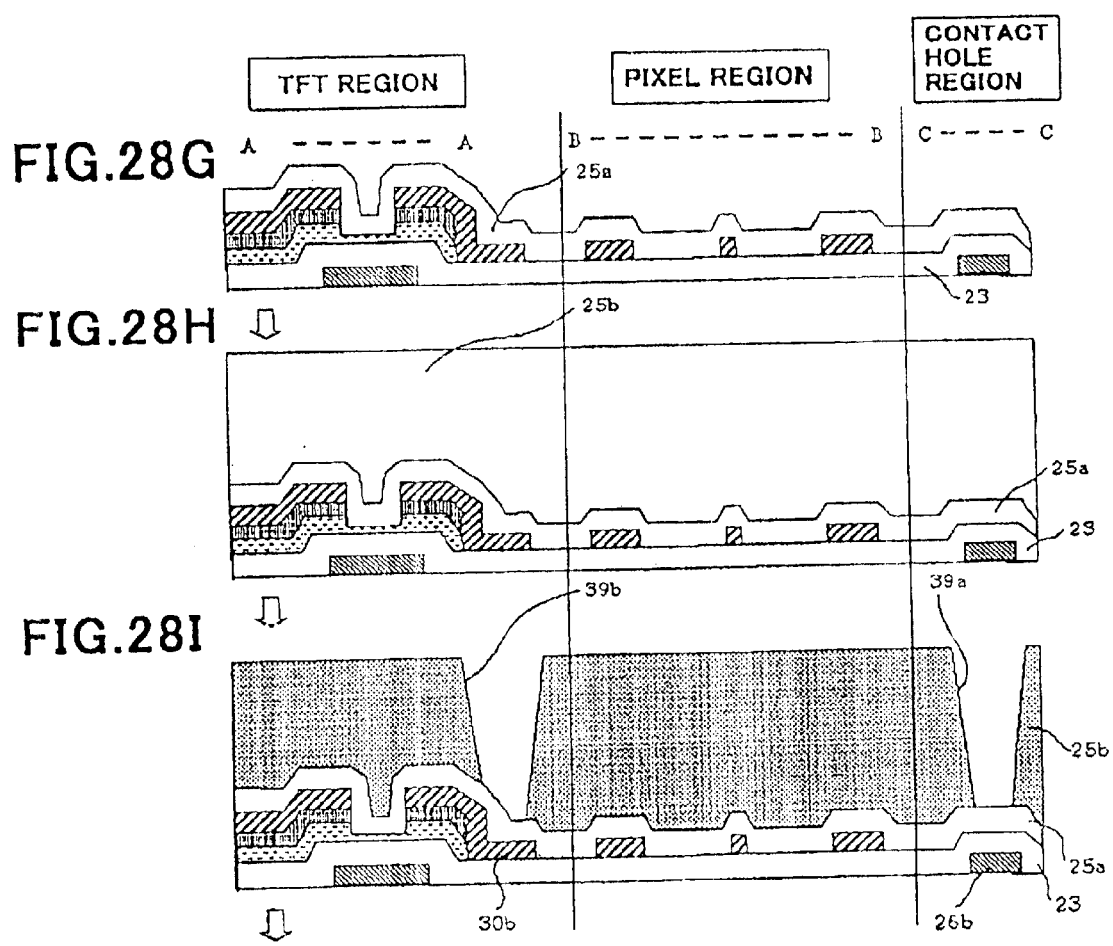

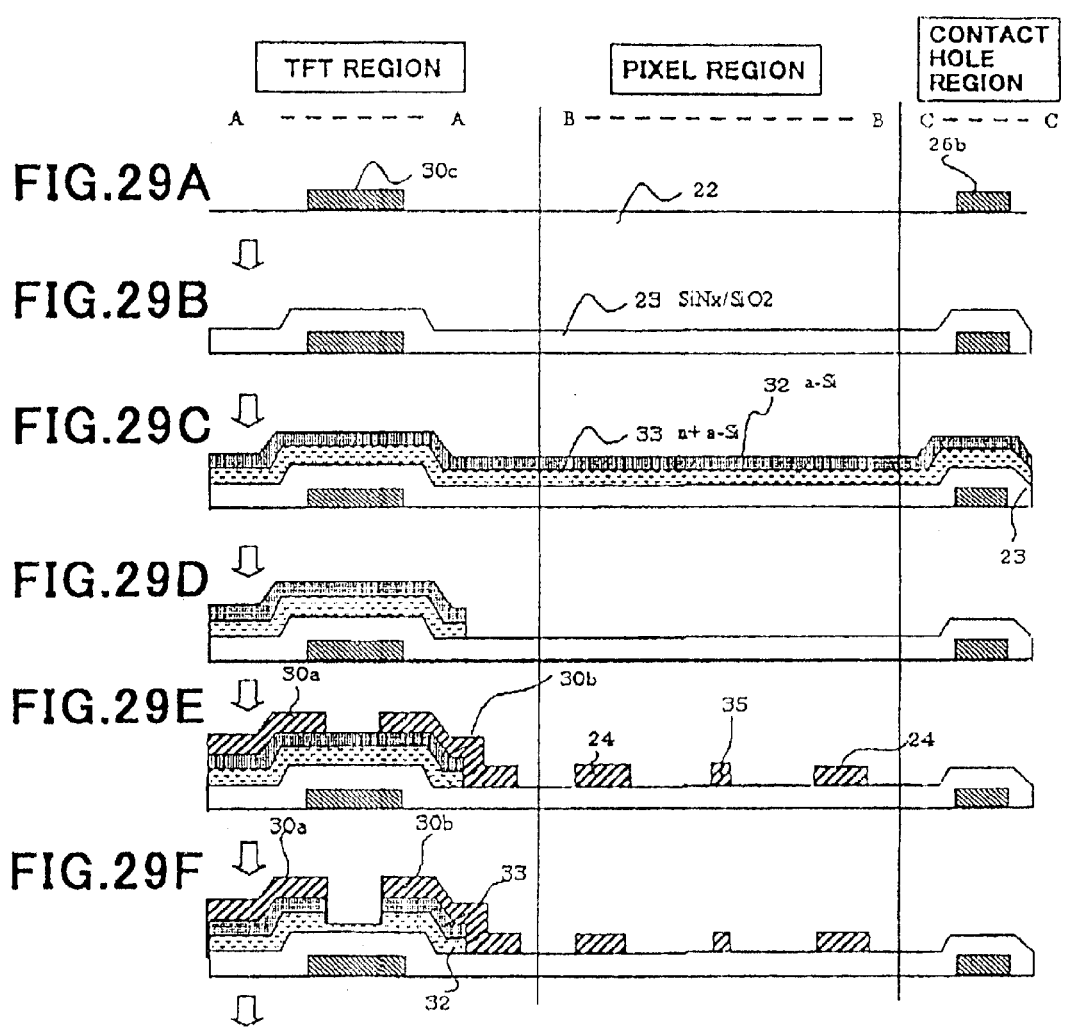

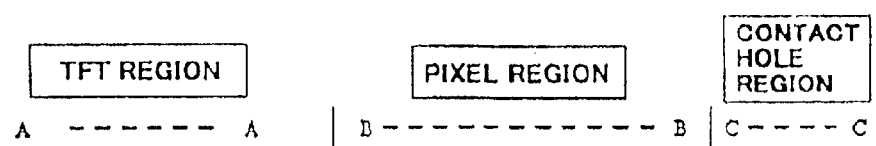
FIG.29G
FIG.29H
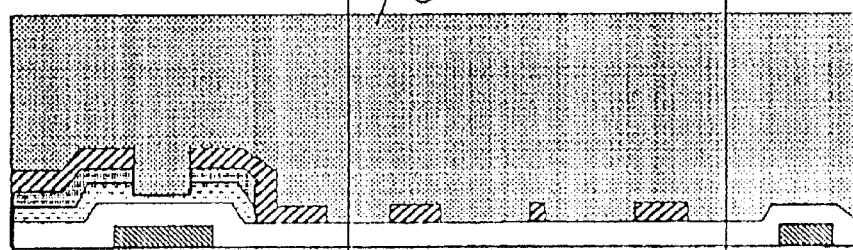
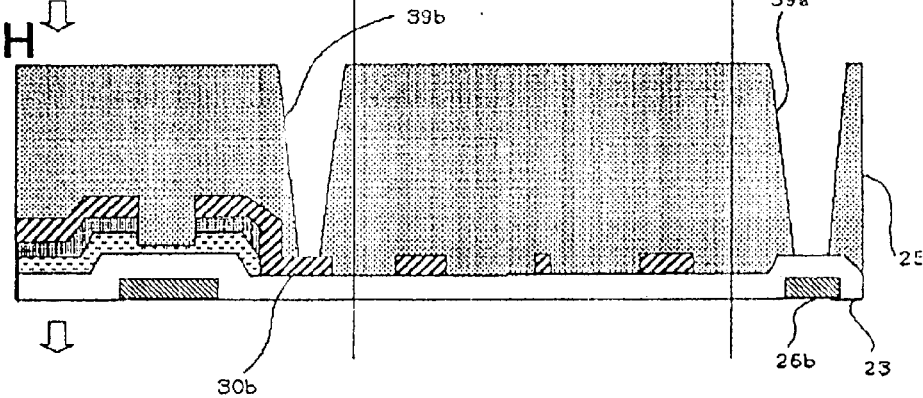

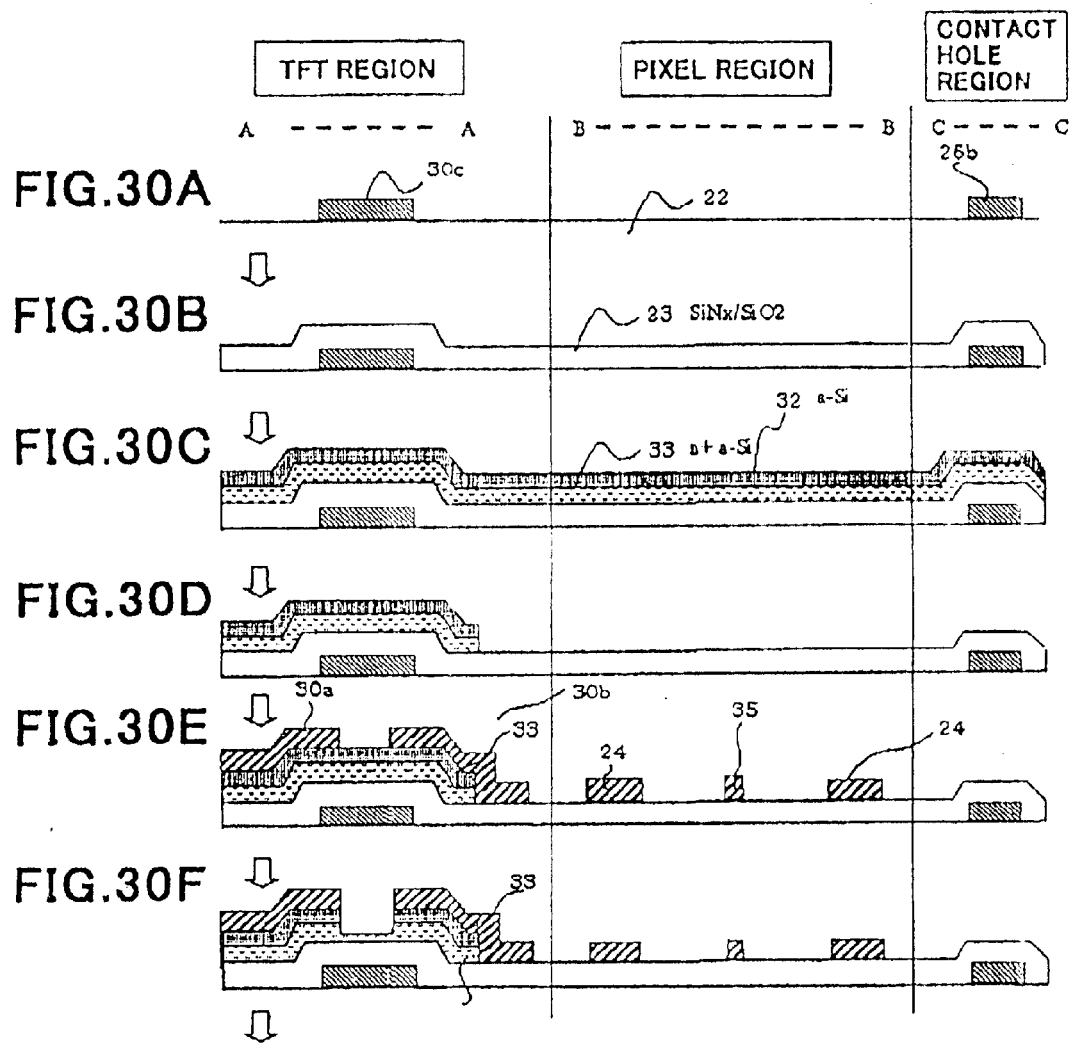

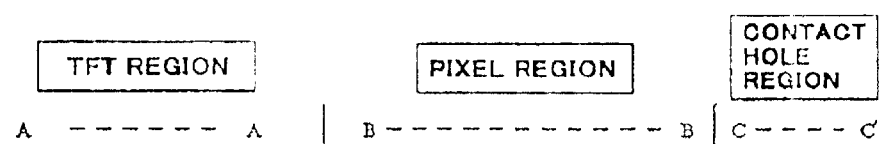
FIG.30G
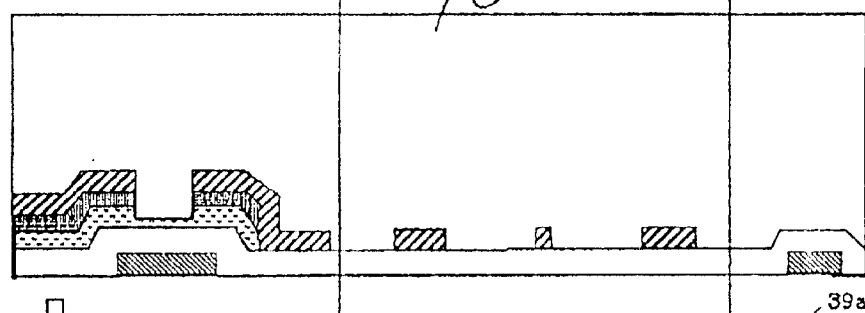
FIG.30H
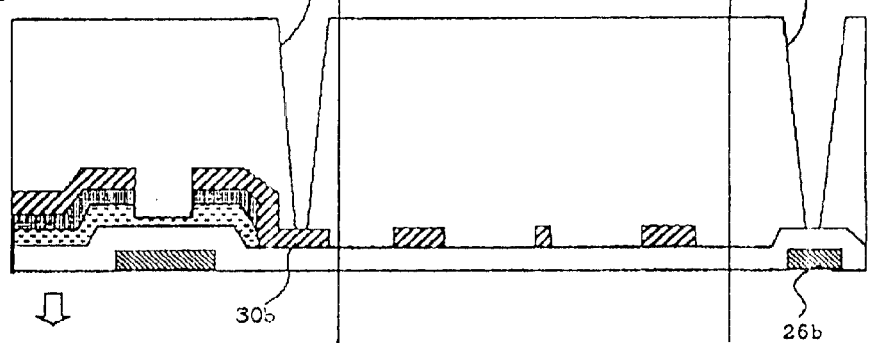

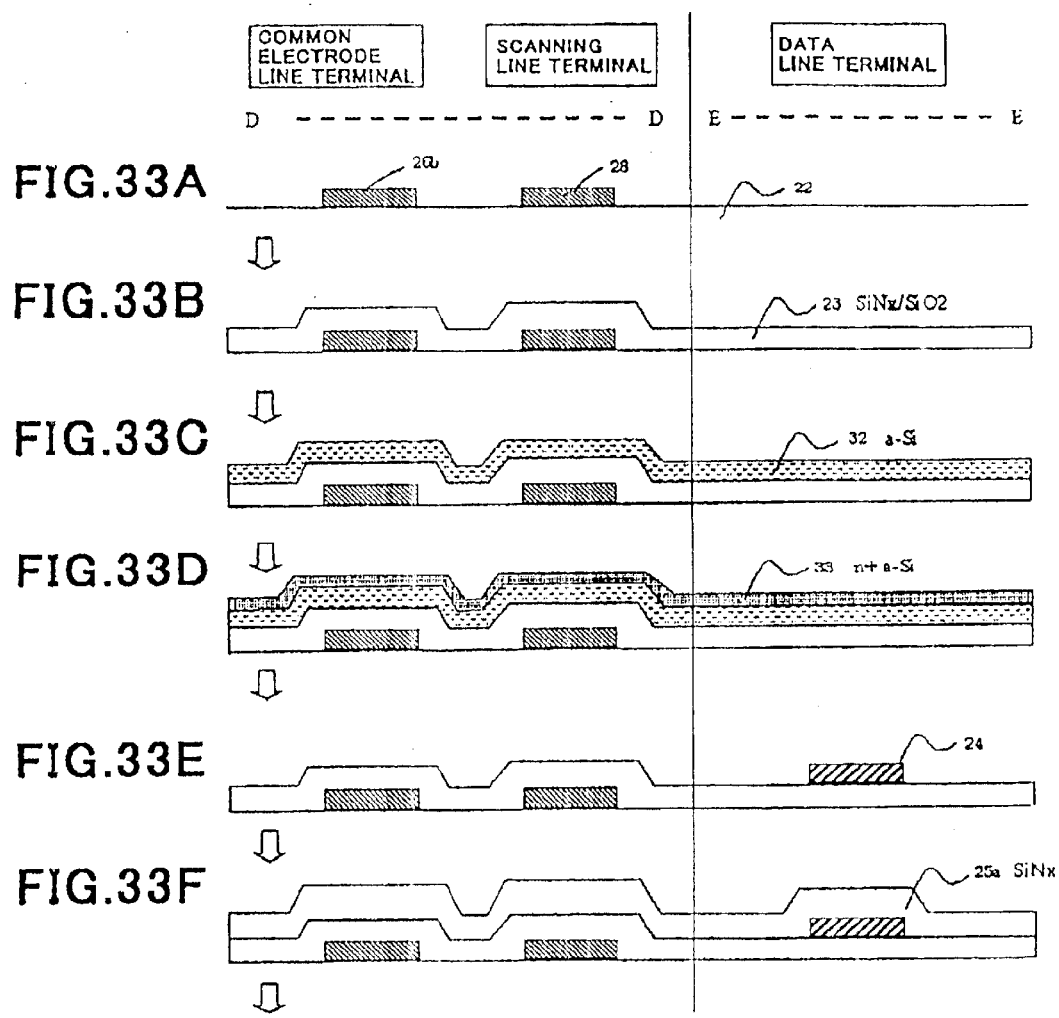

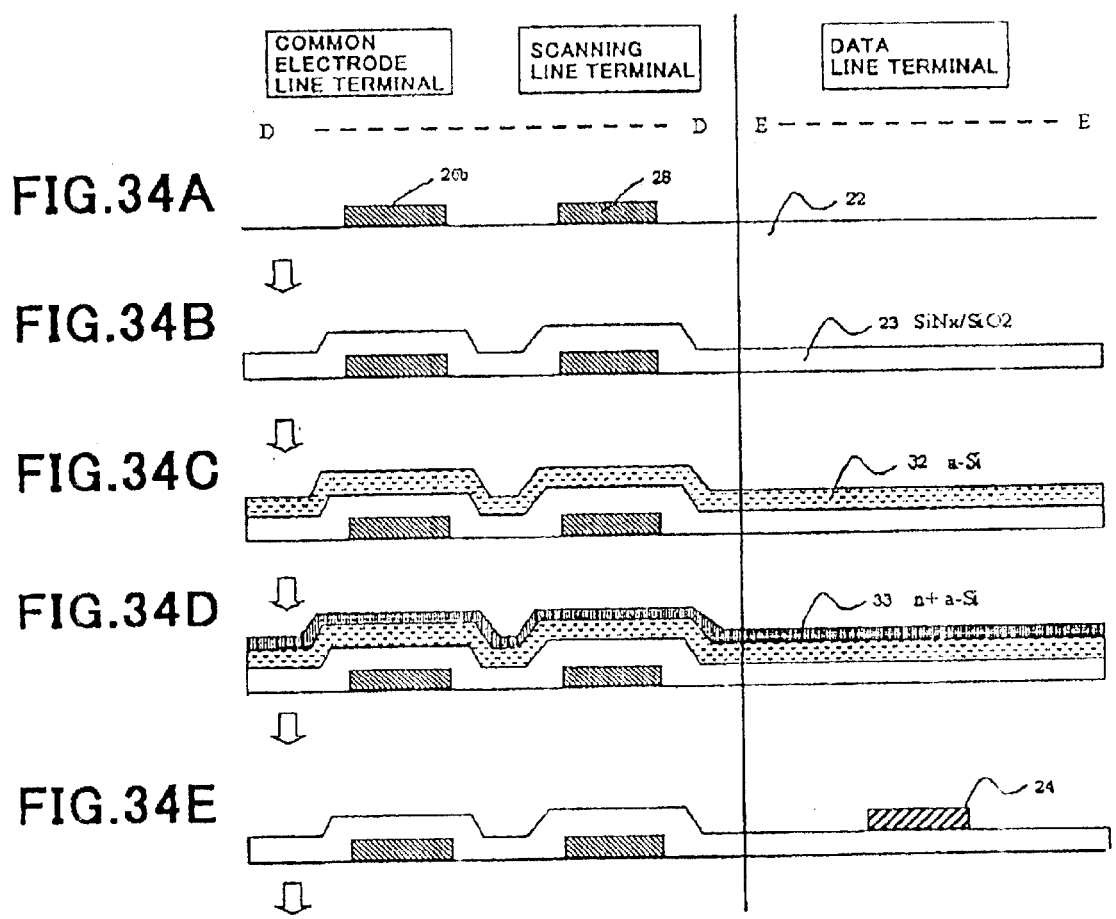

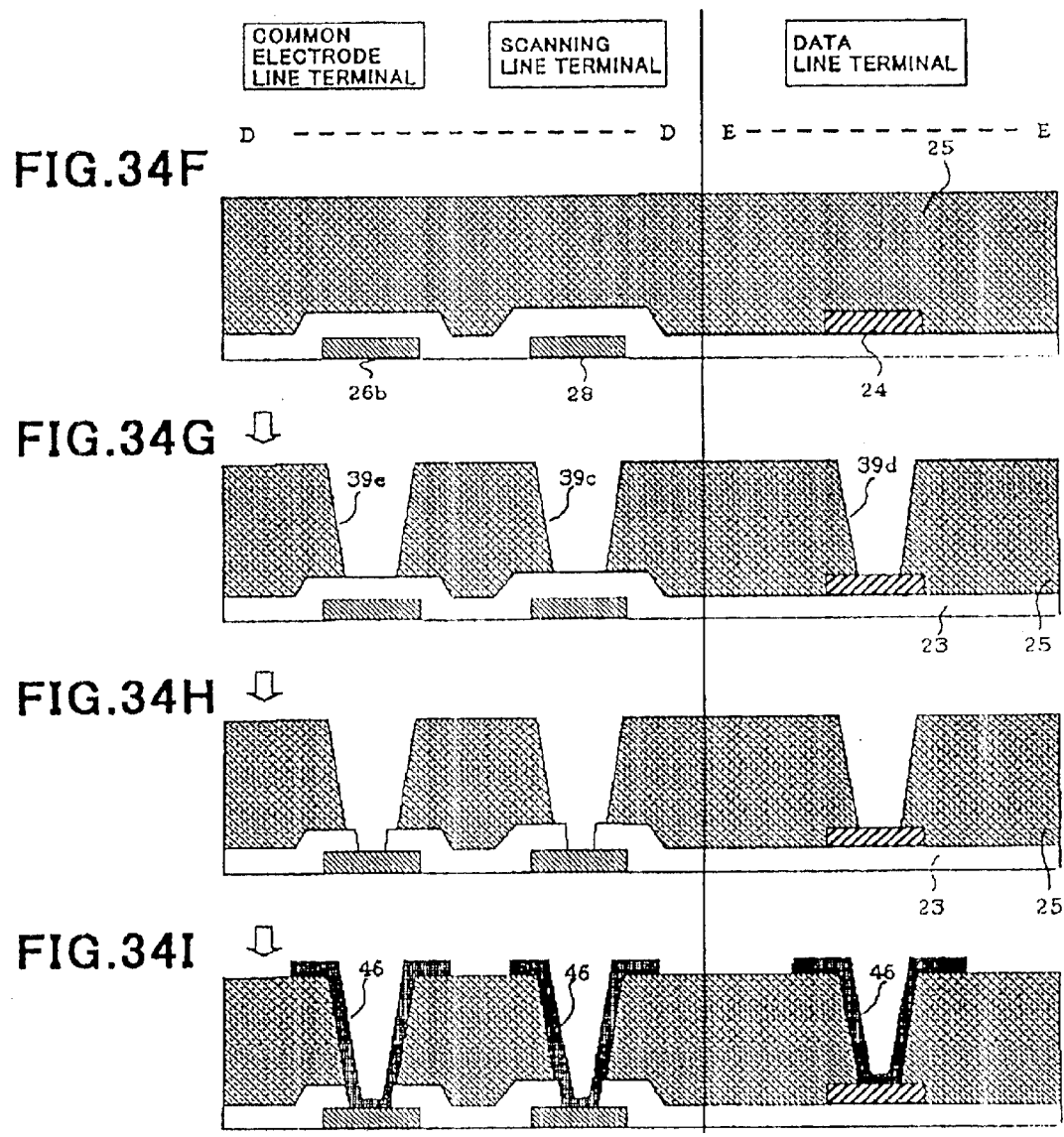

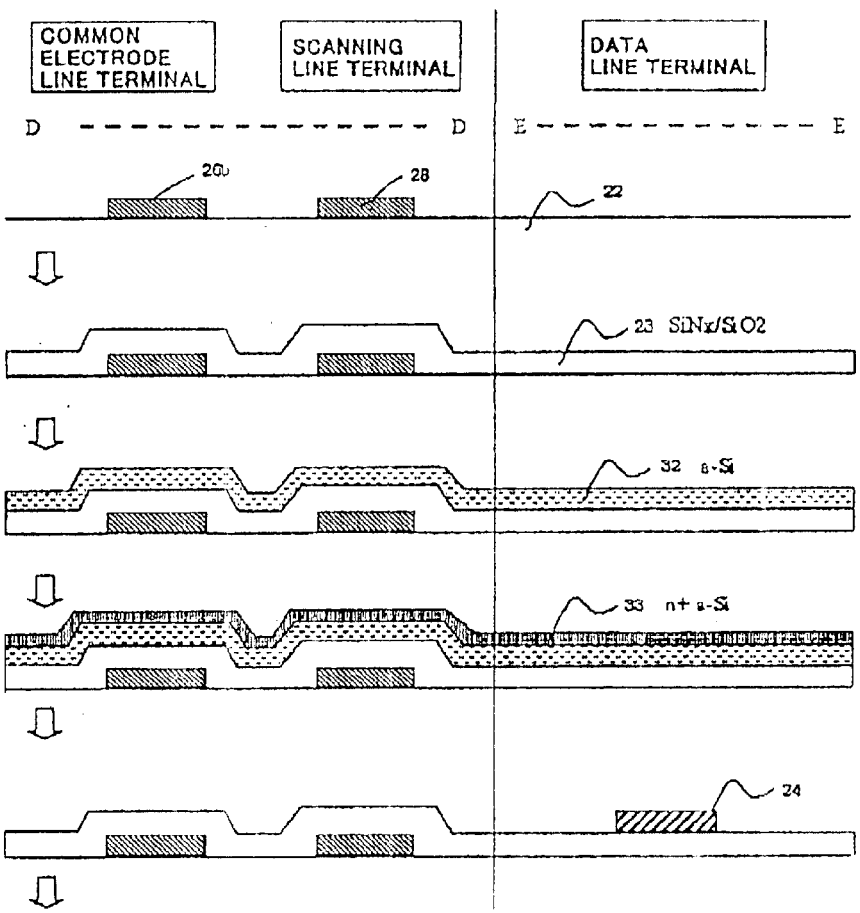

L (OPENING LENGTH)
111a

OPENING AREA = 57 x (LONGITUDINAL LENGTH)

OPENING AREA = 49.2 × (LONGITUDINAL LENGTH)

MINIMUM WIDTH OF BM
Dmin = D + LS × tan θ −(D−8)×2

| TFT REGION | PIXEL REGION | CONTACT HOLE REGION |
|---|---|---|
| (A-A) | (B-B) | (C-C) |

LAYERS OTHER THAN ITO LAYER

ITO LAYER

IN-PLANE SWITCHING MODE ACTIVE MATRIX TYPE LIQUID CRYSTAL DISPLAY DEVICE AND METHOD OF FABRICATING THE SAME

BACKGROUND OF THE INVENTION

1. Field of the Invention

The invention relates to a liquid crystal display device and a method of fabricating the same, and more particularly to an in-plane switching mode active matrix type liquid crystal display device and a method of fabricating the same.

2. Description of the Related Art

A liquid crystal display device may be grouped into two types, one of which the molecular axes of aligned liquid crystal molecules are rotated in a plane perpendicular to a substrate to display a certain image, and the other of which the molecular axes of aligned liquid crystal molecules are rotated in a plane parallel with a substrate to display a certain image.

A typical one in the former type is a twisted nematic (TN) mode liquid crystal display device, and the latter type is called an in-plane switching (IPS) mode liquid crystal display device.

Since a viewer looks only at a direction in which minor axes of liquid crystal molecules extend, even if he/she moves his/her eye point, in an IPS mode liquid crystal display device, how liquid crystal molecules stand is not dependent on a viewing angle, and accordingly, an IPS liquid crystal display device can present a wider viewing angle to a viewer than a TN mode liquid crystal display device.

Hence, an IPS mode liquid crystal display device has been more popular these days than a TN mode liquid crystal display device.

For instance, Japanese Unexamined Patent Publication No. 07-036058 has suggested an example of an IPS mode liquid crystal display device. Attempts have been made to present a higher aperture ratio in an IPS mode liquid crystal display device, for instance, in Japanese Unexamined Patent Publications Nos. 11-119237, 10-186407, 9-236820, and 6-202127.

The IPS mode liquid crystal display device suggested in Japanese Unexamined Patent Publication No. 11-119237 is characterized in that both a drive electrode (which corresponds to the pixel electrode in the present invention) and an opposing electrode (which corresponds to the common electrode in the present invention) are formed in a layer which is different from a layer in which a signal line is formed, and is located closer to a liquid crystal layer. This structure ensures that the opposing electrode is less influenced by an electric field generated due to a voltage difference between the signal line and the opposing electrode formed at an end of an opening and adjacent to the signal line, and hence, it would be possible to locate the opposing electrode closer to the signal line. As a result, it would be possible to increase an area of the opening.

Japanese Unexamined Patent Publication No. 11-119237 further suggests that the drive electrode and the opposing electrode are composed of transparent material such as ITO. However, it is not disclosed that the opposing electrode overlaps the signal line.

Japanese Unexamined Patent Publication No. 11-119237 further suggests an IPS mode liquid crystal display device in which both the drive electrode and the opposing electrode are formed in a layer located above a layer in which the signal line is formed, and the opposing electrode overlaps the signal line. This structure ensures that the drive and opposing electrodes are less influenced by an electric field leaking out of the signal line, and that a light is not leaked out of a slit formed between the signal line and the opposing electrode.

However, there is no suggestion that the drive and opposing electrodes are formed as transparent electrodes, because the opposing electrode is formed to overlap the signal line for the purpose of interrupting a light leaking out of the slit.

In the IPS mode liquid crystal display device disclosed in Japanese Unexamined Patent Publication No. 10-186407, an electrically insulating layer is formed between a common electrode layer of which a common electrode is formed and a data line layer of which a data line is formed, and the common electrode layer is located closer to a liquid crystal layer than the data line layer. The common electrode overlaps a particular area of the data line in a particular area. The common electrode entirely overlaps the data line, preventing leakage of an electric field, and the common electrode partially overlaps the data line, ensuring reduction in a parasitic capacity formed between the data line and the common electrode.

However, Japanese Unexamined Patent Publication No. 10-186407 does not disclose and suggest a common electrode composed of transparent material.

In the IPS mode liquid crystal display device disclosed in Japanese Unexamined Patent Publication No. 9-236820, each of opposing electrodes is comprised of thin strip-shaped electrodes parallel with source bus lines (which correspond to the data lines in the present invention) through which a pixel signal is transmitted to a pixel electrode. The opposing electrodes and the source bus lines are stacked one on another with transparent insulating layers being sandwiched therebetween. The opposing electrodes and the source bus lines are located at the same position with respect to a direction in which a light passes through the liquid crystal display device.

Japanese Unexamined Patent Publication No. 9-236820 describes that it would be possible to increase an aperture ratio of pixels, if the opposing and pixel electrode were composed of transparent material. However, the Publication further describes that since transparent material has a high resistance, a voltage difference would be generated, disturbing driving the electrodes to display images, and that a transparent electrode is quite expensive.

An IPS mode liquid crystal display device disclosed in Japanese Unexamined Patent Publication No. 6-202127 is designed to have a driver comprised of an active device and is characterized in that a signal line through which an image signal is transmitted to the active device is covered in an area facing a liquid crystal layer with an electrical conductor with an electrical insulator being sandwiched therebetween.

However, the Publication never discloses and suggests that a signal line is shielded with a transparent electrode.

An IPS mode liquid crystal display device disclosed in Japanese Unexamined Patent Publication No. 10-307295 is characterized by a plurality of sub-areas for compensating for colored images. As an example, the Publication suggests a method of preventing images from being colored, including the step of generating electric fields having different directions in first and second sub-areas, to thereby rotate liquid crystal molecules in different directions in the first and second sub-areas, ensuring that optical characteristics of the first and second sub-areas are compensated for to each other when a viewer obliquely views the liquid crystal display device.

The IPS mode liquid crystal display devices disclosed in the above-mentioned Publications have an object of increasing an aperture ratio, and enhancing a brightness of displayed images.

Since there is generated a voltage difference between a data line and an opposing electrode or a common electrode, an electric field is generated due to the voltage difference. If the electric field reaches such a region that a display region located between a pixel electrode and a common electrode is influenced by the electric field, alignment in liquid crystal molecules is disturbed. For instance, when a white window is to be displayed on a screen under black background, there would be caused a problem called vertical cross-talk by which pixels which should display black, associated with a data line driving pixels displaying white, display gray.

In order to avoid the vertical cross-talk problem, it would be necessary to terminate the electric field with the common electrode having a width extending outwardly at opposite edges of the data line for shielding an electric filed associated with the data line, or to cover the data line with an electrode to which a voltage exerting no influence on images is applied, such as the common electrode.

In order to increase an aperture ratio, it would be preferable to cover the data line with the common electrode, as mentioned in the latter.

However, the conventional liquid crystal display devices suggested in the above-mentioned Publications are accompanied with problems of incomplete shielding and reduction in an efficiency with which a light is used which reduction is caused by a common electrode composed of light-impermeable material.

The conventional liquid crystal display devices suggested in the above-mentioned Publications have an object of enhancing an aperture ratio, however, there is a need of further enhancement of an aperture ratio.

SUMMARY OF THE INVENTION

In view of the above-mentioned problems in the conventional liquid crystal display devices, it is an object of the present invention to provide an in-plane switching (IPS) mode liquid crystal display device which is capable of solving the vertical cross-talk problem and increasing an aperture ratio.

Specifically in comparison with the above-mentioned conventional liquid crystal display devices, the first object of the present invention is to provide an IPS mode liquid crystal display device which is capable of preventing occurrence of vertical cross-talk without reduction in an aperture ratio.

In order to accomplish the above-mentioned first object, a data line is designed to be overlapped by a transparent common electrode for shielding an electric field leaking out of the data line in the IPS mode liquid crystal display device in accordance with the present invention. However, this structure is accompanied with a problem that since a transparent material has a high resistance, there would be generated a voltage difference which would prevent electrodes from being properly driven for displaying images, as pointed out in the above-mentioned Japanese Unexamined Patent Publication No. 9-236820. Accordingly, the second object of the present invention is to provide an IPS mode liquid crystal display device in which a common electrode comprised of a transparent electrode overlaps a data line, and the common electrode could have a reduced resistance.

In order to accomplish the second object, a transparent electrode overlapping a data line is electrically connected to a common electrode line through a contact hole in each of pixels.

Even if the above-mentioned objects were accomplished, the problem of reduction in an aperture ratio remains unsolved. Accordingly, the third object of the present invention is to provide an IPS mode liquid crystal display device which is capable of narrowing a light-impermeable film such as a black matrix film which was used in a conventional IPS mode liquid crystal display device to prevent vertical cross-talk, which is generated due to a leaked electric field, from appearing in a displayed image.

In order to accomplish the above-mentioned third object, a black matrix layer facing data lines is designed to have a width smaller than a width of a common electrode overlapping the data lines, and a light-impermeable film is designed not to be formed between the common electrode overlapping the data line and the pixel electrode located adjacent to the common electrode, when viewed as a plan view, in the IPS mode liquid crystal display device in accordance with the present invention.

As the above-mentioned Japanese Unexamined Patent Publication No. 9-236820 has pointed out, there is a problem that a transparent electrode is expensive. Accordingly, the fourth object of the present invention is to provide an IPS mode liquid crystal display device in which a transparent electrode can be fabricated at low cost.

In order to accomplish the fourth object, the transparent electrode is composed of ITO, and the transparent electrode is fabricated without an increase in the number of fabrication steps by fabricating the ITO transparent electrode concurrently with a terminal composed of ITO.

As pointed out in the above-mentioned Japanese Unexamined Patent Publication No. 10-186407, the problem that a parasitic capacity is increased between a data line and a common electrode, if the common electrode entirely overlaps the data line, remains unsolved. Accordingly, the fifth object of the present invention is to provide an IPS mode liquid crystal display device in which a data line is almost entirely overlapped by a common electrode without an increase in a parasitic capacity between a data line and a common electrode.

In order to accomplish the fifth object, a common electrode composed of ITO is formed in a layer closer to a liquid crystal layer than a data line with an interlayer insulating layer being sandwiched therebetween, and the interlayer insulating layer is composed of organic material having a low dielectric constant.

Though the above-mentioned Publications do not point out, if a common electrode shielding a data line is designed to be composed of an ordinary metal other than ITO, reliability of a resultant liquid crystal display device is reduced in comparison with a liquid crystal display device having a common electrode composed of ITO. Accordingly, the sixth object of the present invention is to provide an IPS mode liquid crystal display device in which a data line is shielded with a more reliable transparent material.

In one aspect of the present invention, there is provided an in-plane switching mode active matrix type liquid crystal display device including (a) a first substrate, (b) a second substrate located opposing the first substrate, and (c) a liquid crystal layer sandwiched between the first and second substrates, wherein the first substrate includes (a1) a thin film transistor having a gate electrode, a drain electrode and a source electrode, (a2) a pixel electrode each associated to a pixel to be driven, (a3) a common electrode to which a reference voltage is applied, (a4) data lines, (a5) a scanning line, and (a6) common electrode lines. The gate electrode is electrically connected to the scanning line, the drain electrode is electrically connected to the data lines, the source electrode is electrically connected to the pixel electrode, and the common electrode is electrically connected to the common electrode lines. Molecular axes of liquid crystal in the liquid crystal layer are rotated in a plane parallel with the first substrate by an electric field substantially parallel with a plane of the first substrate and to be applied between the pixel electrode and the common electrode, to thereby display certain images. The common electrode is composed of transparent material, and are formed on a layer located closer to the liquid crystal layer than the data lines. The common electrode entirely overlaps the data lines with an insulating layer being sandwiched therebetween except an area where the data lines are located in the vicinity of the scanning line. The in-plane switching mode active matrix type liquid crystal display device further includes a light-impermeable layer in an area where the common electrode entirely overlaps the data lines. The light-impermeable layer is formed on the second substrate or on the first substrate such that the light-impermeable layer and the liquid crystal layer are located at the same side with respect to the data lines and that the light-impermeable layer faces the data lines. The light-impermeable layer is comprised of a black matrix layer or multi-layered color layers. The black matrix layer or the multi-layered color layers has a width smaller than a width of the common electrode overlapping the data lines.

The above-mentioned in-plane switching mode active matrix type liquid crystal display device accomplishes the above-mentioned first to third objects. Specifically, the in-plane switching mode active matrix type liquid crystal display device which (a) prevents vertical cross-talk without reduction in an aperture ratio, in which (b) the data line is overlapped by the transparent electrode electrically connected to the common electrode, and the common electrode could have a reduced resistance, and which (c) is capable of narrowing alight-impermeable film such as a black matrix film which was used in a conventional IPS mode liquid crystal display device to prevent vertical cross-talk, which is generated due to a leaked electric field, from appearing in a displayed image.

Hereinbelow is explained the reason why the above-mentioned in-plane switching mode active matrix type liquid crystal display device can accomplish the first and third objects.

FIG. 1 is a partial cross-sectional view of the above-mentioned conventional liquid crystal display device 10A. FIG. 1 illustrates only parts necessary for explanation for the purpose of simplifying explanation.

The liquid crystal display device 10A is comprised of an active device substrate 11A, an opposing substrate 12A, and a liquid crystal layer 13A sandwiched between the active device substrate 11A and the opposing substrate 12A.

The opposing substrate 12A is comprised of a black matrix layer 17A acting as a light-impermeable film for interrupting unnecessary lights, a color layer 18A partially covering the black matrix layer 17A therewith, an over-coating layer 19A formed covering the black matrix layer 17A and the color layer 18A therewith, and an alignment film 20A formed entirely over the over-coating layer 19A.

The active device substrate 11A is comprised of a common electrode 26A formed on a glass substrate (not illustrated), an interlayer insulating film 25A formed on the glass substrate, covering the common electrode 26A therewith, a data line 24A formed on the interlayer insulating film 25A, a pixel electrode 27A formed on the interlayer insulating film 25A, a passivation film 37A formed on the interlayer insulating film 25A, covering the data line 24A and the pixel electrode 27A therewith, and an alignment film 31A formed on the passivation film 37A.

In the liquid crystal display device 10A illustrated in FIG. 1, it was necessary for the common electrode 26A formed adjacent to the data line 24A to have a sufficiently wide width in order to absorb therein an electric field leaking out of the data line 24A. Since the common electrode 26A is composed of opaque material of which a gate line is composed, it is not avoidable that an area defining an opening OP extends inwardly from a right edge of the common electrode 26A.

In addition, it was also necessary for the black matrix layer 17A to have a width greater than and entirely covering a width of the data line 24A in order to interrupt a light S leading out of a gap between the data line 24A and the common electrode 26A.

For instance, the black matrix layer 17A in the liquid crystal display device 10A was designed to extend beyond a gap between the data line 24A and the common electrode 26A by 8 $\mu$m or greater, taking misregistration between the active device substrate 11A and the opposing substrate 12A acting as a color filter into consideration.

As explained so far it was quite difficult in the conventional liquid crystal display device 10A to increase an aperture ratio, because the liquid crystal display device 10A could merely have a limited area as an opening OP, and it was necessary for the black matrix layer 17A to extend beyond the above-mentioned gap.

FIG. 2 is a partial cross-sectional view of a liquid crystal display device 10 in accordance with the present invention. Similarly to FIG. 1, FIG. 2 illustrates only parts necessary for explanation for the purpose of simplifying explanation.

The liquid crystal display device 10 is comprised of an active device substrate 11, an opposing substrate 12, and a liquid crystal layer 13 sandwiched between the active device substrate 11 and the opposing substrate 12.

The opposing substrate 12 is comprised of a black matrix layer 17, a color layer 18 partially covering the black matrix layer 17 therewith, an over-coating layer 19 formed covering the black matrix layer 17 and the color layer 18 therewith, and an alignment film 20 formed entirely over the over-coating layer 19.

The active device substrate 11 is comprised of a first interlayer insulating film 23, a data line 24 formed on the first interlayer insulating film 23, a second interlayer insulating film 25 formed on the first interlayer insulating film 23, covering the data line 24 therewith, a common electrode 26 formed on the second interlayer insulating film 25, a pixel electrode 27 formed on the second interlayer insulating film 25, and an alignment film 31 formed on the second interlayer insulating film 25, covering the common electrode 26 and the pixel electrode 27 therewith.

The common electrode 26 is designed to entirely overlap the data line 24, and the black matrix layer 17 is designed to have a width smaller than a width of the common electrode 26. Both of the common electrode 26 and the pixel electrode 27 are composed of indium-tin-oxide (ITO) as one of transparent materials.

In accordance with the liquid crystal display device 10, an electric field leaking out of the data line 24 is completely shielded by the common electrode 26 located above the data line 24. Hence, as illustrated in FIG. 2, it is possible to have an area defining an opening OP which extends inwardly from a right edge of the common electrode 26, which opening OP is wider than the opening OP obtained in the conventional liquid crystal display device 10A illustrated in FIG. 1.

That is, the liquid crystal display device 10 in accordance with the present invention can present a greater aperture ratio than that of the conventional liquid crystal display device 10A.

In addition, light leakage can be sufficiently prevented, only if a light leaking out of a pixel located adjacent to the black matrix layer 17 is prevented from leaking out, in the liquid crystal display device 10 in accordance with the present invention. Accordingly, it is no longer necessary for the black matrix layer 17 to have a width greater than a width of the data line 24, even if misregistration between the active device substrate 11 and the opposing substrate 12 is taken into consideration.

For instance, if the black matrix layer 17 had a width of 6 $\mu$m or greater as long as the data line 24 overlaps the black matrix layer 17, it would be possible for the black matrix layer 17 to sufficiently interrupt light.

FIG. 3 is a graph showing the results of simulating how an electric field leaking out of the data line 24 is shielded in the liquid crystal display device wherein the common electrode 26 entirely overlaps the data line 24.

In the simulation, a profile of potential and a rate at which a light passes through the liquid crystal display device in a unit cell are calculated on the assumption that pixels are all black, a voltage of 0V is applied to both the pixel electrode 27 and the common electrode 26, and a voltage of 5V is applied to the drain.

As shown in FIG. 3, a rate Z at which a light passe through the liquid crystal display device is kept zero (0). This means that an electric field leaking out of the data line 24 is completely shielded by the common electrode 26.

The black matrix layer 17 may be replaced with a light-impermeable layer having multi-layered color layers, in which case, it is no longer necessary to form the black matrix layer 17, and hence, it would be possible to increase a fabrication efficiency of the liquid crystal display device.

It is preferable that the common electrode is electrically connected to the common electrode lines through a contact hole in each of pixels.

It would be possible to reduce a resistance of the common electrode by electrically connecting the common electrode to the common electrode lines through a contact hole in each of pixels. As a result, it would be possible to solve the problem that transparent material has a high resistance.

It is preferable that one of the first and second substrates is comprised further of a color layer formed in a line.

It is preferable that the in-plane switching mode active matrix type liquid crystal display device further includes a reverse-rotation preventing structure in a sub pixel area in which all liquid crystal molecules are rotated in the same direction, for preventing liquid crystal molecules from rotating in a direction opposite to the same direction, the reverse-rotation preventing structure including an auxiliary electrode to which a voltage equal to a voltage of at least one of the pixel electrode and the common electrode is applied such that an initial alignment orientation of liquid crystal molecules overlaps a direction of an electric field generated in the sub pixel area in all sub-areas in the sub pixel areas, if the initial alignment orientation rotates by an acute angle.

It is preferable that the in-plane switching mode active matrix type liquid crystal display device further includes an interlayer insulating film formed below the common electrode overlapping the data lines. The interlayer insulating film is comprised of an upper layer and a lower layer, and the upper layer is formed only below a portion of the common electrode which portion overlaps the data lines.

By including such an interlayer insulating film, it is no longer necessary to form an interlayer insulating film having a too much area between a common electrode and a data line, and it would be possible to almost entirely overlap the data line with the common electrode without an increase in a parasitic capacity to be formed between the common electrode and the data line.

It is preferable that the common electrode is wider than the data lines at opposite ends in a width-wise direction thereof by 1.5 $\mu$m or greater.

By designing the common electrode to be wider than the data lines at opposite ends in a width-wise direction thereof by 1.5 $\mu$m or greater, it would be possible to make an allowable maximum light passing at a side of the data line, equal to or smaller than $\frac{1}{100}$ of a light passing through a pixel when white is displayed on the pixel.

It is preferable the black matrix layer has a width smaller than a width of the data lines, and overlaps the data lines in its entire length.

As illustrated in FIG. 2, if the black matrix layer 17 has a width smaller than a width of the data line 24, it would be possible to make use of all light passing through extensions of the transparent common electrode 26 overlapping the data line 24, ensuring enhancement in a ratio at which a light passes through a panel.

It is preferable that the black matrix layer is formed on the second substrate, and the black matrix layer facing the data lines has a width equal to or greater than 6 $\mu$m.

If the black matrix layer had a width smaller than 6 $\mu$m, much light reflects at the data line 24, resulting in that a screen of the in-plane switching mode active matrix type liquid crystal display device is hard to be seen under bright circumstance.

It is preferable that the black matrix layer overlaps the scanning line and a region therearound, and an area sandwiched between the scanning line and the pixel electrode and a region therearound.

This ensures that the scanning line, the region and the area can be shielded from light by the black matrix layer.

It is preferable that the pixel electrode is composed of transparent material.

The pixel electrode composed of transparent material would further enhance an aperture ratio.

It is preferable that the common electrode and the pixel electrode are formed in a common layer.

Thus, it would be possible to form the common and pixel electrodes in a single step, ensuring enhancement of a fabrication yield, or the in-plane switching mode active matrix type liquid crystal display device in accordance with the present invention can be fabricated without an increase in the number of fabrication steps.

The in-plane switching mode active matrix type liquid crystal display device may further include an interlayer insulating layer formed in a layer located immediately below the common electrode, and a pixel auxiliary electrode comprised of a single or a plurality of layer(s) formed below the interlayer insulating layer, wherein the pixel auxiliary electrode is preferably electrically connected to the source electrode, and kept at a voltage equal to a voltage of the pixel electrode. The pixel auxiliary electrode is preferably composed of opaque metal.

Though the pixel auxiliary electrode composed of opaque metal slightly reduces transmissivity, it would be possible to form storage capacities above and below a pixel by electrically connecting the pixel electrode to one another through the pixel auxiliary electrode, ensuring higher storage capacitance and higher quality in displaying images.

It is preferable that the pixel auxiliary electrode is at least partially formed below the pixel electrode formed in a layer in which the common electrode is formed, and having a plurality of comb-teeth.

Since an electric field is vertically applied to liquid crystal immediately above the transparent pixel electrode, the liquid crystal vertically stands with the result of reduction in light transmissivity in comparison with light transmissivity obtained in an area between comb-teeth electrodes. Accordingly, it would be possible to electrically connect the pixel auxiliary electrodes located at opposite sides of a pixel, to each other without much reduction in an efficiency at which a light is used, by locating the pixel auxiliary electrode composed of opaque material, just below the pixel electrode having a slightly smaller transmissivity than that of the pixel auxiliary electrode.

It is also preferable that the in-plane switching mode active matrix type liquid crystal display device further includes an interlayer insulating layer formed in a layer located immediately below the common electrode, and a common auxiliary electrode comprised of a single or a plurality of layer(s) formed below the interlayer insulating layer, wherein the common auxiliary electrode is electrically connected to the common electrode lines, and kept at a voltage equal to a voltage of the common electrode, and the common auxiliary electrode is composed of opaque metal.

It would be possible to form storage capacitors both above and below a pixel by electrically connecting the common electrode to each other, similarly to the common auxiliary electrodes, ensuring higher storage capacitance and higher quality in displaying images.

It is preferable that the pixel auxiliary electrode is formed below the common electrode having a plurality of comb-teeth.

It would be possible to electrically connect the common auxiliary electrodes located at opposite sides of a pixel, to each other without much reduction in the efficiency at which light is used, by locating the common auxiliary electrode composed of opaque material, just below the pixel electrode having a slightly smaller transmissivity than that of the common auxiliary electrode. However, if the pixel auxiliary electrode were arranged below the common electrode, an electric field would be generated between the common electrode and the pixel auxiliary electrode, resulting in that a desired horizontal electric field cannot be applied to liquid crystal. Accordingly, it is preferable that the pixel auxiliary electrode is arranged just below the pixel electrode, and the common auxiliary electrode is arranged just below the common electrode.

It is preferable that a scanning line terminal, a data line terminal and a common electrode line terminal are covered with or composed of a material of which the common electrode comprised of transparent electrodes are composed.

This ensures it possible to form the common electrode concurrently with terminals of the liquid crystal display device, avoiding an increase in the fabrication steps necessary for forming the common electrode.

The in-plane switching mode active matrix type liquid crystal display device may preferably further include a reverse-rotation preventing structure in a sub pixel area in which all liquid crystal molecules are rotated in the same direction, for preventing liquid crystal molecules from rotating in a direction opposite to the same direction, wherein at least a part of edges of the pixel auxiliary electrodes and the common electrode lines is formed oblique such that an initial alignment orientation of liquid crystal molecules overlaps a direction of an electric field generated in the sub pixel area in all sub-areas in the sub pixel areas, if the initial alignment orientation rotates by an acute angle.

By preventing molecular axes of liquid crystal molecules from rotating in a reverse direction, it would be possible for the liquid crystal display device to have improved display quality and reliability.

It is preferable that the in-plane switching mode active matrix type liquid crystal display device further includes a passivation film covering the common electrode therewith.

It is preferable that the in-plane switching mode active matrix type liquid crystal display device further includes a passivation film covering the pixel electrode therewith.

The passivation film covering the pixel or common electrode therewith would relax an intensive electric field generated at edges of the pixel or common electrode, ensuring prevention of defects in both alignment of liquid crystal molecules and displaying images.

It is preferable that the first substrate is formed with one of a first contact hole electrically connecting the pixel electrode to the source electrode, and a second contact hole electrically connecting the common electrode to the common electrode lines, the first and second contact holes being square or rectangular in shape, and having a side having a length equal to or greater than 6 $\mu$m.

The first and second contact holes having a side having a length equal to or greater than 6 $\mu$m would ensure appropriate electrical contact.

It is preferable that the first substrate is formed with one of a first contact hole electrically connecting the pixel electrode to the source electrode, and a second contact hole electrically connecting the common electrode to the common electrode lines, the first and second contact holes being covered at inner surfaces thereof with a metal film.

By covering the first and second contact holes at its inner surfaces with a metal film, it would be possible to reduce resistance between the common electrode and the common electrode line both composed of a transparent metal, and enhance uniformity in displaying images.

For instance, the pixel electrode may be formed of a second metal layer of which the data lines are formed.

Since the pixel and common electrodes are comprised of different layers from each other, the pixel and common electrodes are no longer short-circuited with each other, ensuring enhancement in a fabrication yield.

It is preferable that the pixel electrode is formed of a second metal layer of which the drain electrode is formed, in an area in which an image is displayed, and a portion of the common electrode other than a portion composed of transparent metal and overlapping the data lines is formed of a first metal layer of which the gate electrode is formed.

Since the pixel and common electrodes are comprised of different layers from each other, the pixel and common electrodes are no longer short-circuited with each other, ensuring enhancement in a fabrication yield. In addition, since the floating electrode comprised of the first layer is comprised of a layer of which the common electrode is also comprised, the floating electrode becomes a fixed electrode by electrically connecting to the common electrode, ensuring enhancement in display quality.

It is preferable that the in-plane switching mode active matrix type liquid crystal display device further includes an interlayer insulating film sandwiched between the data lines and the common electrode overlapping the data lines and composed of transparent metal, the interlayer insulating film being formed only below the common electrode.

This ensures that it is no longer necessary to form an interlayer insulating film between the common electrode and the data line in an area which is larger than necessary, and hence, the data line can be almost entirely covered with the common electrode without an increase in parasitic capacity between the common electrode and the data line.

It is preferable that the in-plane switching mode active matrix type liquid crystal display device further includes an interlayer insulating film sandwiched between the data lines and the common electrode overlapping the data lines and composed of transparent metal, the interlayer insulating film being comprised of an inorganic film.

By composing the interlayer insulating film of an inorganic material, the interlayer insulating film could have enhanced transparency. In addition, it would be possible to enhance reliability of the thin film transistor.

It is preferable that the in-plane switching mode active matrix type liquid crystal display device further includes an interlayer insulating film sandwiched between the data lines and the common electrode overlapping the data lines and composed of transparent metal, the interlayer insulating film being comprised of an organic film.

Since an organic film has a smaller dielectric constant than that of an inorganic film, the interlayer insulating film composed of organic material would have a smaller dielectric constant than that of an interlayer insulating film composed of inorganic material. In addition, a process of composing an interlay insulating film of an organic material is simpler than a process of composing the same of an inorganic material.

It is preferable that the in-plane switching mode active matrix type liquid crystal display device further includes an interlayer insulating film sandwiched between the data lines and the common electrode overlapping the data lines and composed of transparent metal, the interlayer insulating film being comprised of a first film comprised of an inorganic film and a second film comprised of an organic film and covering the first film therewith.

In comparison with an interlayer insulating film comprised only of an inorganic film, an interlayer insulating film having such a multi-layered structure could have a smaller dielectric constant. In addition, by designing the first film comprised of an inorganic film to make contact with a semiconductor layer in the thin film transistor, and further by forming the second film on the first film, it would be possible to form a stable interface between the first and second films, ensuring enhancement in reliability of the thin film transistor.

For instance, the inorganic film may be selected from a silicon nitride film, an inorganic polysilazane film, a silicon oxide film, or a multi-layered structure including two or more of them.

These inorganic films provide enhanced reliability to the thin film transistor.

For instance, the organic film may be selected from a photosensitive acrylic resin film, a photosensitive polyimide film, a benzocyclobutene (BCB) film, an organic polysilazane film, or a siloxane film.

These organic films can be readily formed.

For instance, the first film may be comprised of a silicon nitride film and the second film may be comprised of a photosensitive acrylic resin film or a photosensitive polyimide resin film.

The multi-layered structure including the above-mentioned first and second films would reduce a dielectric constant of the interlayer insulating film, and ensure enhancement in reliability of the thin film transistor.

It is preferable that the common electrode composed of transparent metal and overlapping the data lines further overlaps an area between the scanning line and the common electrode lines.

The common electrode having such a structure can shield an electric field leaking out of the scanning line, and hence, it would be possible to increase the display area controllable by an electric field to be generated between the pixel electrode and the common electrode, ensuring enhancement in an aperture ratio.

It is preferable that the common electrode composed of transparent metal and overlapping the data lines further overlaps a channel region of the thin film transistor.

The common electrode having such a structure can prevent an electric field from intruding to the thin film transistor from outside thereof, ensuring enhancement in stability in the thin film transistor characteristic and reliability in displaying images.

It is preferable that a storage capacity is formed between the common electrode lines comprised of a first metal layer of which the gate electrode is formed, and a pixel auxiliary electrode comprised of a second metal layer of which the drain electrode is formed.

By forming the common electrode lines comprised of a first metal layer and the pixel auxiliary electrode comprised of a second metal layer, it would be possible to form a storage capacity above and below a pixel, ensuring an increase in a storage capacitance, which further ensures that images can be stably displayed.

It is preferable that the common electrode lines are formed on opposite sides or on either side of the scanning line along the scanning line in a plan view of each of pixels.

By forming the common electrode lines in the above-mentioned manner, a transparent area would be increased by an area occupied by the common electrode, because the common electrode is composed of transparent material. This ensures enhancement in an aperture ration in the in-plane switching mode active matrix type liquid crystal display device. The common electrode lines formed on opposite sides of the scanning line could provide a greater storage capacitor than that of the common electrode lines formed on either side of the scanning line, ensuring that images can be displayed with enhanced stability.

It is preferable that the in-plane switching mode active matrix type liquid crystal display device may further include a light-impermeable layer electrically connected to the common electrode and formed below the data lines in an area where the data lines are not overlapped by both the black matrix layer and the multi-layered color layers, and the common electrode do not overlap the data lines.

The light-impermeable layer prevents light leakage, and hence, prevents disturbance in displaying images.

It is preferable that the gate electrode is comprised of a first metal layer and the drain electrode is comprised of a second metal layer, the first and second metal layers being comprised of one of a chromium layer, an aluminum layer, a titanium layer, a molybdenum layer, a tungsten layer, and a multi-layered film including one or more of these layers.

These metal films ensure reduction in resistance, and enhancement in reliability.

It is preferable that the pixel electrode and the source electrode or the pixel auxiliary electrode formed of a second metal layer are electrically connected to each other through a first contact hole in each of pixels at one of upper and are lower sides when viewed from above, and the common electrode and the common electrode lines formed of a first metal layer are electrically connected to each other through a second contact hole in each of pixels at the other of upper and lower sides when viewed from above.

By electrically connecting the common electrode to the common electrode line through a contact hole in each of pixels, as mentioned above, it would be possible to reduce resistance of the common electrode.

It is preferable that the transparent electrode is composed of Indium-Tin-Oxide (ITO).

Indium-Tin-Oxide (ITO) is quite stable to electrochemical reaction. Hence, the common and pixel electrodes both composed of ITO may be designed to make direct contact with an alignment film, ensuring reliability of the in-plane switching mode active matrix type liquid crystal display device in comparison with a liquid crystal display device including common and pixel electrodes composed of any metal other than ITO.

It is preferable that a storage capacity is formed between the common electrode lines comprised of a first metal layer of which the gate electrode is formed, and a pixel auxiliary electrode comprised of a second metal layer of which the drain electrode is formed.

It is preferable that the in-plane switching mode active matrix type liquid crystal display device further includes an interlayer insulating film formed between the data lines and the common electrode, the interlayer insulating film being comprised of a first film comprised of an inorganic film, and a second film covering the first film therewith and comprised of an organic film, the first film having a thickness equal to or greater than 0.25 $\mu$m.

Even if a pin-hole is generated in the second film between the data lines and the common electrode overlapping the data lines, since the first film comprised of an inorganic film and having a thickness equal to or greater than 0.25 $\mu$m have a sufficient high breakdown voltage, it would be possible to prevent the data lines and the common electrode from short-circuiting to each other due to a dielectric breakdown of an interlayer insulating film formed therebetween, while a panel is being fabricated or images are being displayed. This ensures prevention of defects in the data lines.

It is preferable that the in-plane switching mode active matrix type liquid crystal display device further includes a color layer formed on the first substrate.

It is preferable that the in-plane switching mode active matrix type liquid crystal display device further includes a black matrix layer formed on the first substrate.

By designing the first substrate to have the black matrix layer and/or the color layer, they can be designed to overlap the data lines with an increased accuracy, and accordingly, it would be possible for the black matrix layer and the color layer to have a smaller width, ensuring an increase in an aperture ratio.

It is preferable that the in-plane switching mode active matrix type liquid crystal display device further includes an interlayer insulating film formed between the data lines and the common electrode, the interlayer insulating film including at least an organic film, the black matrix or color layer being covered with the organic film.

The organic film of which the interlayer insulating film is composed prevents impurities contained in the color layer and/or the black matrix layer from dissolving into the liquid crystal layer. This ensures enhancement in reliability of the liquid crystal display device.

It is preferable that the in-plane switching mode active matrix type liquid crystal display device further includes an interlayer insulating film formed between the data lines and the common electrode, the interlayer insulating film being comprised of a first film comprised of an inorganic film, and a second film covering the first film therewith and comprised of an organic film, the color or black matrix layer being sandwiched between the first and second films.

The organic film of which the interlayer insulating film is composed prevents impurities contained in the color layer and/or the black matrix layer from dissolving into the liquid crystal layer, and further prevents the first substrate from being influenced by movement of electric charges and/or ions in the color layer. This ensures enhancement in reliability of the liquid crystal display device.

It is preferable that the in-plane switching mode active matrix type liquid crystal display device further includes an interlayer insulating film formed between the data lines and the common electrode, the interlayer insulating film being comprised of a first film comprised of an inorganic film, and a second film covering the first film therewith and comprised of an organic film, the color or black matrix layer being sandwiched between the first and second films.

There is further provided an in-plane switching mode active matrix type liquid crystal display device includes (a) a first substrate, (b) a second substrate located opposing the first substrate, and (c) a liquid crystal layer sandwiched between the first and second substrates, wherein the first substrate includes (a 1) a thin film transistor having a gate electrode, a drain electrode and a source electrode, (a2) a pixel electrode each associated to a pixel to be driven, (a3) a common electrode to which a reference voltage is applied, (a4) data lines, (a5) a scanning line, and (a6) common electrode lines. The gate electrode is electrically connected to the scanning line, the drain electrode is electrically connected to the data lines, the source electrode is electrically connected to the pixel electrode, and the common electrode is electrically connected to the common electrode lines. The pixel electrode is in a zigzag form and almost equally spaced away from adjacent ones, and the common electrode is in a zigzag form and almost equally spaced away from adjacent ones. Two-directional electric fields almost parallel with a surface of the first substrate are applied across the pixel electrode and the common electrodes. The in-plane switching mode active matrix type liquid crystal display device includes a first sub pixel area to which an electric field having a first direction is applied and in which molecular axes of liquid crystal in the liquid crystal layer are rotated in a first rotational direction in a plane parallel with a surface of the first substrate, and a second sub pixel area to which an electric field having a second direction is applied and in which the molecular axes are rotated in a second rotational direction which is different from the first rotational direction, in a plane parallel with a surface of the first substrate. The common electrode is composed of transparent material, and is formed on a layer located closer to the liquid crystal layer than the data lines. The common electrode entirely overlaps the data lines with an insulating layer being sandwiched therebetween except an area where the data lines are located in the vicinity of the scanning line. The in-plane switching mode active matrix type liquid crystal display device further includes a light-impermeable layer in an area where the common electrode entirely overlaps the data lines. The light-impermeable layer is formed on the second substrate or on the first substrate such that the light-impermeable layer and the liquid crystal layer are located at the same side with respect to the data lines and that the light-impermeable layer faces the data lines. The light-impermeable layer is comprised of a black matrix layer or multi-layered color layers. The black matrix layer or the multi-layered color layers has a width smaller than a width of the common electrode overlapping the data lines, and the data lines extends in a zigzag along the pixel electrode.

The above-mentioned in-plane switching mode active matrix type liquid crystal display device can be obtained by applying the first mentioned in-plane switching mode active matrix type liquid crystal display device to a so-called multi-domain in-plane switching mode active matrix type liquid crystal display device. The above-mentioned in-plane switching mode active matrix type liquid crystal display device can accomplish the above-mentioned first to third objects also in a multi-domain in-plane switching mode active matrix type liquid crystal display device.

For instance, the data lines, the common electrode and the pixel electrode are bent by one in each of pixels.

It would be possible to maximize an aperture ratio by setting the number of bends equal to one in the data lines, the common electrode and the pixel electrode.

For instance, the data lines, the common electrode and the pixel electrode are bent by an odd number equal to or greater than 3 in each of pixels.

By setting the number of bends equal to an odd number, it would be possible to equalize a region where liquid crystal molecules are twisted in a clockwise direction to a region where liquid crystal molecules are twisted in a counterclockwise direction in both an area and the number, ensuring enhancement in symmetry in a viewing angle.

It is preferable that the data lines, the common electrode and the pixel electrode are bent by N in each of pixels, the N being defined in accordance with the equation (A):

$$30[\mu m] \leq L/(N+1)[\mu m] \leq 40[\mu m] \quad (A)$$

wherein L indicates a length of an opening.

The smaller the number of bends in the data lines, the common electrode and the pixel electrode is, greater an aperture ratio is. However, bending patterns could be seen, if the number of bends is small. It is preferable that the black matrix layer is formed following the bend of the data lines, the common electrode and the pixel electrode, but it would be more difficult to pattern the black matrix layer, if the data lines, the common electrode and the pixel electrode are bent in a smaller number. In contrast, as the data lines, the common electrode and the pixel electrode are bent in a greater number, a bending pattern looks like a line, and hence, the black matrix could be formed more linear and thinner. However, greater the number of bends, the smaller an aperture ratio is. Taking these into consideration, the above-mentioned equation (A) provides the optimal number of bends in the data lines, the common electrode and the pixel electrode.

It is preferable that the black matrix layer facing the data lines is formed in a line.

It would be easiest to form the black matrix layer in a line.

As an alternative, the black matrix layer facing the data lines may be formed in a zigzag, in which case, it is preferable that the black matrix layer facing the data lines is bent in line with the data lines.

It would be possible to enhance an aperture ratio in the liquid crystal display device by forming the black matrix layer in a zigzag in line with a zigzag shape of the data lines.

It is preferable that a distance along a substrate between one of ends of the black matrix layer facing the data lines and an end of the data lines, located opposite to the one of ends of the black matrix layer, is equal to or greater than 4 $\mu$m in a cross-section taken along a plane perpendicular to a direction in which the data lines extend.

By setting the above-mentioned distance equal to or greater than 4 $\mu$m, it would be possible to prevent a leaked light obliquely coming at an end of the black matrix layer, from directly entering the data lines.

It is preferable that the black matrix layer is formed on the second substrate, and the black matrix layer facing the data lines overlaps the data lines anywhere by 4 $\mu$m or greater, when viewed from above.

By designing the black matrix layer to overlap the data lines anywhere by 4 $\mu$m or greater, it would be possible to prevent a leaked light obliquely coming at an end of the black matrix layer, from directly entering the data lines.

It is preferable that the first or second substrate is comprised further of a color layer formed in a line.

The color layer could be formed most easily in a line.

It is preferable that one of the first and second substrates is comprised further of a color layer formed in a zigzag.

Though it might be slightly more difficult to form a zigzag-shaped color layer than a linear color layer, a zigzag-shaped color layer matches in shape with a zigzag-shaped data line formed on the first substrate, ensuring enhancement in a rate at which a light is used.

It is preferable that the color layer is bent in line with the data lines.

By forming the color layer bent in line with the data lines, an aperture ratio could be increased.

It is preferable that the in-plane switching mode active matrix type liquid crystal display device further includes a reverse-rotation preventing structure in a sub pixel area in which all liquid crystal molecules are rotated in the same direction, for preventing liquid crystal molecules from rotating in a direction opposite to the same direction. The reverse-rotation preventing structure includes an auxiliary electrode to which a voltage equal to a voltage of at least one of the pixel electrode and the common electrode is applied such that an initial alignment orientation of liquid crystal molecules overlaps a direction of an electric field generated in the sub pixel area in all sub-areas in the sub pixel areas, if the initial alignment orientation rotates by an acute angle.

It would be possible to stabilize alignment of liquid crystal molecules and ensure clearer images to be displayed, by forming a pixel auxiliary electrode and a common auxiliary electrode between a sub pixel area in which liquid crystal molecules are twisted in a clockwise direction and a sub pixel area in which liquid crystal molecules are twisted in a counter-clockwise direction. Both of the pixel auxiliary electrode and the common auxiliary electrode stabilize a boundary of those sub pixel areas.

It is preferable that the in-plane switching mode active matrix type liquid crystal display device further includes an isolated floating electrode composed of a layer of which both the gate electrode and the drain electrode are composed. The isolated floating electrode overlaps the common or pixel electrode at bending portions of the zigzag-shaped common or pixel electrode with the insulating layer being sandwiched therebetween, and has an extension extending in a direction in which the bending portions project, along an boundary between the first and second sub pixel areas.

In an area in which the above-mentioned auxiliary electrode is difficult to form, the formation of the isolated floating electrode would make it possible to stably control domain. In general, when a display screen is pushed, there leaves a trace behind due to movement of domains. The formation of the isolated floating electrode prevents such a trace from leaving behind, even if a display screen is pushed, ensuring stabilization of display.

It is preferable that the zigzag-shaped data lines include linear portions inclining towards the left and right from a direction in which the data lines extend.

It is preferable the black matrix layer is formed on the second substrate, and the black matrix layer facing the data lines and formed in a line has a width greater anywhere than a minimum width Dmin defined by the following equation:

$$D\text{min}=D+LS\times\tan\theta-(D-8)\times 2[\mu m]$$

wherein D indicates a width of the data lines, LS indicates a length obtained when the linear portions are projected towards the direction in which the data lines extend, and θ indicates an angle formed between the direction in which the data lines extend and the linear portions.

The above-mentioned equation makes it possible to theoretically define a minimum width of the black matrix layer.

It is preferable the zigzag-shaped data lines includes first linear portions extending in parallel with a direction in which the data lines extend, and second linear portions inclining towards the left and right from the direction in which the data lines extend.

The first linear portions extending in parallel with a direction in which the data lines extend makes it possible to reduce a width of the black matrix layer necessary for preventing a light from obliquely leaking, which light would be a problem when a linear black matrix layer is formed on the second substrate.

It is preferable the in-plane switching mode active matrix type liquid crystal display device further includes coverages which are fit into recessions formed at bending portions of the zigzag-shaped data lines.

Such coverages make it possible to reduce a width of the black matrix layer necessary for preventing a light from obliquely leaking, which light would be a problem when a linear black matrix layer is formed on the second substrate.

The in-plane switching mode active matrix type liquid crystal display device may further include a floating light-impermeable film composed of opaque metal, the floating light-impermeable film overlapping the data lines at recessions of bending portions of the data lines.

It is preferable the in-plane switching mode active matrix type liquid crystal display device further includes a projection projecting from a bending portion of each of the zigzag-shaped common electrode overlapping the zigzag-shaped data lines.

When liquid crystal molecules are rotated in two directions by electric fields generated between the common electrode overlapping the data line and the pixel electrode located adjacent to the common electrode, the above-mentioned projection would stabilize domains at a boundary between regions in which liquid crystal molecules rotate in two directions.

It is preferable that a storage capacity is formed between the pixel electrode comprised of the second metal layer of which the drain electrode is formed, and the common electrode lines comprised of the first metal layer of which the gate electrode is formed.

This ensures that a storage capacity of the liquid crystal layer is increased, and images can be stably displayed.

There is still further provided an in-plane switching mode active matrix type liquid crystal display device includes (a) a first substrate, (b) a second substrate located opposing the first substrate, and (c) a liquid crystal layer sandwiched between the first and second substrates, wherein the first substrate includes (a1) a thin film transistor having a gate electrode, a drain electrode and a source electrode, (a2) a pixel electrode each associated to a pixel to be driven, (a3) a common electrode to which a reference voltage is applied, (a4) data lines, (a5) a scanning line, and (a6) common electrode lines. The gate electrode is electrically connected to the scanning line, the drain electrode is electrically connected to the data lines, the source electrode is electrically connected to the pixel electrode, and the common electrode is electrically connected to the common electrode lines. The pixel electrode is in a zigzag form and almost equally spaced away from adjacent ones. The common electrode is in a zigzag form and almost equally spaced away from adjacent ones. Two-directional electric fields almost parallel with a surface of the first substrate are applied across the pixel electrode and the common electrode. The in-plane switching mode active matrix type liquid crystal display device includes a first sub pixel area to which an electric field having a first direction is applied and in which molecular axes of liquid crystal in the liquid crystal layer are rotated in a first rotational direction in a plane parallel with a surface of the first substrate, and a second sub pixel area to which an electric field having a second direction is applied and in which the molecular axes are rotated in a second rotational direction which is different from the first rotational direction, in a plane parallel with a surface of the first substrate. An opening of the first substrate extends in a direction perpendicular to a direction in which the data lines extend. The common electrode is composed of transparent material, and is formed on a layer located closer to the liquid crystal layer than the data lines. The common electrode entirely overlaps the data lines with an insulating layer being sandwiched therebetween except an area where the data lines are located in the vicinity of the scanning line. The common electrode is electrically connected to the common electrode lines through a contact hole in each of pixels. The in-plane switching mode active matrix type liquid crystal display device further includes a light-impermeable layer in an area where the common electrode entirely overlaps the data lines. The light-impermeable layer is formed on the second substrate or on the first substrate such that the light-impermeable layer and the liquid crystal layer are located at the same side with respect to the data lines and that the light-impermeable layer faces the data lines. The light-impermeable layer is comprised of a black matrix layer or multi-layered color layers. The black matrix layer or the multi-layered color layers has a width smaller than a width of the common electrode overlapping the data lines. The data lines extend in a lines. A gate line which constitutes the gate electrode extends in a zigzag.

In a liquid crystal display device where an opening of the first substrate extends in a direction in which the data line extends, it is preferable to pour liquid crystal into a space formed between the first and second substrates, in a direction in which the data line extends. In contrast, in a liquid crystal display device where an opening of the first substrate extends in a direction perpendicular to a direction in which the data line extends, such as the above-mentioned liquid crystal display device, it is preferable to pour liquid crystal into a space formed between the first and second substrates, in a direction perpendicular to a direction in which the data line extends. Thus, it would be possible to select a direction in which liquid crystal is poured into a space, in dependence on a direction in which an opening in a liquid crystal display device extends.

There is yet further provided an in-plane switching mode active matrix type liquid crystal display device including (a) a first substrate, (b) a second substrate located opposing the first substrate, and (c) a liquid crystal layer sandwiched between the first and second substrates, wherein the first substrate includes (a1) a thin film transistor having a gate electrode, a drain electrode and a source electrode, (a2) a pixel electrode each associated to a pixel to be driven, (a3) a common electrode to which a reference voltage is applied, (a4) data lines, (a5) a scanning line, and (a6) common electrode lines. The gate electrode is electrically connected to the scanning line, the drain electrode is electrically connected to the data lines, the source electrode is electrically connected to the pixel electrode, and the common electrode is electrically connected to the common electrode lines. The pixel electrode is in a zigzag form and almost equally spaced away from adjacent ones. The common electrode is in a zigzag form and almost equally spaced away from adjacent ones. Two-directional electric fields almost parallel with a surface of the first substrate is applied across the pixel electrode and the common electrode. The in-plane switching mode active matrix type liquid crystal display device includes a first sub pixel area to which an electric field having a first direction is applied and in which molecular axes of liquid crystal in the liquid crystal layer are rotated in a first rotational direction in a plane parallel with a surface of the first substrate, and a second sub pixel area to which an electric field having a second direction is applied and in which the molecular axes are rotated in a second rotational direction which is different from the first rotational direction, in a plane parallel with a surface of the first substrate. An isolated floating electrode formed of a layer of which the gate electrode or the drain electrode is formed overlaps the common electrode or the pixel electrode at bending portions of the zigzag-shaped common or pixel electrode with an insulating film being sandwiched therebetween. At least one of the common and pixel electrodes have a projection projecting from bending portions of the zigzag-shaped common and pixel electrodes in a direction in which the bending portions project, along a boundary between the first and second sub pixel areas.

In an area where the above-mentioned auxiliary electrode is hard to be formed, it would be possible to stabilize alignment of liquid crystal molecules in the liquid crystal layer by forming the floating electrode.

In another aspect of the present invention, there is provided an electronic device including one of the above-mentioned in-plane switching mode active matrix type liquid crystal display devices.

By designing a liquid crystal display panel to include one of the above-mentioned in-plane switching mode active matrix type liquid crystal display devices, the liquid crystal display panel could have an increased aperture ratio in a display area, ensuring enhancement in a brightness in the display area.

In still another aspect of the present invention, there is provided a method of fabricating an in-plane switching mode active matrix type liquid crystal display device including (a) a first substrate, (b) a second substrate located opposing the first substrate, and (c) a liquid crystal layer sandwiched between the first and second substrates, wherein the first substrate includes (a1) a thin film transistor having a gate electrode, a drain electrode and a source electrode, (a2) a pixel electrode each associated to a pixel to be driven, (a3) a common electrode to which a reference voltage is applied, (a4) data lines, (a5) a scanning line, (a6) common electrode lines, (a7) a data line terminal, (a8) a scanning line terminal, and (a9) a common electrode line. The gate electrode is electrically connected to the scanning line, the drain electrode is electrically connected to the data lines, the source electrode is electrically connected to the pixel electrode, and the common electrode is electrically connected to the common electrode lines, and molecular axes of liquid crystal in the liquid crystal layer are rotated in a plane parallel with the first substrate by an electric field substantially parallel with a plane of the first substrate and to be applied between the pixel electrode and the common electrode, to thereby display certain images. The method includes the steps of (a) forming the thin film transistor, the data lines, the scanning line and the common electrode line, and thereafter, forming an interlayer insulating film thereover, (b) etching the interlayer insulating film to form contact holes reaching the data lines, the scanning line and the common electrode line, (c) deposit transparent metal all over a product resulted from the step (b) to cover inner surfaces of the contact holes with the transparent metal, thereby forming the data line terminal, the scanning line terminal and the common electrode line terminal, and (d) etching the transparent metal to form the common electrode such that the common electrode overlaps the data lines.

It is preferable that the transparent metal is etched in the step (d) further for forming the pixel electrode.

It is preferable that the step (b) includes the step of forming a second contact hole reaching the source electrode of the thin film transistor, and the step (c) includes the step of covering an inner surface of the second contact hole with the transparent metal.

It is preferable that the step (b) includes the step of forming a third contact hole reaching the common electrode lines, the step (c) includes the step of covering an inner surface of the third contact hole with the transparent metal, and the step (d) includes the step of etching the transparent metal to electrically connect the common electrode to the third contact hole.

There is further provided a method of fabricating an in-plane switching mode active matrix type liquid crystal display device including (a) a first substrate, (b) a second substrate located opposing the first substrate, and (c) a liquid crystal layer sandwiched between the first and second substrates, wherein the first substrate includes (a1) a thin film transistor having a gate electrode, a drain electrode and a source electrode, (a2) a pixel electrode each associated to a pixel to be driven, (a3) a common electrode to which a reference voltage is applied, (a4) data lines, (a5) a scanning line, and (a6) common electrode lines. The gate electrode is electrically connected to the scanning line, the drain electrode is electrically connected to the data lines, the source electrode is electrically connected to the pixel electrode, and the common electrode is electrically connected to the common electrode lines. The pixel electrode is in a zigzag form and almost equally spaced away from adjacent ones. The common electrode is in a zigzag form and almost equally spaced away from adjacent ones. Two-directional electric fields almost parallel with a surface of the first substrate are applied across the pixel electrode and the common electrode. The in-plane switching mode active matrix type liquid crystal display device includes a first sub pixel area to which an electric field having a first direction is applied and in which molecular axes of liquid crystal in the liquid crystal layer are rotated in a first rotational direction in a plane parallel with a surface of the first substrate, and a second sub pixel area to which an electric field having a second direction is applied and in which the molecular axes are rotated in a second rotational direction which is different from the first rotational direction, in a plane parallel with a surface of the first substrate. The method includes the steps of (a) forming the thin film transistor, the data lines, the scanning line and the common electrode line, and thereafter, forming an interlayer insulating film thereover, (b) etching the interlayer insulating film to form contact holes reaching the data lines, the scanning line and the common electrode line, (c) deposit transparent metal all over a product resulted from the step (b) to cover inner surfaces of the contact holes with the transparent metal, thereby forming the data line terminal, the scanning line terminal and the common electrode line terminal, and (d) etching the transparent metal to form the common electrode such that the common electrode overlaps the data lines.

The advantages obtained by the aforementioned present invention will be described hereinbelow.

In accordance with the above-mentioned present invention, the following objects of the present invention can be accomplished:

(a) to provide an in-plane switching mode liquid crystal display device which is capable of preventing occurrence of vertical cross-talk without reduction in an aperture ratio;

(b) to reduce a resistance of common electrode in an in-plane switching mode liquid crystal display device in which data lines are covered with the common electrode composed transparent material;

(c) to reduce a light-impermeable film such as a black matrix layer which was used in a conventional in-plane switching mode liquid crystal display device for preventing vertical cross-talk caused by a leaking electric field, from appearing in a display screen while images are displayed in the display screen;

(d) to provide an in-plane switching mode liquid crystal display device in which transparent electrodes can be fabricated with low cost.

(e) to provide an in-plane switching mode liquid crystal display device in which a data line is almost entirely covered with a common electrode without an increase in a parasitic capacity to be formed between the data line and the common electrode; and (f) to provide a reliable transparent material used for shielding a data line therewith in an in-plane switching mode liquid crystal display device.

In addition, the present invention can solve various problems relating to the above-mentioned matters.

It was found out in view of the results of the experiments having been conducted by the inventors that the in-plane switching mode liquid crystal display device in accordance with the later mentioned first embodiment, for instance, could increase an aperture ratio by 30–40% in comparison with the conventional liquid crystal display device illustrated in FIG. 1.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIGS. 28A to 28K are cross-sectional views of the in-plane switching mode liquid crystal display device in accordance with the first embodiment, illustrating respective steps in a first example of the method of fabricating the same.

FIGS. 29A to 29I are cross-sectional views of the in-plane switching mode liquid crystal display device in accordance with the first embodiment, illustrating respective steps in a second example of the method of fabricating the same.

FIGS. 30A to 30I are cross-sectional views of the in-plane switching mode liquid crystal display device in accordance with the first embodiment, illustrating respective steps in a third example of the method of fabricating the same.

FIGS. 33A to 33J are cross-sectional views of the in-plane switching mode liquid crystal display device in accordance with the first embodiment, illustrating respective steps in a first example of the method of fabricating the in-plane switching mode liquid crystal display device together with the terminals.

FIGS. 34A to 34I are cross-sectional views of the in-plane switching mode liquid crystal display device in accordance with the first embodiment, illustrating respective steps in a second example of the method of fabricating the in-plane switching mode liquid crystal display device together with the terminals.

FIGS. 35A to 35H are cross-sectional views of the in-plane switching mode liquid crystal display device in accordance with the first embodiment, illustrating respective steps in a third example of the method of fabricating the in-plane switching mode liquid crystal display device together with the terminals.

DESCRIPTION OF THE PREFERRED EMBODIMENTS

Preferred embodiments in accordance with the present invention will be explained hereinbelow with reference to drawings.

[First Embodiment]

Figure 1:
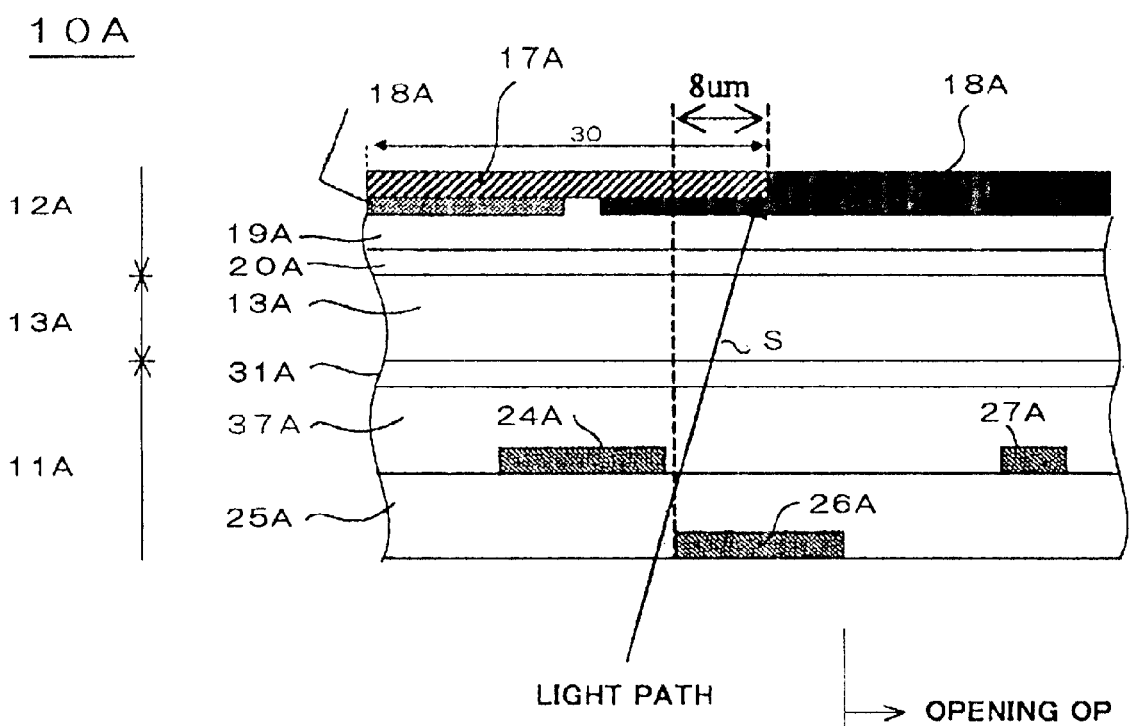
FIG. 1 is a partial cross-sectional view of a conventional liquid crystal display device.
Figure 2:
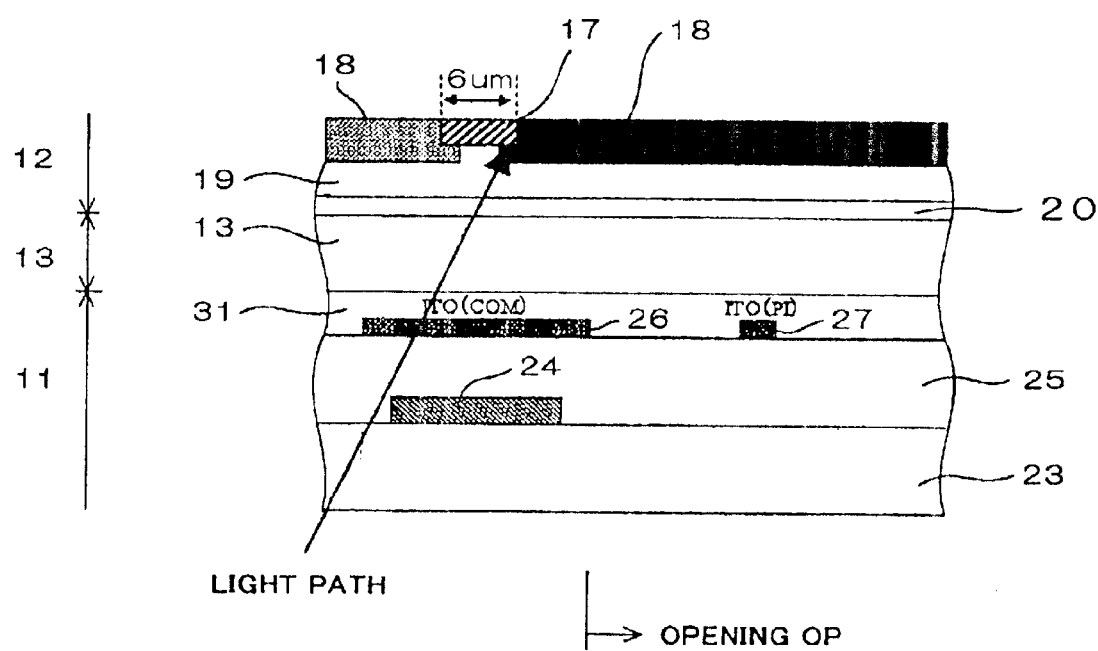
FIG. 2 is a partial cross-sectional view of the in-plane switching mode liquid crystal display device in accordance with the present invention.
Figure 3:
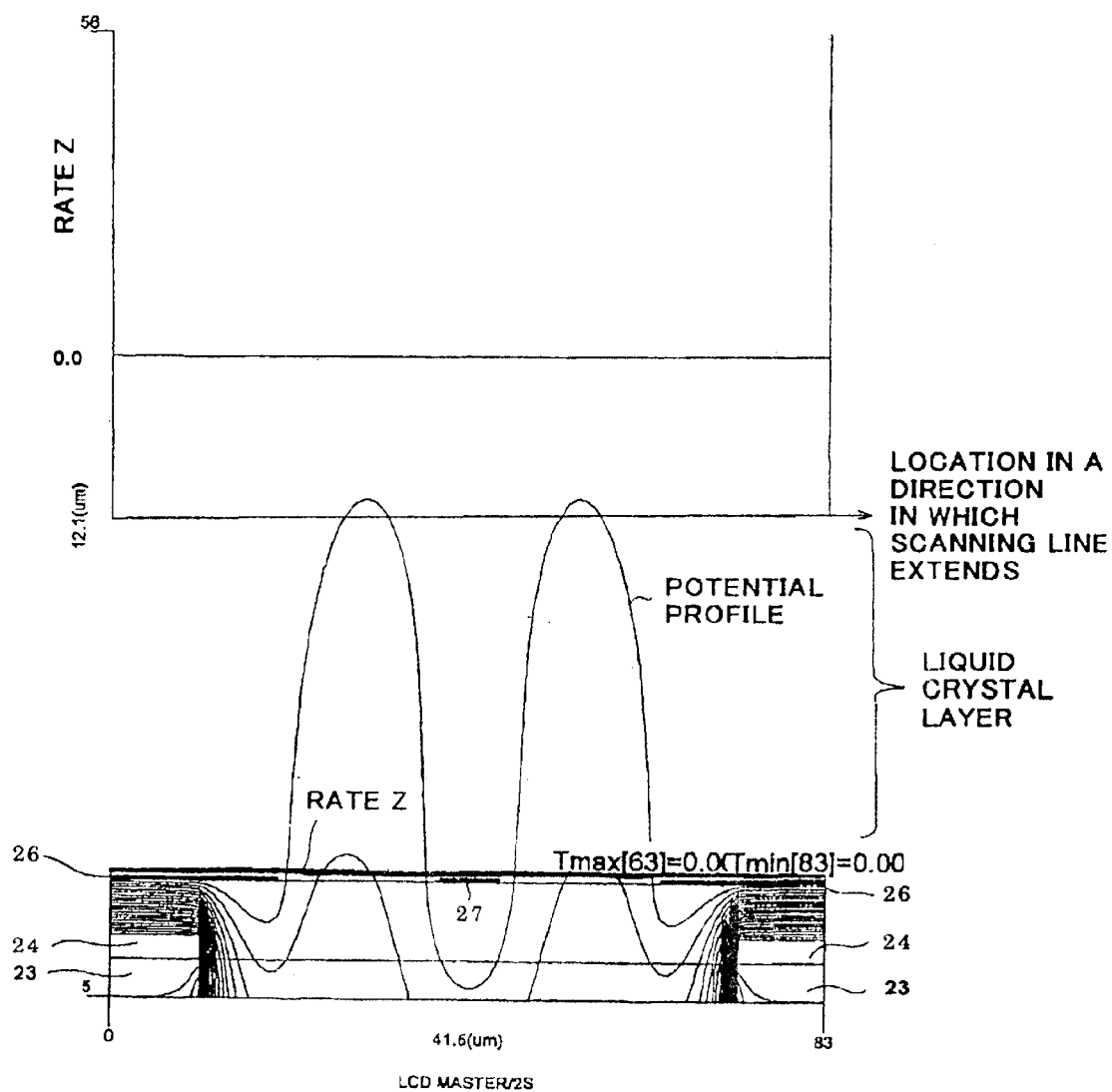
FIG. 3 is a graph showing the results of simulation for showing the function of shielding a leaking electric field, obtained by the in-plane switching mode liquid crystal display device in accordance with the present invention.
Figure 4:
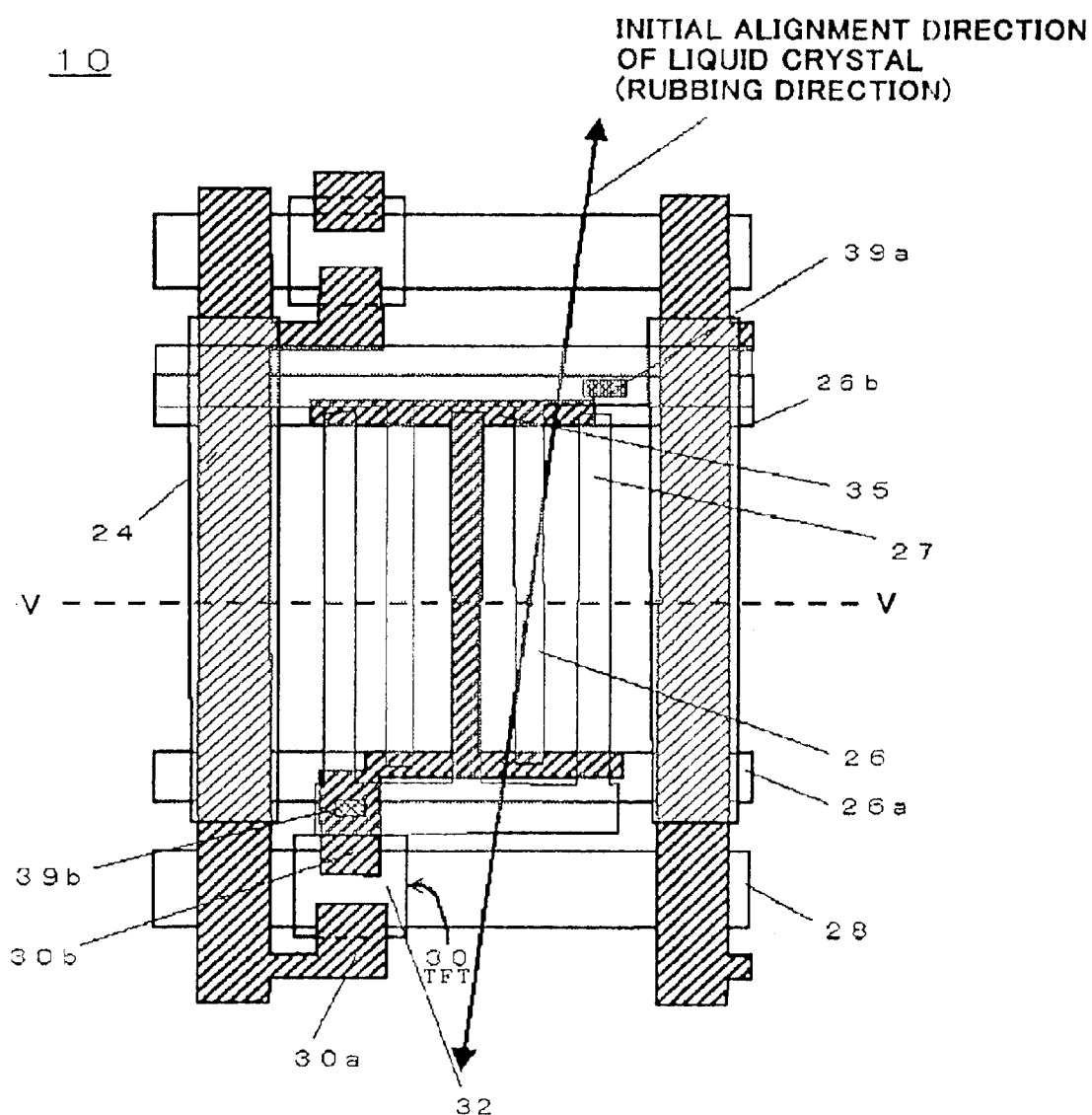
FIG. 4 is a plan view of the in-plane switching mode liquid crystal display device in accordance with the first embodiment of the present invention.
Figure 5:
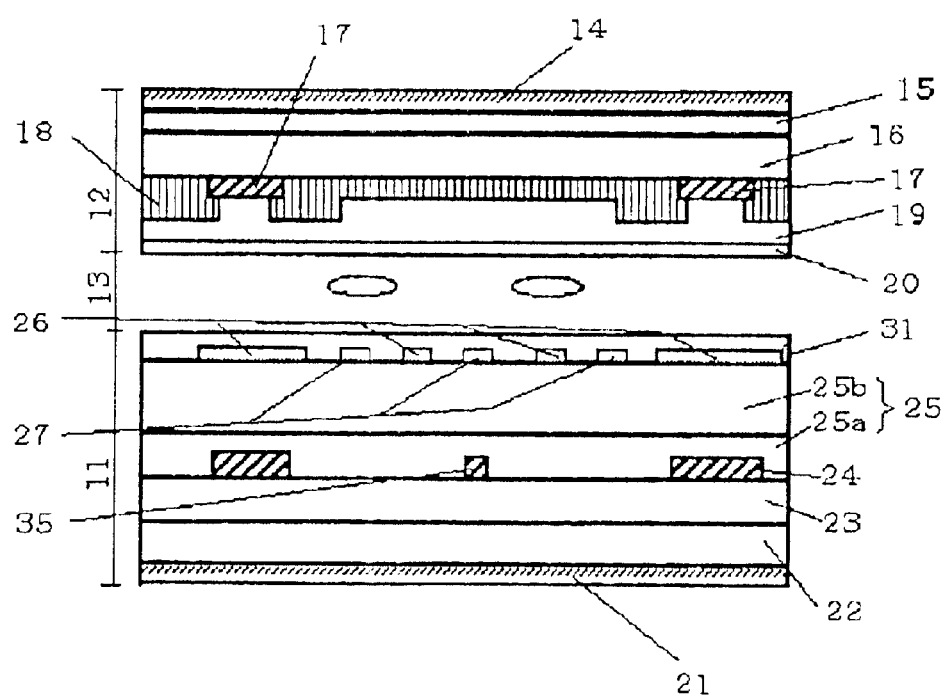
FIG. 5 is a cross-sectional view taken along the line V—V in FIG. 4.
Figure 6:
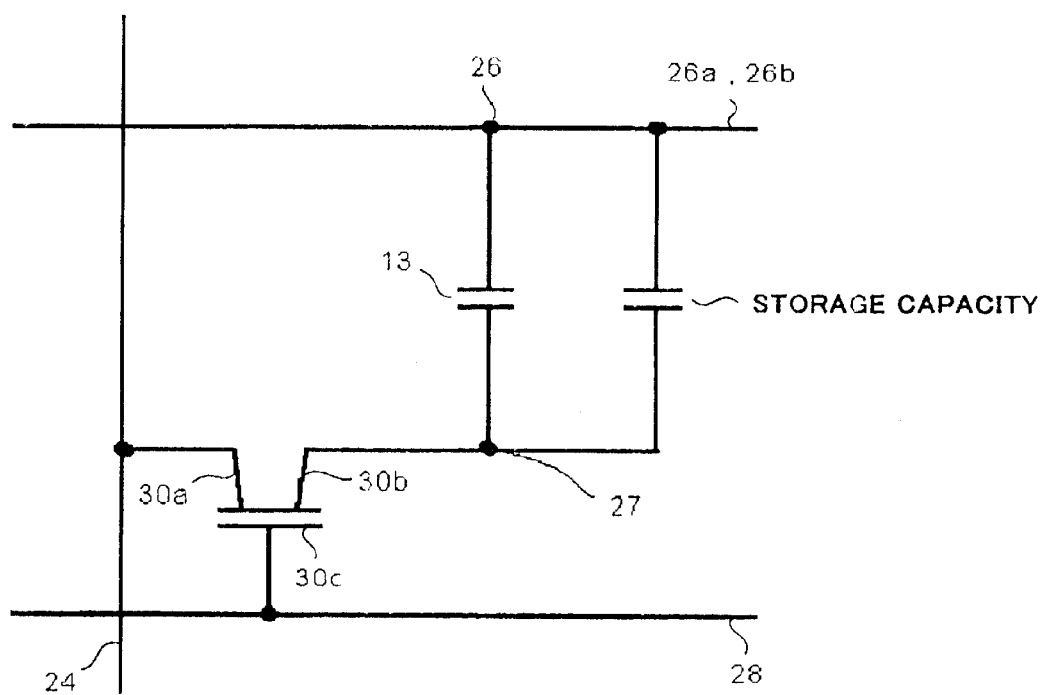
FIG. 6 is a circuit diagram of a unit pixel in the in-plane switching mode liquid crystal display device in accordance with the first embodiment.

FIGS. 4, 5 and 6 illustrate an in-plane switching mode active matrix type liquid crystal display device in accordance with the first embodiment of the present invention. FIG. 4 is a plan view of the liquid crystal display device 10 in accordance with the first embodiment, FIG. 5 is a cross-sectional view taken along the line V—V in FIG. 4, and FIG. 6 is a circuit diagram of a unit pixel.

As illustrated in FIG. 5, the liquid crystal display device 10 is comprised of an active device substrate 11, an opposing substrate 12, and a liquid crystal layer 13 sandwiched between the active device substrate 11 and the opposing substrate 12.

The opposing substrate 12 includes an electrically insulating transparent substrate 16, a black matrix layer 17 formed on a first surface of the electrically insulating transparent substrate 16 as a light-impermeable film, a color layer 18 formed on the first surface of the electrically insulating transparent substrate 16 such that the color layer 18 partially overlaps the black matrix layer 17, and a transparent overcoating layer 19 covering the black matrix layer 17 and the color layer 18 therewith.

The color layer 18 is comprised of resin films containing red (R), green (G) and blue (B) pigments.

The opposing substrate 12 further includes an electrically conductive transparent layer 15 on a second surface of the electrically insulating transparent substrate 16 in order to prevent electric charges caused by contact of a liquid crystal display panel with other materials, from exerting electrical influence on the liquid crystal layer 13.

The active matrix substrate 11 includes an electrically insulating transparent substrate 22, a first metal layer formed on the electrically insulating transparent substrate 22 and defining a scanning line 28 (see FIG. 4) and a gate electrode 30c (see FIG. 6) therein, a first interlayer insulating film 23 formed on the electrically insulating transparent substrate 22, an island-shaped amorphous silicon film formed on the first interlayer insulating film 23, a second metal layer defining a data line 24, and a source electrode 30b and a drain electrode 30a of a thin film transistor 30 therein, a first film 25a formed on the first interlayer insulating film 23, a second film 25b formed on the first film 25a, and a common electrode 26 and a pixel electrode 27 formed as transparent electrodes on the second film 25b.

The first and second films 25a and 25b constitute a second electrically insulating film 25.

Figure 8:
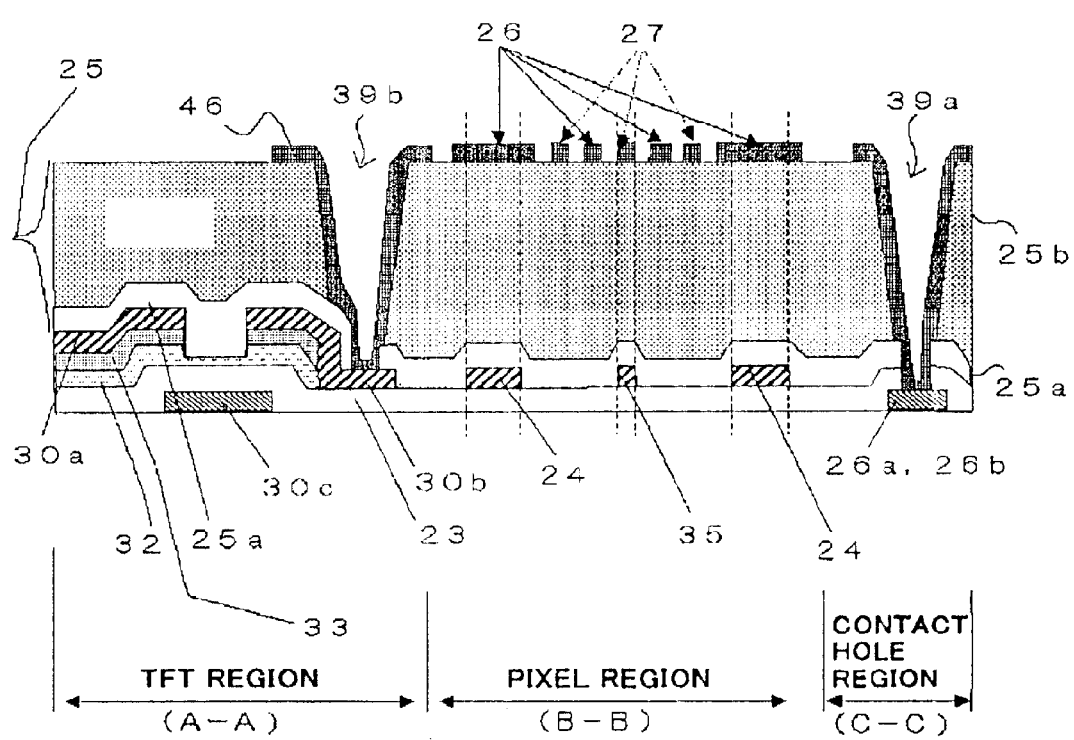
FIG. 8 is a cross-sectional view taken along the lines A—A, B—B and C—C in the in-plane switching mode liquid crystal display device illustrated in FIG. 10 wherein the second interlayer insulating film has a multi-layered structure.

The active matrix substrate 11 further includes a pixel auxiliary electrode 35 formed on the first interlayer insulating film 23 together with the data lines 24 (see FIG. 8). The data lines 24 and the pixel auxiliary electrode 35 are composed of the second metal layer.

In the specification, an "upper" layer means a layer located closer to the liquid crystal layer 13, and a "lower" layer means a layer located more remote from the liquid crystal layer 13 in both the active device substrate 11 and the opposing substrate 12.

The active device substrate 11 and the opposing substrate 12 include alignment films 31 and 32, respectively, both making contact with the liquid crystal layer 13. As illustrated in FIG. 4, the alignment films 31 and 32 are rubbed such that the liquid crystal layer 13 is homogeneously aligned in a direction inclined from a direction in which the common electrode 27 and the pixel electrode 26 extend, by an angle in the range of 10 to 30 degrees, and then, adhered to the active device substrate 11 and the opposing substrate 12, respectively, such that they face each other. The above-mentioned angle is called initial alignment orientation of liquid crystal molecules.

Though not illustrated, spacers are sandwiched between the active device substrate 11 and the opposing substrate 12 to ensure a thickness of the liquid crystal layer 13, and a seal is formed around the liquid crystal layer 13 between the active device substrate 11 and the opposing substrate 12 for avoiding leakage of liquid crystal molecules.

The active device substrate 11 further includes a polarizing plate 21 formed on a lower surface of the electrically insulating transparent substrate 22, and similarly, the opposing substrate 12 includes a polarizing plate 14 formed on the electrically conductive layer 15. The polarizing plate 21 of the active device substrate 11 has a polarization axis extending perpendicularly to the liquid crystal initial alignment direction, and the polarizing plate 14 of the opposing substrate 12 has a polarization axis extending in parallel to the liquid crystal initial alignment direction. The polarization axes extend perpendicularly to each other.

As illustrated in FIG. 4, the active device substrate 11 includes data lines 24 to which data signals are transmitted, common electrode lines 26a and 26b to which a reference voltage is applied, a common electrode 26 to which the reference voltage is applied, a pixel electrode 27 associated with pixels in which images are to be displayed, a scanning line 28 to which a scanning signal is applied, and a thin film transistor (TFT) 30.

The thin film transistor 30 includes a gate electrode 30c (see FIG. 8), a drain electrode 30a, and a source electrode 30b. The thin film transistor 30 is located in the vicinity of an intersection of the scanning line 28 and the data line 24 in association with a pixel. The gate electrode 30c is electrically connected to the scanning line 28, the drain electrode 30a is electrically connected to the data line 24, and the source electrode 30b is electrically connected to the pixel electrode 27.

Both the common electrode 26 and the pixel electrode 27 are designed to have a comb-teeth shape, and the comb-teeth in the common electrode 26 and the pixel electrode 27 extend in parallel with the data lines 24. The comb-teeth of the common electrode 26 and the comb-teeth of the pixel electrode 27 are arranged to be in mesh with each other, and further spaced away from each other.

As illustrated in FIG. 4, the common electrode 26 formed as transparent electrodes are electrically connected to the common electrode line 26b through a contact hole 39a.

Figure 7:
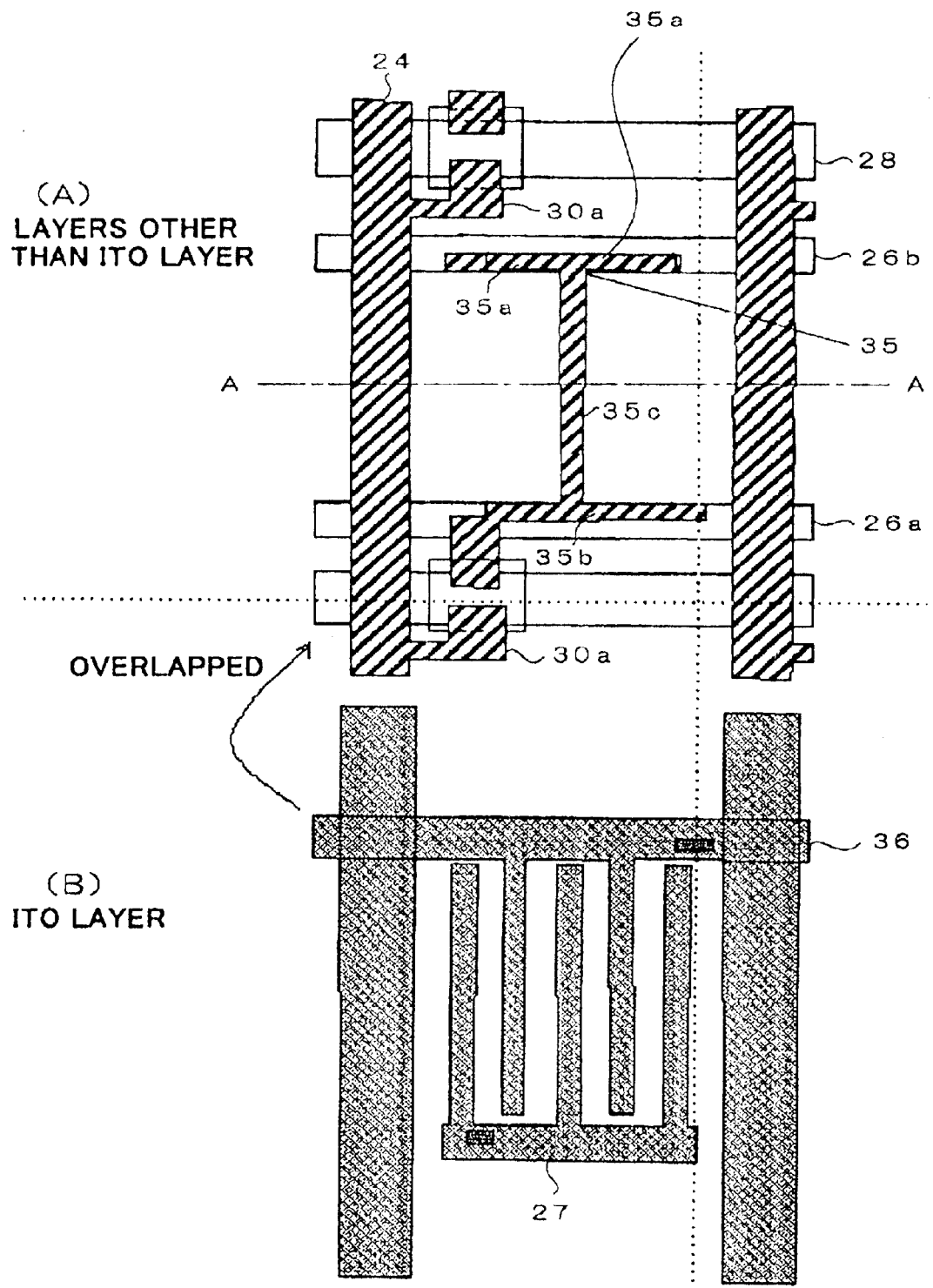
FIG. 7 is a partial plan view of a variant of the in-plane switching mode liquid crystal display device in accordance with the first embodiment.

FIG. 7 separately illustrates layer (B) defining a transparent electrode of which the common and pixel electrodes 26 and 27 are composed, and layers (A) other than the above-mentioned layer (B), among the layers in the liquid crystal display device 10 illustrated in FIG. 4. In view of FIG. 7, it is understood that no light-impermeable films exist between the common electrode 26 overlapping the data lines 24 and the pixel electrode 27 located adjacent to the common electrode 26, when viewed on a plan view.

Figure 9:
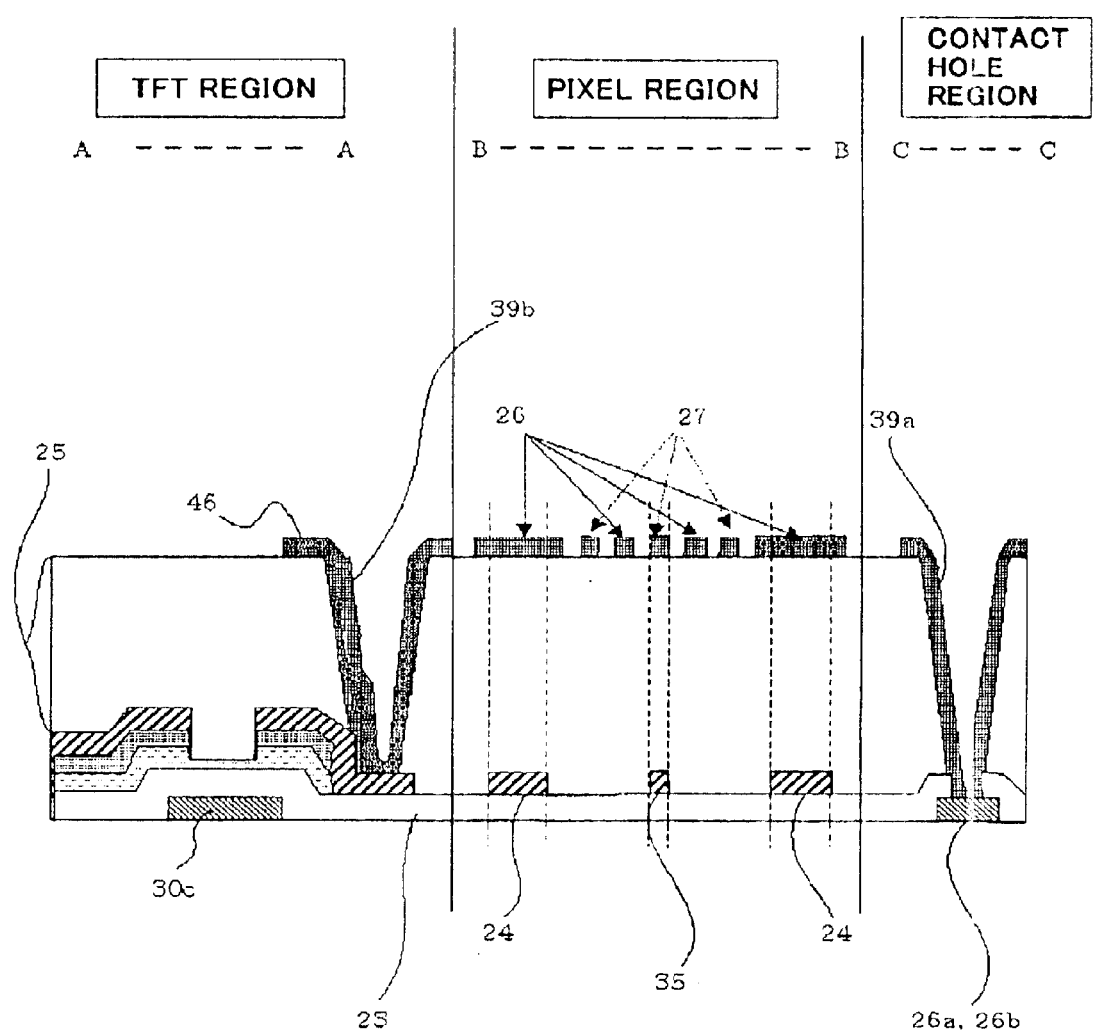
FIG. 9 is a cross-sectional view taken along the lines A—A, B—B and C—C in the in-plane switching mode liquid crystal display device illustrated in FIG. 10 wherein the second interlayer insulating film has a single-layered structure.
Figure 10:
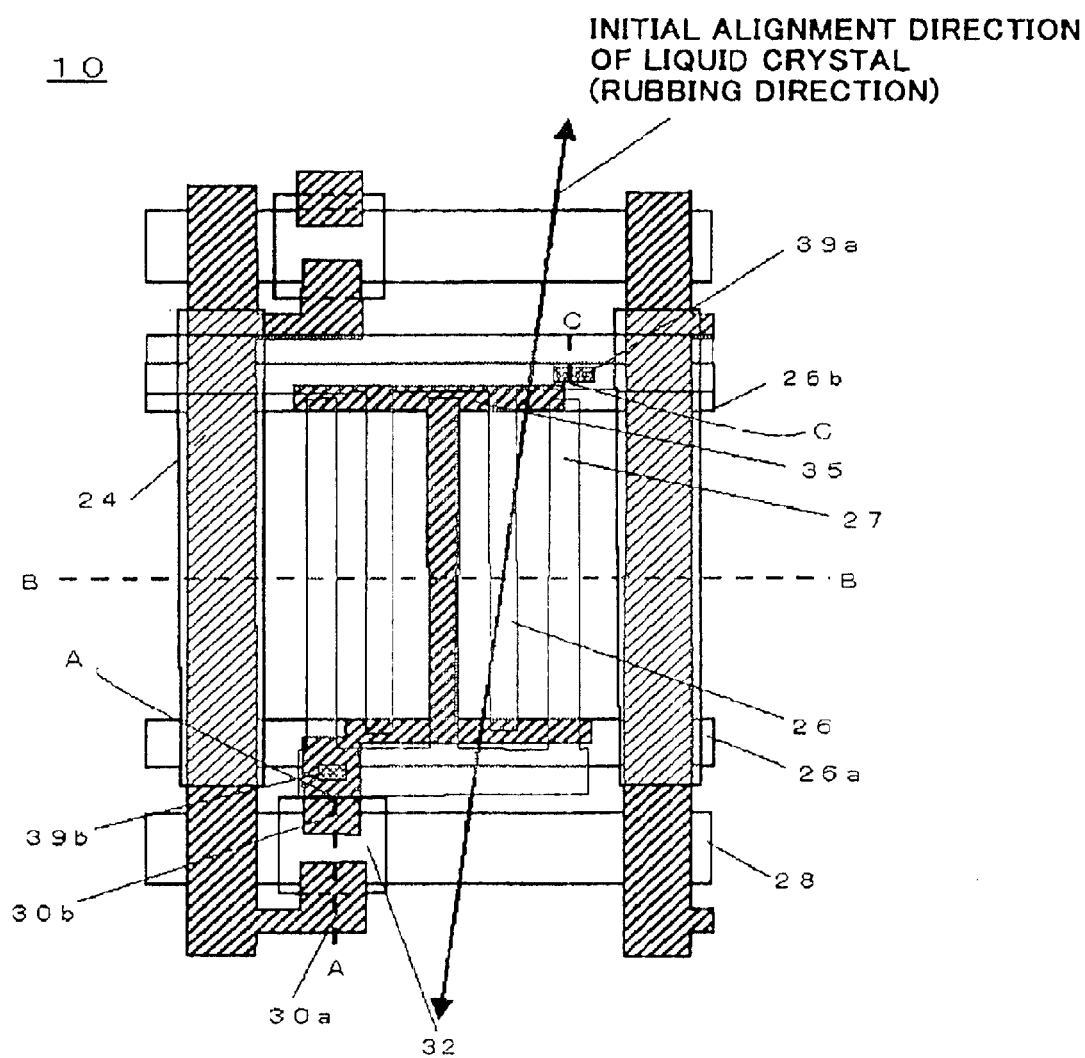
FIG. 10 is a plan view of the in-plane switching mode liquid crystal display device in accordance with the first embodiment, used for explaining the method of fabricating the same.

FIGS. 8 and 9 illustrate a TFT device part, a unit pixel part, and a contact hole part of the unit pixel part in the in-plane switching mode liquid crystal display device 10. The TFT device part, the unit pixel part, and the contact hole part are illustrated as cross-sectional views taken along the lines A—A, B—B and C—C in FIG. 10.

In FIG. 8, the second interlayer insulating film 25 is designed to have a multi-layered structure of the first film 25a and the second film 25b, whereas in FIG. 9, the second interlayer insulating film 25 is designed to have a single-layered structure of the first film 25a. Explanation is made hereinbelow with reference to FIG. 8. When the second interlayer insulating film 25 has a single-layered structure, the first film 25a may be considered as a lower layer in the second interlayer insulating film, and the second film 25b may be considered as an upper layer in the second interlayer insulating film.

As illustrated in FIGS. 8 and 4, the common electrode lines 26a and 26b are comprised of the first metal layer, extend in parallel with the scanning lines 28, and are applied a voltage of the common electrode 26 thereto at a periphery thereof.

As illustrated in FIG. 4, the pixel electrode 27 comprised of a transparent electrode is electrically connected to the pixel auxiliary electrode 35 through a contact hole 39b. The pixel auxiliary electrode 35 is comprised of the second metal layer, and is formed integral with the source electrode 30b of the thin film transistor 30.

In the in-plane switching mode active matrix type liquid crystal display device 10 in accordance with the first embodiment, in a pixel which is selected in accordance with a scanning signal transmitted through the scanning line 28, and to which a data signal transmitted through the data line 24 is written, an electric field is generated in parallel with the transparent substrates 16 and 22 between the common electrode 26 and the pixel electrode 27, and alignment orientation of liquid crystal molecules in the liquid crystal layer 13 is rotated in accordance with the electric field in a plane parallel with the transparent substrates 16 and 22, to thereby display images on a display screen of the liquid crystal display device 10. In FIG. 4, a vertically long area surrounded by the common electrode 26 and the pixel electrode 27 is called a column. In the in-plane switching mode active matrix type liquid crystal display device 10, both the common electrode 26 and the pixel electrode 27 are composed of indium-tin-oxide (ITO) which is transparent material.

As illustrated in FIGS. 7 and 8, the in-plane switching mode active matrix type liquid crystal display device 10 may be designed to include the pixel auxiliary electrode 35 below the second interlayer insulating film 25. The pixel auxiliary electrode 35 is formed integral with the source electrode 30b of the thin film transistor 30 formed of the second metal layer formed on the first interlayer insulating film 23.

As illustrated in FIG. 7, the pixel auxiliary electrode 35 is comprised of a first portion 35a overlapping the common electrode line 26b formed of the first metal layer and defining a storage capacity together with the common electrode line 26b, a second portion 35b overlapping the common electrode line 26a formed of the first metal layer and defining a storage capacity together with the common electrode line 26a, and a third portion 35c extending in parallel with the data lines 24, being formed below the pixel electrode 27 formed above the second interlayer insulating film 25, and connecting the first and second portions 35a and 35b to each other. The pixel auxiliary electrode 35 is in the form of "I".

The first to third portions 35a, 35b and 35c of the pixel auxiliary electrode 35 are formed of the opaque second metal layer on the first interlayer insulating film 23. As will be understood in view of FIG. 8, the drain electrode 30a and the source electrode 30b of the thin film transistor 30 are formed also of the opaque second metal layer. The source electrode 30b is electrically connected to the pixel auxiliary electrode 35.

Though light transmissivity is slightly reduced if the pixel auxiliary electrode 35 is composed of opaque metal, it would be possible to form storage capacity at both upper and lower sides when viewed in a plan view of a pixel, by electrically connecting the first to third portions 35a, 35b and 35c to one another, ensuring an increase in storage capacity and stabilization in displaying images.

It should be noted that a shape of the pixel auxiliary electrode 35 is not to be limited to "I" illustrated in FIG. 7. The pixel auxiliary electrode 35 may be designed to have any shape, unless it is located below the pixel electrode 27.

Though not illustrated in FIG. 7, a common auxiliary electrode may be formed of the second metal layer on the first interlayer insulating film 23, and be electrically connected to the common electrode lines 26a and 26b both formed of the first metal layer, and the common electrode 26.

As illustrated in FIG. 8, the gate electrode 30c of the thin film transistor 30 is formed of the first metal layer.

It would be possible to form storage capacity at both upper and lower sides when viewed in a plan view of a pixel, by electrically connecting the common electrodes 26 to each other, ensuring an increase in storage capacity and stabilization in displaying images.

As illustrated in FIGS. 4 and 5, the common electrode 26 is formed on a layer located upper than the data lines 24, and entirely overlaps the data lines 24 except both an area in which the data line 24 intersects with the scanning line 28 and a region around the area.

Figure 11:
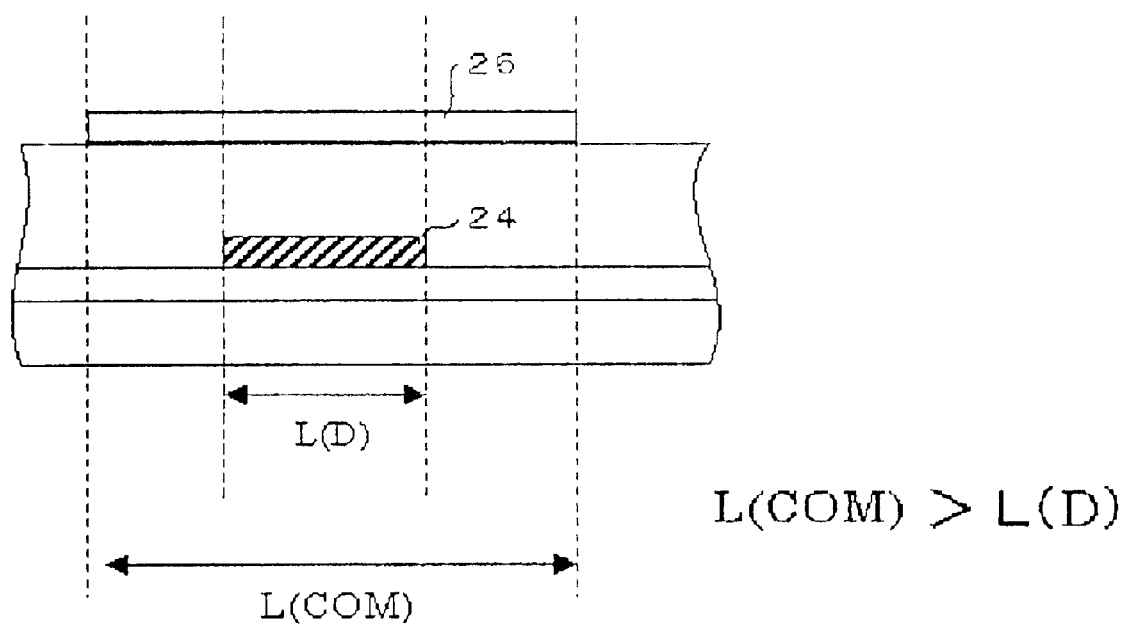
FIG. 11 is a partial cross-sectional view of the in-plane switching mode liquid crystal display device in accordance with the first embodiment, showing a relation between a width of the data line and a width of the common electrode.

Specifically, as illustrated in FIG. 11, assuming that L(D) indicates a width of the data line 24, and L(COM) indicates a width of the common electrode 26, L(COM) is greater than L(D), and in addition, the width L(D) of the data line 24 is entirely covered by the width L(COM) of the common electrode 26.

$$L(COM) > L(D)$$

In FIG. 4, since there is formed a high step in an area in which the data line 24 intersects with the scanning line 28 and a region around the area, the common electrode 26 does not overlap the data line 24 in the area and region in order to avoid short-circuit.

As mentioned earlier, the black matrix layer 17 formed above the data line 24 is designed to have a smaller width than a width of the common electrode 26, and there does not exist a light-impermeable film between the common electrode 26 overlapping the data line 24 and the pixel electrode 27 formed adjacent to the common electrode 26, in a top plan view. In addition, the black matrix layer 17 is designed to have a smaller width than a width of the data line 24, and overlap the data line 24 in its entirety.

Figure 12:
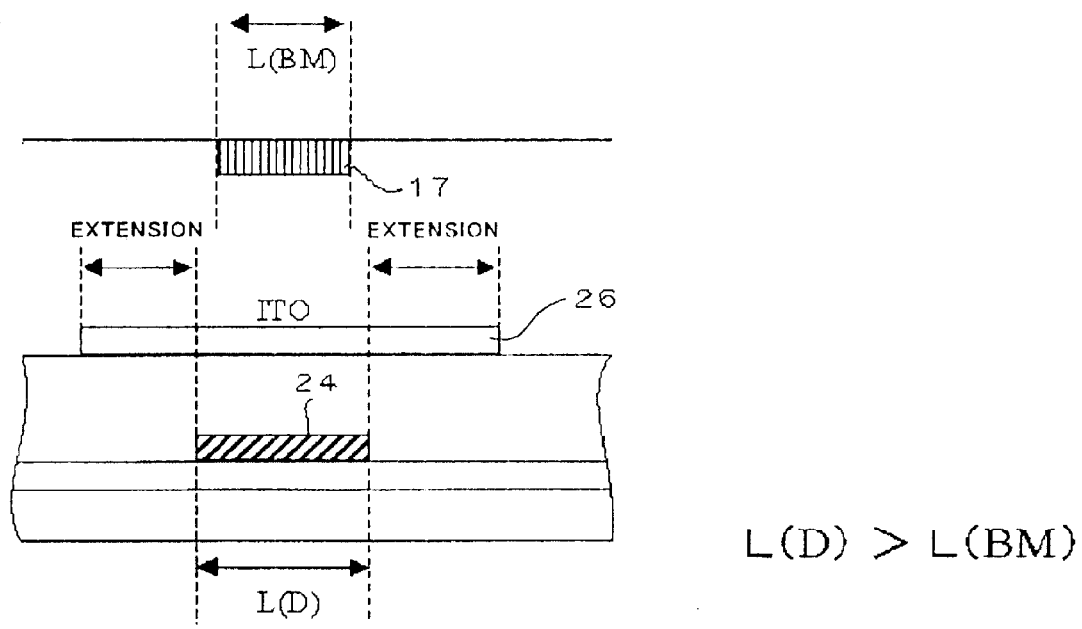
FIG. 12 is a partial cross-sectional view of the in-plane switching mode liquid crystal display device in accordance with the first embodiment, showing a relation between a width of the data line and a width of the black matrix layer.

That is, as illustrated in FIG. 12, assuming that L(D) indicates a width of the data line 24, and L(BM) indicates a width of the black matrix layer 17, the width L(D) is greater than L(BM), and the L(BM) is entirely overlapped by the width L(D).

$$L(D) > L(BM)$$

By designing the black matrix layer 17 to have a smaller width than a width of the data line 24, it would be possible to make use of a light passing through extensions of the transparent common electrode 26 which extend beyond the data line 24, ensuring enhancement in transmissivity of a light through a panel.

The black matrix layer 17 in the first embodiment is designed to have a width of 6 $\mu$m. However, it should be noted that a width of the black matrix layer 17 is not to be limited to 6 $\mu$m. The black matrix layer 17 may be designed to have a width greater than 6 $\mu$m as well as 6 $\mu$m. If the black matrix layer 17 had a width smaller than 6 $\mu$m, much light would be reflected at the data line 24, resulting in that images displayed on a screen of the liquid crystal display device 10 would be quite difficult to see in bright environment.

The common electrode 26 may be composed of the same material as a material of which a layer covering the terminals of the liquid crystal display device 10 therewith is composed. Specifically, the common electrode line terminal may be composed of an ITO layer of which the common electrode 26 is composed, like the contact hole 39a illustrated in FIG. 8. Similarly, both the scanning line terminal and the data line terminal may be composed of the ITO layer of which the common electrode 26 is composed.

As a result, the common electrode 26 can be formed concurrently with the terminals of the liquid crystal display device 10 and be composed of a material of which the terminals are composed. This ensures prevention of an increase in the number of steps for forming the common electrode 26.

In the liquid crystal display device 10, if the common electrode 26 does not completely overlap the data line 24, the common electrode 26 would not shield an electric field associated with the data line 24. As a result, there will be generated an electric field between the common electrode 26 and the pixel electrode 27, causing malfunction of liquid crystal molecules. Specifically, liquid crystal molecules do not behave in accordance with a voltage difference between the common electrode 26 and the pixel electrode 27, causing vertical cross-talk.

If the opposing substrate 12 were designed to have the black matrix layer 17 and the black matrix layer 17 had a sufficiently great width, an area where malfunction of liquid crystal molecules occurs may be shielded from a viewer. In contrast, if the black matrix layer 17 does not overlap the data line 24, such an area where malfunction of liquid crystal molecules occurs can be shielded from a viewer by forming a light-impermeable layer electrically connected to the common electrode 26, below the data line 24, to thereby shield a light emitted from a back-light device. If the light-impermeable layer were not electrically connected to the common electrode 26, the light-impermeable layer would have an unstable voltage, resulting in that a DC electric field is generated between the common electrode 26 and the pixel electrode 27, or malfunction such as cross-talk occurs.

Specifically, such a light-impermeable layer as mentioned above is comprised of the first metal layer of which the scanning line 28 is comprised, and electrically connected to the common electrode line 26a. Since the common electrode lines 26a and 26b are electrically connected to the common electrode 26 through the contact hole 39a, the common electrode lines 26a and 26b may be used as a light-impermeable layer.

The above-mentioned light-impermeable layer may be formed as a single layer composed of chromium, titanium, molybdenum, tungsten or aluminum, or may be designed to have a multi-layered structure including layers composed of those metals. A light-impermeable layer having a multi-layered structure would have a reduced resistance.

With reference to FIG. 4, the common electrode 26 does not overlap the data lines 24 at intersections of the data lines 24 and the scanning line 28 and regions therearound. Accordingly, the common electrode 26 cannot shield an electric field derived from the data lines 24 at the intersections of the data lines 24 and the scanning line 28. As a result, there would be generated an electric field at the intersections and regions therearound, and liquid crystal molecules in the liquid crystal layer 13 would behave improperly. In addition, liquid crystal molecules would behave improperly due to an electric field derived from the data lines 28.

However, since the common electrode lines 26a and 26b are comprised of the first metal layer of which the scanning line is also comprised, it would be impossible for the common electrode lines 26a and 26b to shield the above-mentioned intersections and regions therearound where liquid crystal molecules would behave improperly.

Hence, it is preferable that those intersections and regions are shielded with the black matrix layer 17.

Figure 13:
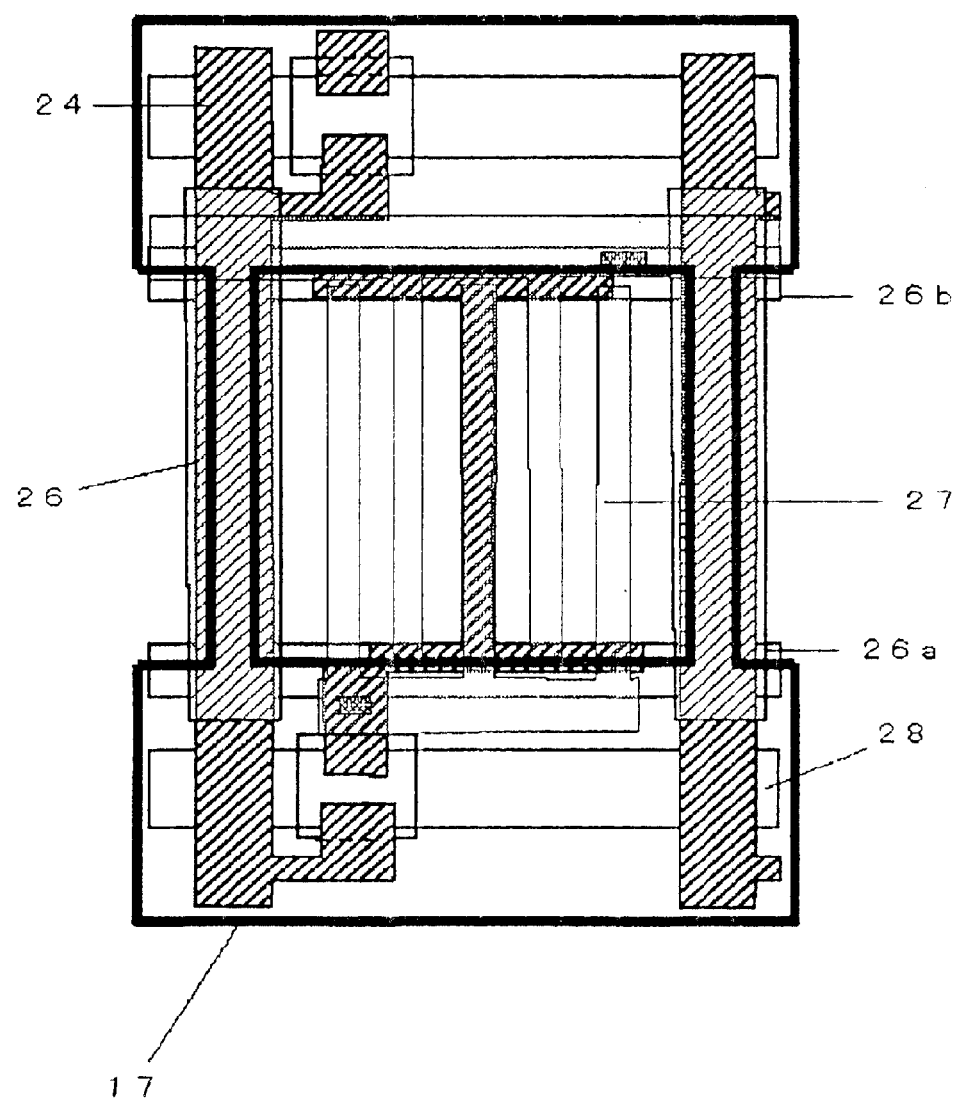
FIG. 13 is a plan view showing an area in which the black matrix layer is to be formed on the second substrate in the in-plane switching mode liquid crystal display device illustrated in FIG. 4.

FIG. 13 illustrates an example where the black matrix layer 17 shields the intersections and regions. As illustrated in FIG. 13, the black matrix layer 17 formed in an area surrounded by a thick solid line covers the scanning line 28, regions therearound, spaces between the scanning line 28 and the pixel electrode 27, and regions therearound therewith to thereby shield them from a light.

The common electrode 26 in the liquid crystal display device 10 in accordance with the first embodiment is composed of ITO which is one of transparent materials. This ensures an increase in a transparent area in the liquid crystal display device 10 with the result of an increase in an aperture ratio in the liquid crystal display device 10.

Though an ITO film has a rather high sheet resistance, specifically about 100 ohms per a unit area, it would be possible to reduce a resistance in the common electrode 26 in its entirety and to present redundancy to the common electrode 26 by electrically connecting the ITO film to the common electrode line 26a or 26b in each of pixels, and horizontally electrically connecting the common electrode 26, which is comprised of the ITO film, to each other.

As is understood in view of FIG. 5, the second interlayer insulating film 25 is sandwiched between the common electrode 26 and the data line 24. By designing the second interlayer insulating film 25 to have a high ratio d/∈ wherein "d" indicates a thickness of the second interlayer insulating film 25 and "∈" indicates a dielectric constant, it would be possible to reduce a parasitic capacitance to be formed between the data lines 24 and the common electrode 26.

In addition, since the above-mentioned cross-talk problem is solved, it would be no longer necessary to form the black matrix layer 17 for the purpose of preventing degradation in displaying images, caused by an electric field leaking out of the data lines 24. Accordingly, the black matrix layer 17 may be formed only for improvement in contrast, ensuring that the black matrix layer 17 could have a reduced width. Reduction in a width of the black matrix layer 17 would ensure an increase in an aperture ratio in the liquid crystal display device 10.

In the liquid crystal display device 10, both the common electrode 26 and the pixel electrode 17 are formed on the second interlayer insulating film 25. By forming both the common electrode 26 and the pixel electrode 27 in a common layer, it would be possible to form the common electrode 26 and the pixel electrode 27 in the same step and compose them of the same material, ensuring enhancement in a fabrication yield.

As mentioned earlier, the common electrode 26 shielding the data lines 24 is composed of ITO in the liquid crystal display device 10. By composing the common electrode 26 of ITO, it would be possible to enhance reliability of the liquid crystal display device 10 in comparison with cases where the common electrode 26 is composed of metals other than ITO. The reason therefor is explained hereinbelow.

Figure 14:
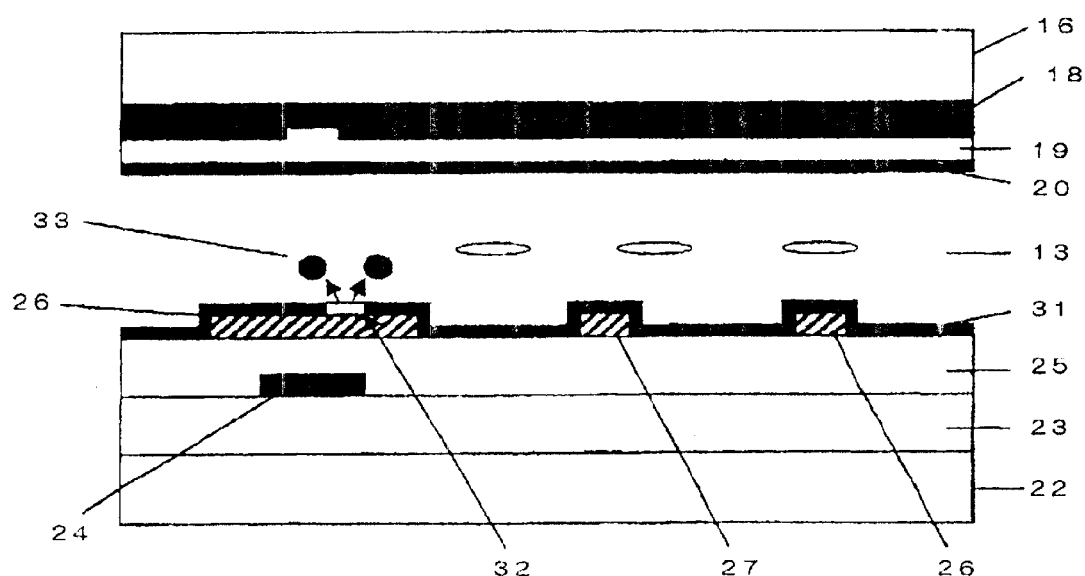
FIG. 14 is a partial cross-sectional view of the in-plane switching mode liquid crystal display device in accordance with the first embodiment, showing an advantage of the common electrode being composed of ITO.

As illustrated in FIG. 14, it is assumed that the common electrode 26 and the pixel electrode 27 both composed of a metal other than ITO are formed on the second interlayer insulating film 25, and an alignment film 31 having a thickness in the range of 500 to 1000 angstroms is formed on the second interlayer insulating film 25, covering the common electrode 26 and the pixel electrode 27 therewith.

If the alignment film 31 had a pin-hole 32, liquid crystal material of which the liquid crystal layer 13 is composed and the metal of which the common electrode 26 and the pixel electrode 27 are composed would electrochemically react with each other, resulting in that the metal of which the common electrode 26 and the pixel electrode 27 are composed might be eluted into the liquid crystal layer 13 as metal ions 33. Such elution of the metal ions 33 into the liquid crystal layer 13 would cause non-uniformity in displaying images.

In particular, when the liquid crystal layer 13 is composed of liquid crystal material having intensive polarity, the metal ions 33 would be eluted into the liquid crystal layer 13 more aggressively. Since it is necessary in an in-plane switching mode liquid crystal display device to form the liquid crystal layer 13 of a material having a high dielectric constant anisotropy Δ∈, the metal ions 33 would be aggressively eluted into the liquid crystal layer 13.

Accordingly, the common electrode 26 and the pixel electrode 27 both making contact with the alignment film 31 are preferably composed of a material which is unlikely to electrochemically react with liquid crystal material, that is, a material which is less reactive with liquid crystal material.

As is obvious in view of the fact that a transparent electrode in a TN (Twisted Nematic) or STN (Super Twisted Nematic) type liquid crystal display device is frequently composed of ITO, ITO is quite stable to electrochemical reaction such as the above-mentioned one.

Hence, the common electrode 26 and the pixel electrode 27 both composed of ITO can be formed making direct contact with the alignment film 31, ensuring enhancement in reliability in the liquid crystal display device 10 in comparison with liquid crystal display devices including a common electrode and a pixel electrode both composed of a metal other than ITO.

Hereinbelow is explained the liquid crystal display device 10 in accordance with the first embodiment in detail. In addition, variants of the liquid crystal display device 10 will be explained hereinbelow.

In the liquid crystal display device 10, the common electrode 26 is entirely overlapped by the data lines 24 in almost all regions of the liquid crystal display device 10. It is preferable that the common electrode 26 has extensions extending beyond the data line 24 in a width-wise direction at opposite sides thereof by 1.5 μm or greater.

The inventors had conducted the experiment to find a relation among a length Le [μm] of extensions of the common electrode 26 extending beyond edges of the data line 24 in a width-wise direction thereof, a thickness "d" of the second interlayer insulating film 25, and light passage passing at the side of the data line 24.

Figure 15:
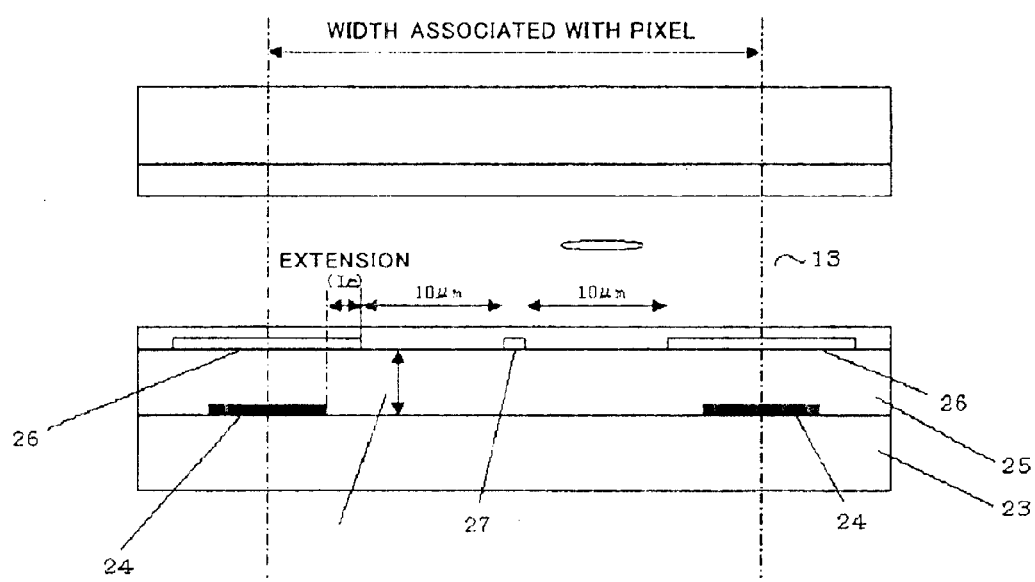
FIG. 15 is a partial cross-sectional view of the in-plane switching mode liquid crystal display device in accordance with the first embodiment, showing a relation between an extended width of the common electrode and the data line.

FIG. 15 is a cross-sectional view of the liquid crystal display device to which the inventors had conducted the experiment. The conditions in the experiment were as follows.

Figure 16:
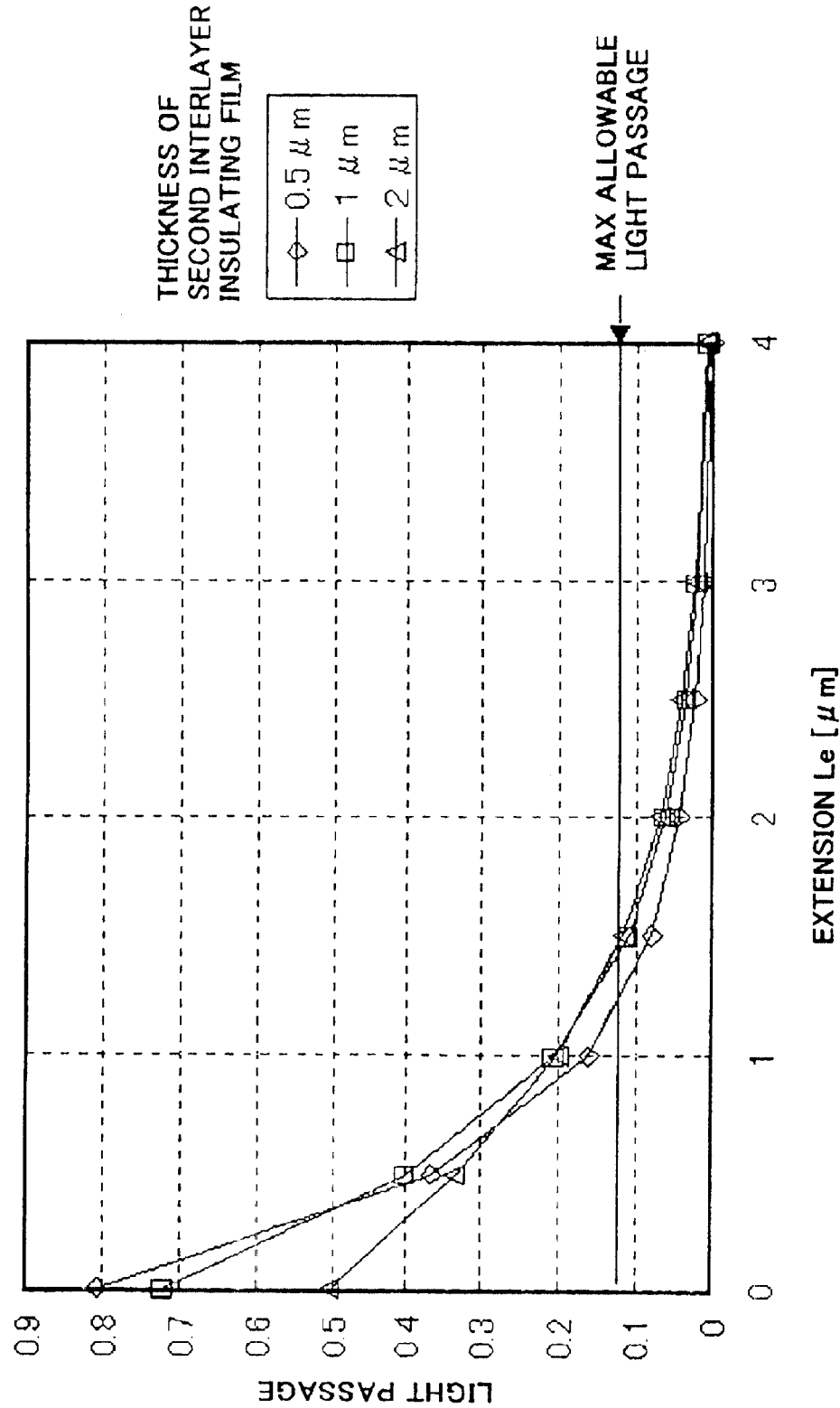
FIG. 16 is a graph showing the results of simulation relating to a light leaking at a side of the data line.

Dielectric constant anisotropy of liquid crystal Δ∈=8
Index of refraction of liquid crystal=0.067
Thickness of the liquid crystal layer 13=4.5 μm
Light transmissivity of the common electrode 26=100% (transparent)
Light transmissivity of the data line 24=0% (opaque)
Distance between the common electrode 26 and the pixel electrode 27=10 μm
Dielectric constant of the second interlayer insulating film 25: ∈=3
Thickness "d" of the second interlayer insulating film 25=0.5, 1.0, and 2.0 μm Under the above-mentioned conditions, there was conducted the experiment in which a screen in which a white window was displayed with black background was displayed in black. FIG. 16 shows light passage in the experiment, caused by an electric field leaking out of the data line 24 due to white-display in surroundings. Light passage in FIG. 16 was calculated by integrating light transmissivity over a width associated with a pixel, illustrated in FIG. 15.

Though light transmissivity in black-display is equal to 0.0, it has a certain value due to an electric field leaking out of the data line 24. As illustrated in FIG. 16, the greater the extension Le [μm] is, the smaller the light passage is. This is not dependent on the thickness "d" of the second interlayer insulating film 25.

On the other hand, the light passage in white-display is calculated by integrating the light transmissivity in white-display over a width associated with a pixel. Specifically, the light passage in white-display is calculated equal to 12. It is necessary for the maximum allowable light passage passing at the side of the data line 24 to be equal to or smaller than $\frac{1}{100}$ of light passage in a pixel obtained when white is displayed in a screen. Hence, the light passage has to be equal to or smaller than 0.12 in FIG. 16.

In FIG. 16, the extension Le [$\mu$m] of the common electrode 26 can be read as about 1.5 $\mu$m when the light passage is equal to 0.12. Accordingly, it would be possible to lower the maximum allowable light passage passing at the side of the data line 24, by determining the extension Le [$\mu$m] of the common electrode 26 to be equal to 1.5 $\mu$m.

In the first embodiment, the liquid crystal display device 10 is designed to include the black matrix layer 17 separately from the color layer 18. However, it should be noted that the black matrix layer 17 might be replaced with a multi-layered structure of a plurality of the color layers 18.

Figure 17:
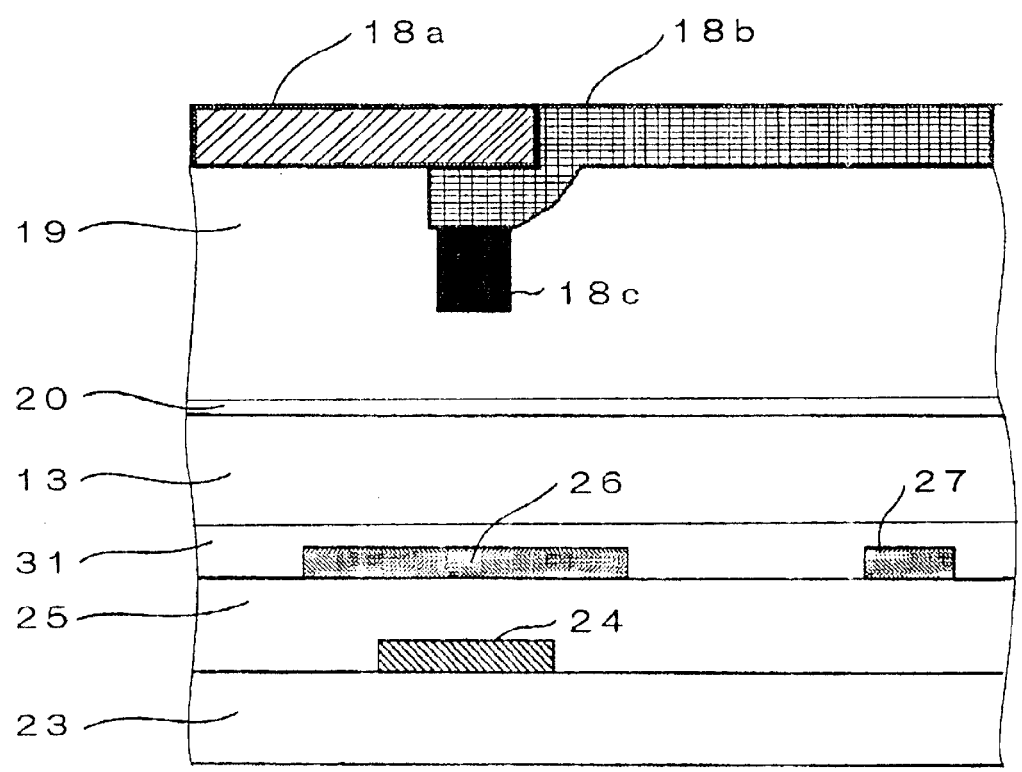
FIG. 17 is a partial cross-sectional view of a variant of the in-plane switching mode liquid crystal display device in accordance with the first embodiment.

With reference to FIG. 17, a red layer 18a, a green layer 18b and a blue layer 18c are designed to partially overlap one another. Portions of the color layers 18a to 18c at which the color layers 18a to 18c partially overlap one another have the same function of the black matrix layer 17.

It would be no longer necessary to form the black matrix layer 17 by designing the color layers 18a to 18c to partially overlap one another. The red, green and blue layers 18a to 18c may be formed such that they overlap one another, by changing patterns of the color layers 18a to 18c. Since work volume for changing patterns of the color layers 18a to 18c is smaller than work volume for forming the black matrix layer 17, the multi-layered structure of the color layers 18a to 18c would enhance a fabrication yield of the liquid crystal display device 10.

In place of layering three color layers as mentioned above, any two color layers among red, green and blue layers may be layered one on another to substitute for the black matrix layer 17.

Figure 18:
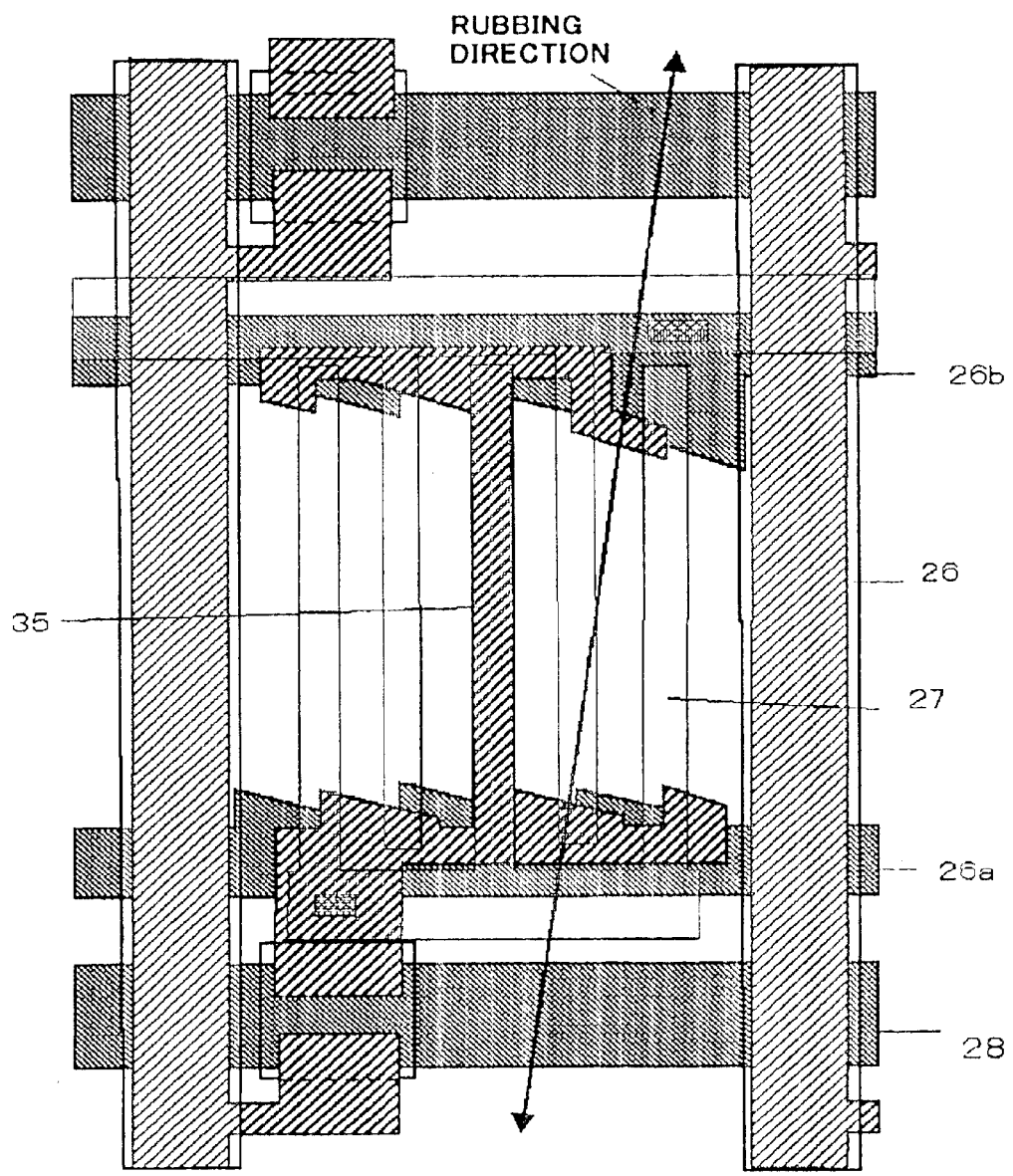
FIG. 18 is a partial cross-sectional view of another variant of the in-plane switching mode liquid crystal display device in accordance with the first embodiment.

In the liquid crystal display device 10, the pixel auxiliary electrode 35, the common electrode line 26a and the common electrode line 26b which define upper and lower ends in each of columns in a direction in which the data line 24 extends may be designed to have such oblique edges as illustrated in FIG. 18 such that a relation among a rubbing direction or a liquid crystal alignment direction defined by rubbing and a direction of an electric field applied across the pixel electrode 27 (and the pixel auxiliary electrode 35 to which the same voltage as that of the pixel electrode 27 is applied) and the common electrode 26 (and the common electrode lines 26a and 26b to which the same voltage as that of the common electrode 26 is applied) is determined to ensure that the liquid crystal alignment direction would overlap the direction of the electric field, if the liquid crystal alignment direction were rotated in a clockwise direction by a certain acute angle, entirely in a display area surrounded by the pixel electrode 27 and the common electrode 26 illustrated in FIG. 18.

If there exists an area in which the liquid crystal alignment direction would overlap the direction of the electric field by rotating the liquid crystal alignment direction in a counter-clockwise direction by a certain acute angle, the area would generate domain at an end of a pixel, in which liquid crystal rotates in a direction opposite to a desired direction, when an electric filed is applied across the pixel electrode 27 and the common electrode 26. If there exists such a domain as mentioned above, and disclination occurs for a long time at a boundary between the above-mentioned domain in which liquid crystal molecules rotate in a desired direction and a domain in which liquid crystal molecules rotate in a direction opposite to a desired direction, display quality would be lowered, and a condition identical with the initial condition could not be frequently obtained, resulting in reduction in reliability of the liquid crystal display device.

The above-mentioned reverse rotation of liquid crystal molecules could be prevented by designing the pixel auxiliary electrode 35 and the common electrode lines 26a and 26b to have oblique edges, as illustrated in FIG. 18. Herein, in the specification, a structure twisting liquid crystal molecules only in a single direction by designing the pixel auxiliary electrode 35 and the common electrode lines 26a and 26b to have oblique edges is called a reverse-rotation preventing structure.

Hereinbelow is explained a layer arrangement in a reverse-rotation preventing structure 36 in the liquid crystal display device 10.

Figure 19A:
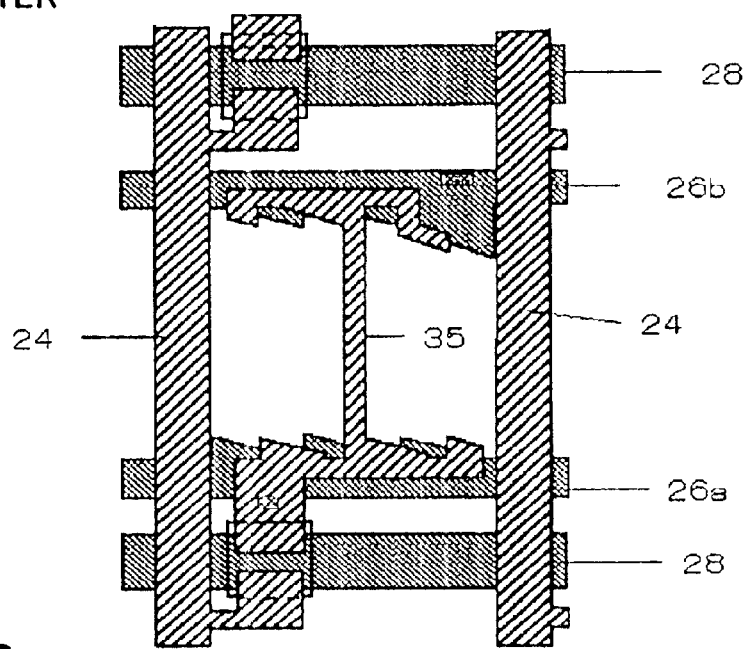
FIG. 19A is a plan view illustrating only the first and second metal layers in the in-plane switching mode liquid crystal display device illustrated in FIG. 18.

In FIG. 19A, the first metal layer is illustrated as obliquely extending lines with a narrow space, and the second metal layer is illustrated as obliquely extending lines with a wide space. The scanning line 28 and the common electrode lines 26a and 26b are comprised of the first metal layer, and the data lines 24 and the pixel auxiliary electrode 35 is comprised of the second metal layer.

Figure 19B:
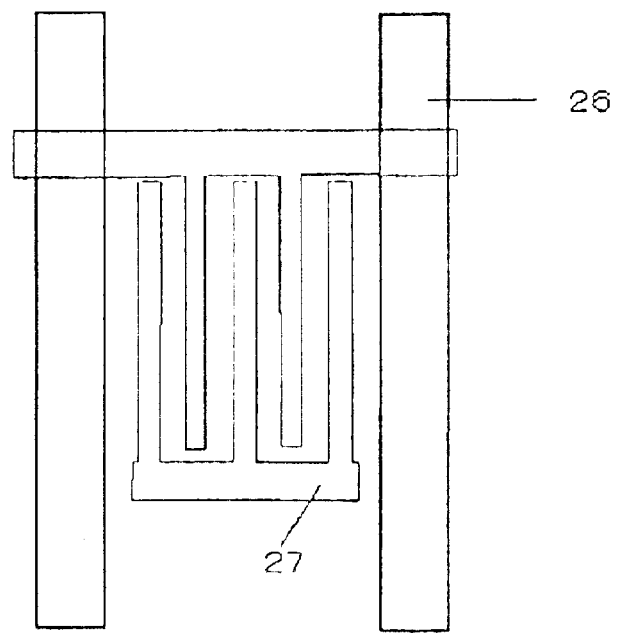
FIG. 19B is a plan view illustrating only the layers composed of ITO, in the in-plane switching mode liquid crystal display device illustrated in FIG. 18.

FIG. 19B illustrates layers composed of ITO. The common electrode 26 and the pixel electrode 27 are composed of ITO. The reverse-rotation preventing structure 36 illustrated in FIG. 18 can be fabricated by overlaying the layers illustrated in FIG. 19B on the layers illustrated in FIG. 19A with an interlayer insulating film being sandwiched therebetween.

By preventing reverse-rotation of molecular axes of liquid crystal molecules, the liquid crystal display device 10 could have improved display quality and reliability. For instance, an electronic device such as a personal computer to which the liquid crystal display device 10 is applied can prevent deterioration in display quality by virtue of the reverse-rotation preventing structure 36.

For instance, Japanese Patent No. 2973934 (Japanese Unexamined Patent Publication No. 10-26767) has suggested an example of a reverse-rotation preventing structure.

Figure 20:
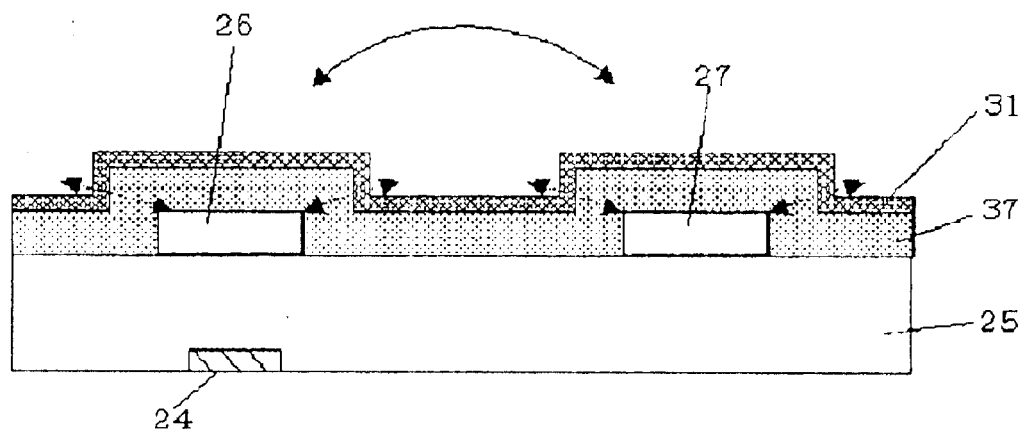
FIG. 20 is a partial cross-sectional view of the in-plane switching mode liquid crystal display device in accordance with the first embodiment, used for explaining the advantage obtained by forming a passivation film on the common electrode.

As illustrated in FIG. 20, the liquid crystal display device 10 may be designed to include a passivation film 37 formed on the second interlayer insulating film 25, covering the common electrode 26 and the pixel electrode 27 therewith. The alignment film 31 is formed on the passivation film 37.

Figure 21:
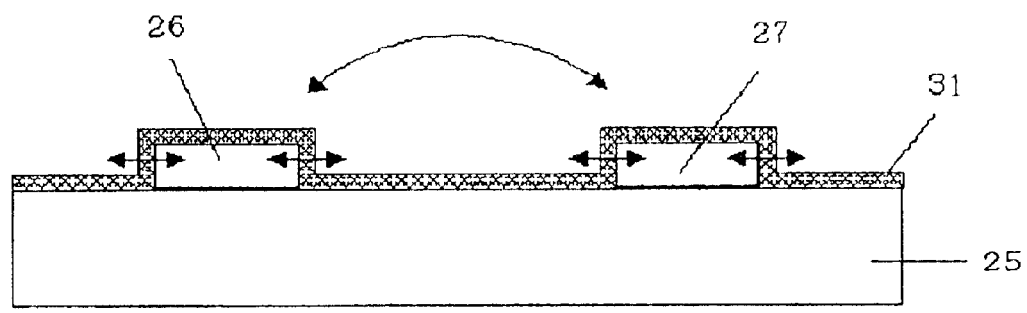
FIG. 21 is a partial cross-sectional view of an in-plane switching mode liquid crystal display device, used for explaining the problem caused when a passivation film is not formed on a common electrode.

As illustrated in FIG. 21, if an intensive electric field is applied for a long time across the common electrode 26 and the pixel electrode 27, misalignment of liquid crystal might occur at edges of the common electrode 26 and the pixel electrode 27 which edges face each other, resulting in display defects.

The passivation film 37 illustrated in FIG. 20 would weaken the intensive electric field generated at the edges of the common electrode 26 and the pixel electrode 27, and thereby prevent misalignment of liquid crystal molecules and thus display defects.

A contact hole 39 in the liquid crystal display device 10 (see FIG. 22) has a square cross-section having 6 $\mu$m-long sides. However, a length of the side is not to be limited to 6 $\mu$m, but may be longer than 6 $\mu$m.

In addition, the contact hole 39 may be designed to have a rectangular cross-section, in which case, the contact hole 39 necessarily has a shorter side equal to or longer than 6 $\mu$m.

In accordance with the experiments conducted by the inventors, proper electrical connection between upper and lower layers through the contact hole 39 could not be ensured, if the contact hole 39 had a side or a shorter side smaller than 6 μm.

Figure 22:
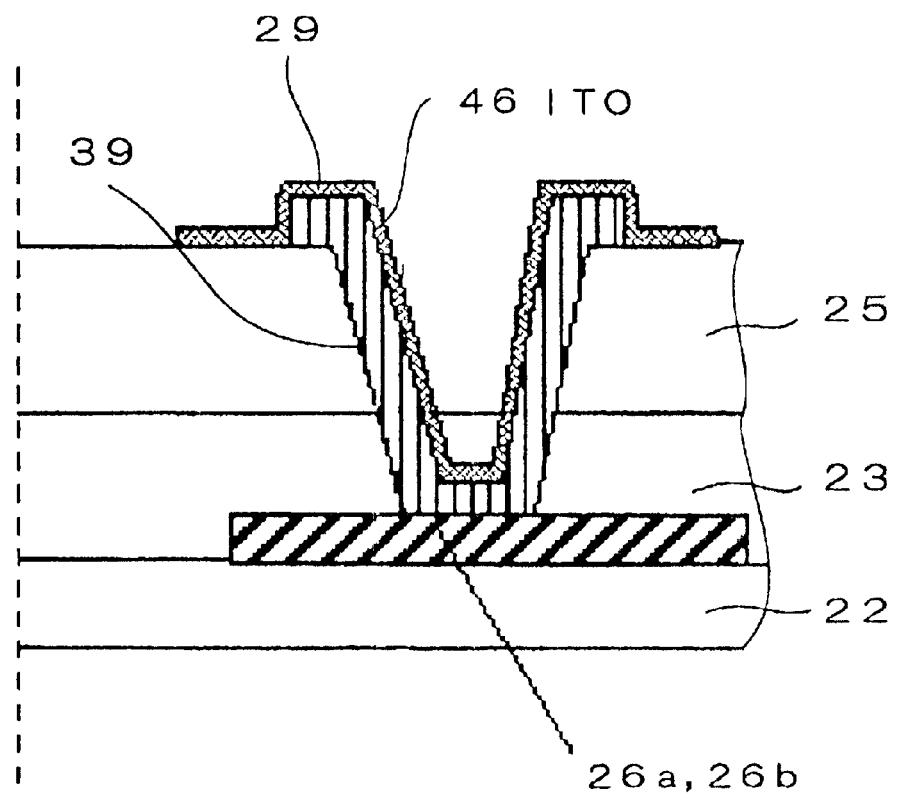
FIG. 22 is a partial cross-sectional view of still another variant of the in-plane switching mode liquid crystal display device in accordance with the first embodiment.

As illustrated in FIG. 22, the contact hole 39 may be covered with a metal film 29. The contact hole 39 may be designed to have a tapered inner wall, in which case, the contact hole 39 has a size of 6 μm×6 μm at its top. The contact hole 39 reaches the common electrode lines 26a and 26b. The contact hole illustrated in FIG. 22 and the contact holes 39a and 39b illustrated in FIG. 8 are covered at their inner walls with the metal film 29, and the metal film 29 is covered with an ITO film 46 electrically connected to the common electrode 26 (see FIG. 8).

By covering the contact hole 39 at its inner wall with the metal film 29, it would be possible to reduce a resistance between the common electrode 26 formed as a transparent electrode and the common electrode line 26a or 26b, and enhance evenness in displaying images.

The second interlayer insulating film 25 in the liquid crystal display device 10 has a thickness in the range of 1 μm to 2 μm both inclusive, for instance.

The second interlayer insulating film 25 in the first embodiment is designed to be comprised of the first film 25a and the second film 25b, as mentioned earlier. As an alternative, as illustrated in FIG. 9, the second interlayer insulating film 25 may be designed to be comprised of a single layer composed of inorganic or organic material. The second interlayer insulating film 25 illustrated in FIG. 9 is comprised only of a first film composed of inorganic material. As an alternative, as illustrated in FIG. 8, the second interlayer insulating film 25 may be comprised of a first film composed of inorganic material and a second film covering the first film therewith and composed of organic material.

Since an organic film has a smaller dielectric constant than that of an inorganic film, the above-mentioned multi-layered structure including the first and second films would lower a dielectric constant of the interlayer insulating film in comparison with an interlayer insulating film comprised singly of an inorganic film.

If an interlayer insulating film is comprised singly of an organic film, an interface between a semiconductor layer in TFT and an organic film covering the semiconductor layer therewith would be unstable, in which case, if TFT operates at a high temperature, a current leaking out of TFT would increase, resulting in display unevenness. By designing the first film which makes contact with a semiconductor layer of TFT, to be comprised of an inorganic film such as a silicon nitride film, and forming an organic layer on the first film, it would be possible to an interface between the inorganic film and the semiconductor layer stable, ensuring that the above-mentioned problem can be solved.

Examples of the inorganic and organic films are shown in Table 1.

TABLE 1

| | | Thickness [μm] | Dielectric Constant | Film Formation Process | Film Patterning |
|---|---|---|---|---|---|
| Inorganic Film | SiNx (Silicon nitride) | 1–3 | 6.4 | Plasma CVD | P1 |
| | SiNx/SiOx (Silicon oxide) | 1/0.5 | 6.4/4.0 | Plasma CVD/ sputtering | P1 |
| | Inorganic polysilazane | 1–2 | 4.5 | Spin coating & baking | P1 |

TABLE 1-continued

| | | Thickness [μm] | Dielectric Constant | Film Formation Process | Film Patterning |
|---|---|---|---|---|---|
| | SiNx/ Inorganic polysilazane | 0.15/1–2 | 6.4/4.5 | Plasma CVD/spin coating & baking | P1 |
| Inorganic/ Organic Films | SiNx/Photo-sensitive acrylic resin | 0.15/1–2 | 6.4/3.3 | Plasma CVD/spin coating | P2 |
| | SiNx/Photo-sensitive polyimide resin | 0.15/1–2 | 6.4/– | Plasma CVD/spin coating | P3 |
| Organic Film | BCB (Benzocyclo-butene) | 1–2 | 4.5 | Spin coating & baking | P4 |
| | Organic polysilazane | 1–2 | 3.8 | Spin coating & baking | P4 |
| | Siloxane | 1–2 | — | Spin coating & baking | P4 |

P1 = Dry etching with a photoresist being used as a mask.
P2 = Patterning the photosensitive acrylic resin by exposure to light and development, and baking the same. Dry etching SiNx.
P3 = Patterning the photosensitive polyimide resin by exposure to light and development, and baking the same. Dry etching SiNx.
P4 = Dry etching with a photoresist being used as a mask.

As shown in Table 1, when the second interlayer insulating film 25 is comprised singly of an inorganic film, the inorganic film may be selected from a silicon nitride (SiNx) film, an inorganic polysilazane film, a multi-layered structure of a silicon nitride film and a silicon oxide film, and a multi-layered structure of a silicon nitride film and an inorganic polysilazane film.

When the second interlayer insulating film 25 is comprised singly of an organic film, the organic film may be selected from a benzocyclobutene (BCB) film, an organic polysilazane film or a siloxane film.

When the second interlayer insulating film 25 is designed to have a multi-layered structure of first and second films, the first film may be comprised of a silicon nitride film, and the second film may be selected from a photosensitive acrylic resin film or a photosensitive polyimide resin film.

Though an inorganic film in the multi-layered structure is indicated as having a thickness of 0.15 μm in Table 1, a thickness of an inorganic film in the multi-layered structure is not to be limited to 0.15 μm. An inorganic film in the multi-layered structure may be designed to have a thickness in the range of about 0.1 μm to about 1.0 μm both inclusive.

Even if the second film comprised of an organic film had a pin-hole between the data line 24 and the common electrode 26 comprised of a transparent electrode overlapping the data lie 24, the inorganic film as the first film could have a sufficient high breakdown voltage by designing the inorganic film to have a thickness equal to or greater than 0.25 μm, and hence, would prevent the data line 24 and the common electrode 26 overlapping the data line 24 from short-circuiting each other while a panel is being fabricated or images are being displayed, due to dielectric breakage of the interlayer insulating film, and further significantly reduce defects of the data line 24 which defects are caused by the above-mentioned short-circuiting between the data line 24 and the common electrode 26.

It should be noted that thicknesses of the films shown in Table 1 are indicated merely as examples, and are not to be limited to specific thicknesses.

Figure 23:
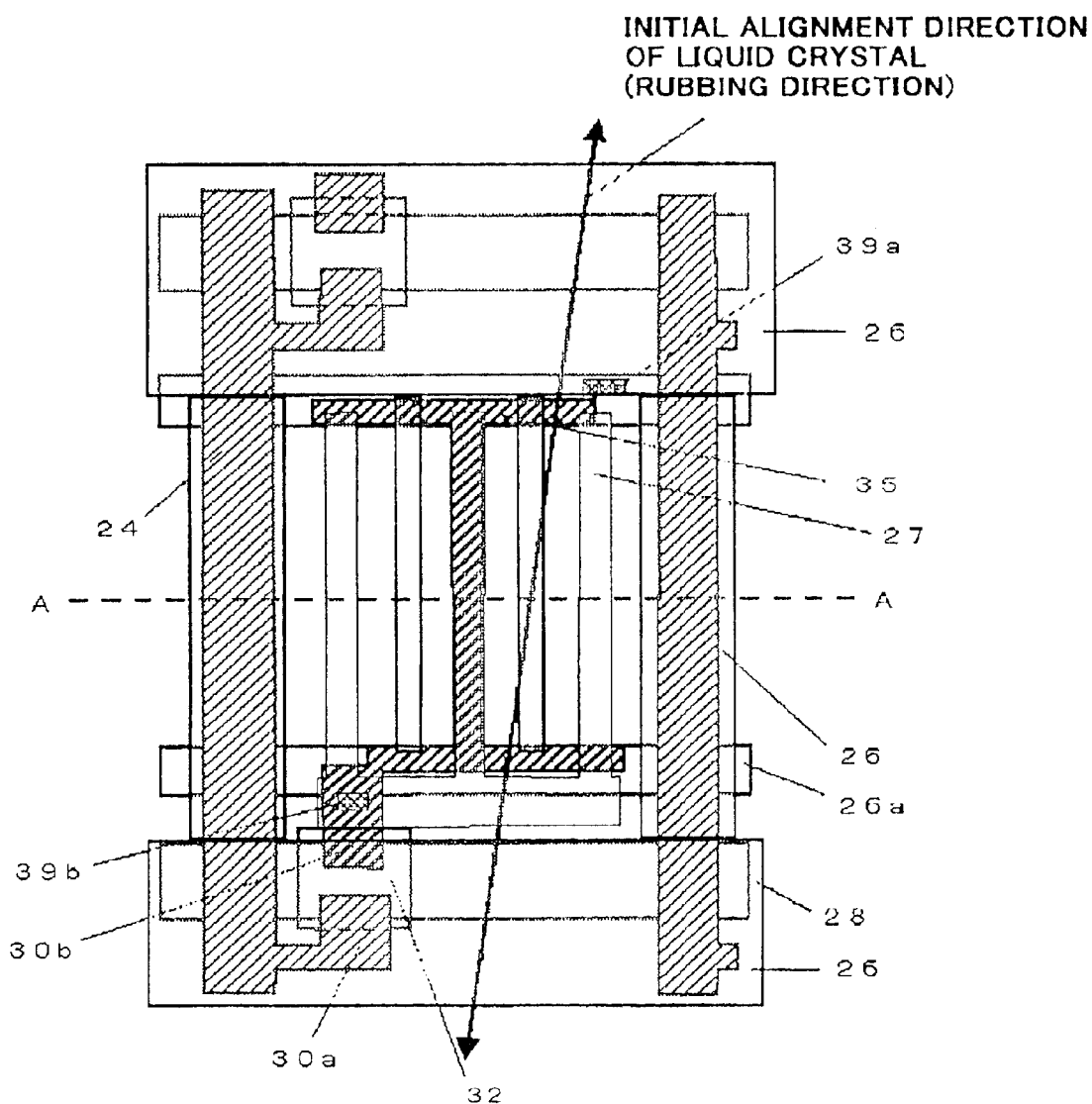
FIG. 23 is a partial cross-sectional view of yet another variant of the in-plane switching mode liquid crystal display device in accordance with the first embodiment.

In the liquid crystal display device 10 in accordance with the first embodiment, the common electrode 26 to be formed on the second interlayer insulating film 25 may be designed to overlap the scanning line 28 and a space formed between the scanning line 28 and the common electrode lines 26a and 26b, as illustrated in FIG. 23. The common electrode 26 having such structure could shield an electric field leaking out of the scanning line 28, ensuring an increase in an effective display area which is controllable by an electric field applied across the pixel electrode 27 and the common electrode 26, and enhancement in an aperture ratio of the liquid crystal display device 10.

Similarly, the common electrode 26 may be designed to overlap a channel region of TFT 30. The common electrode 26 having such structure could prevent an external electric field intruding TFT 30, ensuring enhancement in both stability of TFT characteristics and reliability to displayed images.

Figure 24:
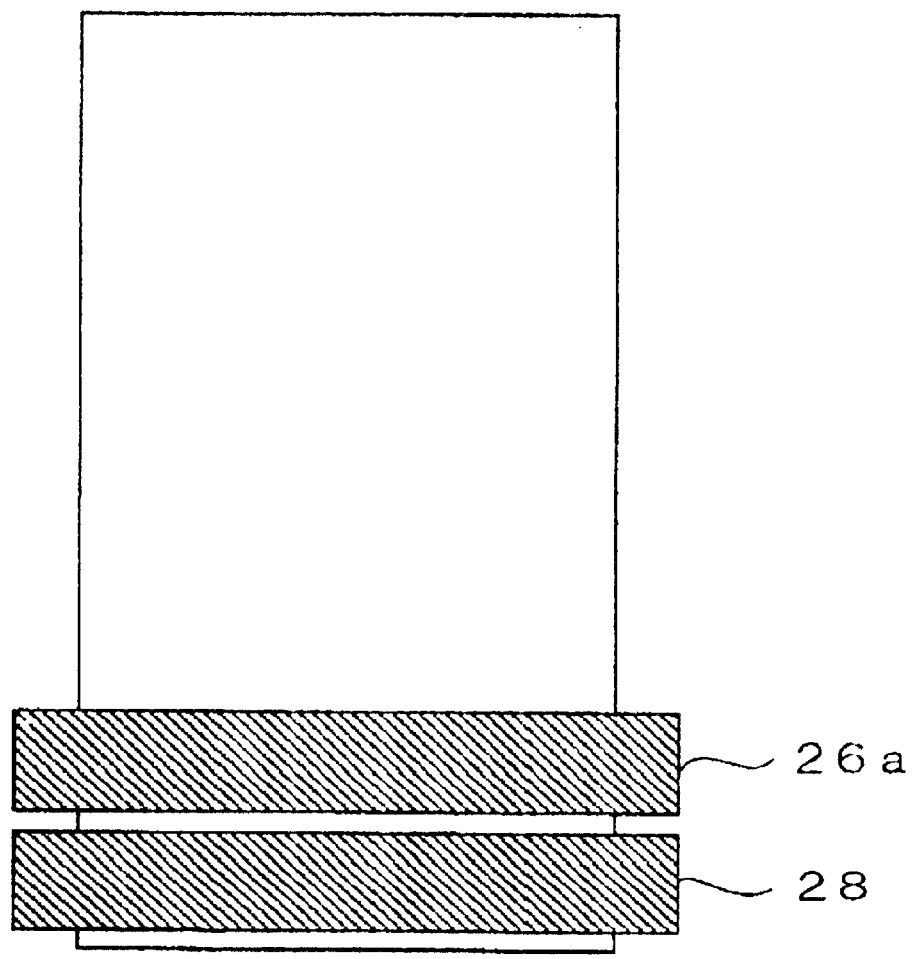
FIG. 24 is a partial plan view of another variant of the in-plane switching mode liquid crystal display device in accordance with the first embodiment.

As illustrated in FIG. 24, the common electrode line 26a may be formed in the vicinity of a lower edge in each of pixels, when viewed through a plan view of a pixel. That is, the common electrode line 26a may be positioned immediately above the scanning line 28.

Since the common electrode 26 is composed of transparent material, a transparent area would be increased by an area occupied by the common electrode 26, ensuring enhancement in an aperture ratio of the liquid crystal display device 10.

Figure 25:
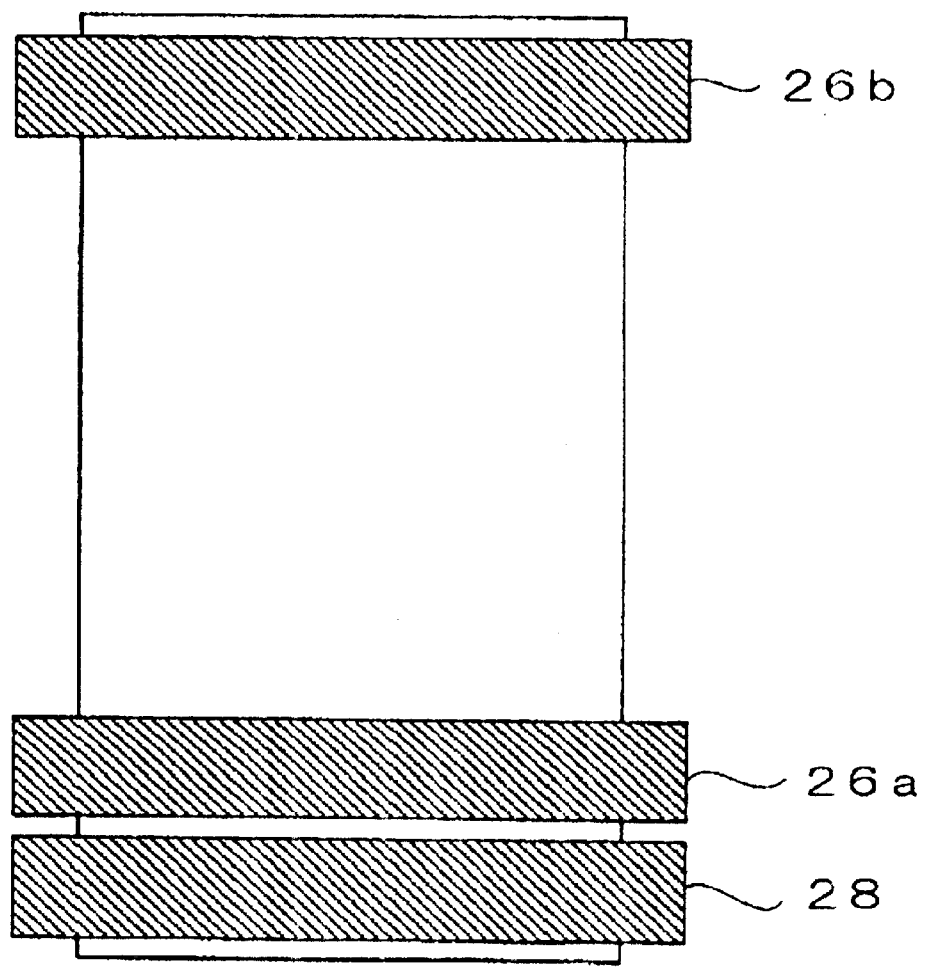
FIG. 25 is a partial plan view of another variant of the in-plane switching mode liquid crystal display device in accordance with the first embodiment.

As an alternative, as illustrated in FIG. 25, the common electrode line 26a may be formed in the vicinity of a lower edge in each of pixels, and the common electrode line 26b may be formed in the vicinity of an upper edge in each of pixels, when viewed through a plan view of a pixel. By forming the common electrode lines 26a and 26b in the vicinity of lower and upper edges of each of pixels, respectively, it would be possible to increase a storage capacitance in comparison with one of the common electrode lines 26a and 26b being formed in the vicinity of a lower or upper edge of each of pixels.

Figure 26:
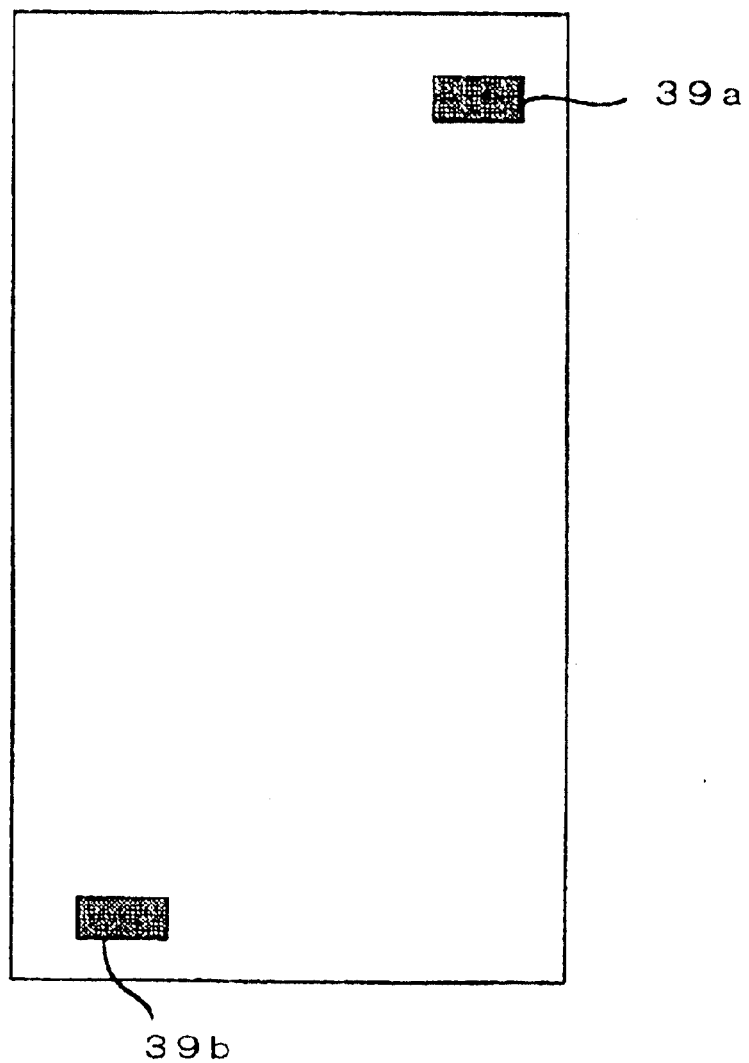
FIG. 26 is a partial plan view of another variant of the in-plane switching mode liquid crystal display device in accordance with the first embodiment.

In a liquid crystal display device in which TFT 30 is positioned in a lower half in each of pixels when viewed through a plan view of a pixel, such as the liquid crystal display device 10 in accordance with the first embodiment, the pixel electrode 27 and a drain layer defining the drain electrode 30a may be electrically connected to each other through a contact hole 39b in the vicinity of a lower edge of each of pixels, and the common electrode 26 and the common electrode line 26b may be electrically connected to each other through a contact hole 39a in the vicinity of an upper edge of each of pixels, when viewed through a plan view of a pixel, for instance, as illustrated in FIG. 26.

Figure 27:
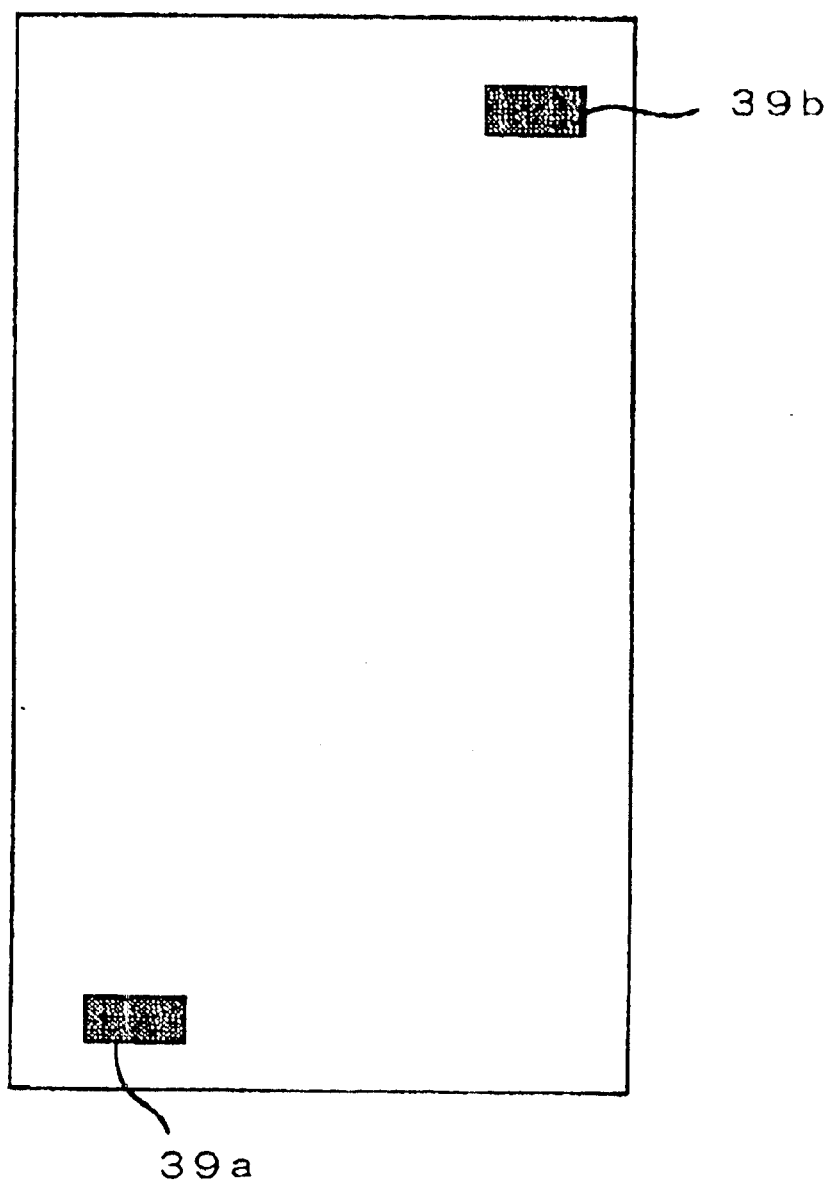
FIG. 27 is a partial plan view of another variant of the in-plane switching mode liquid crystal display device in accordance with the first embodiment.

In a liquid crystal display device in which TFT 30 is positioned in an upper half in each of pixels when viewed through a plan view of a pixel, contrary to the liquid crystal display device 10, the pixel electrode 27 and a drain layer defining the drain electrode 30a may be electrically connected to each other through the contact hole 39b in the vicinity of an upper edge of each of pixels, and the common electrode 26 and the common electrode line 26b may be electrically connected to each other through the contact hole 39a in the vicinity of a lower edge of each of pixels, when viewed through a plan view of a pixel, for instance, as illustrated in FIG. 27.

It would be possible to reduce a total resistance of the common electrode 26 by electrically connecting the common electrode 26 to the common electrode line 26a or 26b through the contact hole 39a or 39b in each of pixels, as mentioned above.

As a method of fabricating the liquid crystal display device 10 in accordance with the first embodiment, first to third examples are explained hereinbelow.

In the first example of the method of fabricating the liquid crystal display device 10, the second interlayer insulating film 25 is designed to have a multi-layered structure including an inorganic film and an organic film, as illustrated in FIGS. 28A to 28K. In the second example of the method of fabricating the liquid crystal display device 10, the second interlayer insulating film 25 is designed to be comprised singly of an organic film, as illustrated in FIGS. 29A to 29I. In the third example of the method of fabricating the liquid crystal display device 10, the second interlayer insulating film 25 is designed to be comprised singly of an inorganic film, as illustrated in FIGS. 30A to 30I.

In FIGS. 28A to 28K, 29A to 29I and 30A to 30I, a region (hereinafter, referred to as "TFT region") in which TFT is to be fabricated, a region (hereinafter, referred to as "pixel region") in which a pixel is to be fabricated, and a region (hereinafter, referred to as "contact hole region") in which a contact hole used for the common electrode 26 is formed are all illustrated in a drawing. The TFT region, the pixel region and the contact hole region are illustrated as cross-sectional views taken along the lines A—A, B—B and C—C in FIG. 10, respectively.

FIRST EXAMPLE

FIGS. 28A to 28K are cross-sectional views of the liquid crystal display device 10, illustrating respective steps of the first example of the method of fabricating the liquid crystal display device 10 including the second interlayer insulating film 25 having a multi-layered structure of an inorganic film and an organic film.

First, as illustrated in FIG. 28A, a chromium layer as the first metal layer is formed on a glass substrate as the electrically insulating transparent substrate 22, and then, is patterned by photolithography and dry etching into the gate electrode 30c and the common electrode lines 26a and 26b. Though only the common electrode line 26b is illustrated in FIGS. 28A to 30I, the common electrode line 26a together with the common electrode line 26b will be explained hereinbelow, because the common electrode line 26a is formed together with the common electrode line 26b.

Then, as illustrated in FIG. 28B, the first interlayer insulating film 23 is formed all over the transparent substrate 22, covering the gate electrode 30c and the common electrode lines 26a and 26b therewith. The first interlayer insulating film 23 has a multi-layered structure of a silicon dioxide ($SiO_2$) film and a silicon nitride (SiNx) film.

Then, as illustrated in FIG. 28C, an amorphous silicon film comprised of an a-Si film 32 and a n+ a-Si film 33 is formed entirely on the first interlayer insulating film 23.

Then, as illustrated in FIG. 28D, the a-Si film 32 and the n+ a-Si film 33 are patterned into an island-shaped semiconductor layer by photolithography and dry etching.

Then, a chromium layer as the second metal layer is formed all over the substrate 22. Then, the chromium layer is patterned into the drain electrode 30a, the source electrode 30b, the data line 24, and the pixel auxiliary electrode 35 by photolithography and dry etching, as illustrated in FIG. 28E.

Then, as illustrated in FIG. 28F, the n+ a-Si film 33 and the a-Si film 32 are etched throughout an entire thickness of the +a-Si film 33 and until a certain depth of the a-Si film 32 at an opening formed between the drain electrode 30a and the source electrode 30b with the drain electrode 30a and the source electrode 30b being used as a mask, to thereby form a channel of TFT 30.

Then, as illustrated in FIG. 28G, the first film 25a comprised of a silicon nitride film as an inorganic film and defining the second interlayer insulating film 25 together with the second film 25b is formed all over the substrate 22.

Then, as illustrated in FIG. 28H, the second film 25b comprised of a photosensitive acrylic resin film as an organic film is formed on the first film 25a.

Then, as illustrated in FIG. 28I, the second film 25b of the second interlayer insulating film 25 is exposed to a light, developed, and then, baked, to thereby form the contact hole 39b reaching the silicon nitride film of the first interlayer insulating film 23 above the source electrode 30b and the contact hole 39a reaching the silicon nitride film of the first interlayer insulating film 23 above the common electrode line 26b.

Figure 28J:
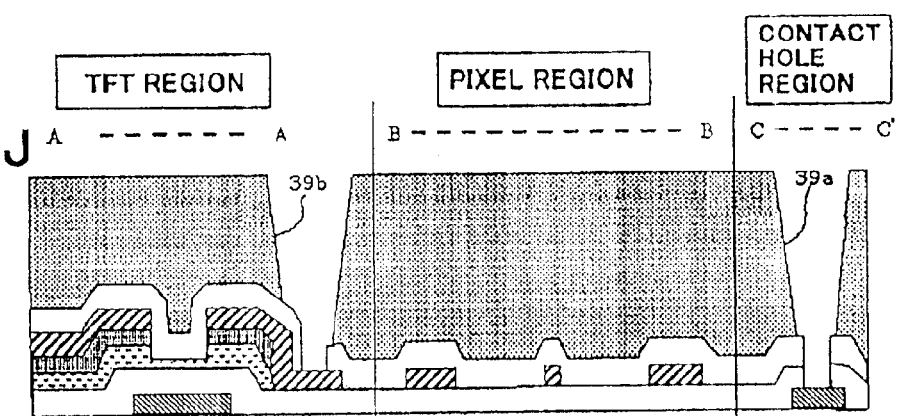

Then, as illustrated in FIG. 28J, the exposed first film 25a is etched through the contact hole 39b, and the exposed first film 25a and the first interlayer insulating film 23 having a multi-layered structure of a silicon dioxide film and a silicon nitride film are etched through the contact hole 39a to thereby allow the contact holes 39a and 39b to reach the source electrode 30b and the common electrode line 26a or 26b, respectively.

Figure 28K:
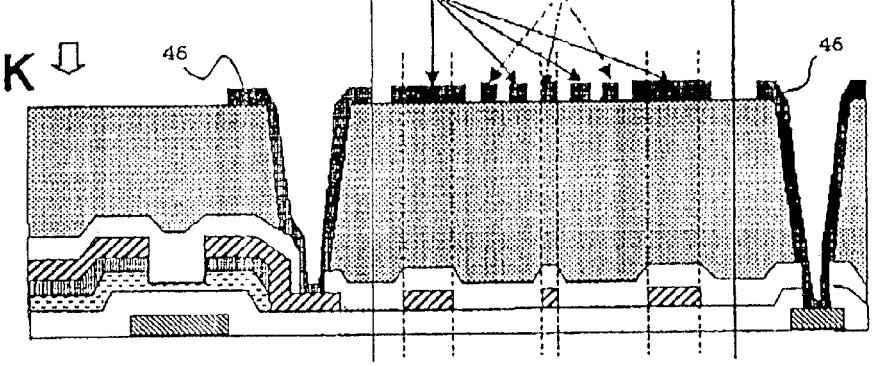

Then, the ITO film 46 is formed all over the resultant such that the contact holes 39a and 39b are covered at inner walls thereof with the ITO film 46. Then, as illustrated in FIG. 28K, the ITO film 46 is etched by photolithography and etching to thereby form the common electrode 26 and the pixel electrode 27 both composed of the ITO film 46 in each of regions where a unit pixel is to be formed.

SECOND EXAMPLE

FIGS. 29A to 29I are cross-sectional views of the liquid crystal display device 10, illustrating respective steps of the second example of the method of fabricating the liquid crystal display device 10 including the second interlayer insulating film 25 comprised singly of an organic film.

First, as illustrated in FIG. 29A, a chromium layer as the first metal layer is formed on a glass substrate as the electrically insulating transparent substrate 22, and then, is patterned by photolithography and dry etching into the gate electrode 30c and the common electrode lines 26a and 26b.

Then, as illustrated in FIG. 29B, the first interlayer insulating film 23 is formed all over the transparent substrate 22, covering the gate electrode 30c and the common electrode lines 26a and 26b therewith. The first interlayer insulating film 23 has a multi-layered structure of a silicon dioxide ($SiO_2$) film and a silicon nitride (SiNx) film.

Then, as illustrated in FIG. 29C, an amorphous silicon film comprised of an a-Si film 32 and a n+ a-Si film 33 is formed entirely on the first interlayer insulating film 23.

Then, as illustrated in FIG. 29D, the a-Si film 32 and the n+ a-Si film 33 are patterned into an island-shaped semiconductor layer by photolithography and dry etching.

Then, a chromium layer as the second metal layer is formed all over the resultant. Then, the chromium layer is patterned into the drain electrode 30a, the source electrode 30b, the data line 24, and the pixel auxiliary electrode 35 by photolithography and dry etching, as illustrated in FIG. 29E.

Then, as illustrated in FIG. 29F, the n+ a-Si film 33 and the a-Si film 32 are etched throughout an entire thickness of the + a-Si film 33 and until a certain depth of the a-Si film 32 at an opening formed between the drain electrode 30a and the source electrode 30b with the drain electrode 30a and the source electrode 30b being used as a mask, to thereby form a channel of TFT 30.

Then, as illustrated in FIG. 29G, the second interlayer insulating film 25 comprised singly of a photosensitive acrylic resin film as an organic film is formed entirely over the resultant.

Then, as illustrated in FIG. 29H, the second interlayer insulating film 25 comprised singly of a photo-sensitive acrylic resin film is exposed to a light and developed to thereby form the contact hole 39b reaching the source electrode 30b and the contact hole 39a reaching the first interlayer insulating film 23 above the common electrode line 26a or 26b.

Then, the exposed first interlayer insulating film 23 is etched through the contact hole 39a to thereby extend the contact hole 39a to the common electrode line 26a or 26b.

Figure 29I:
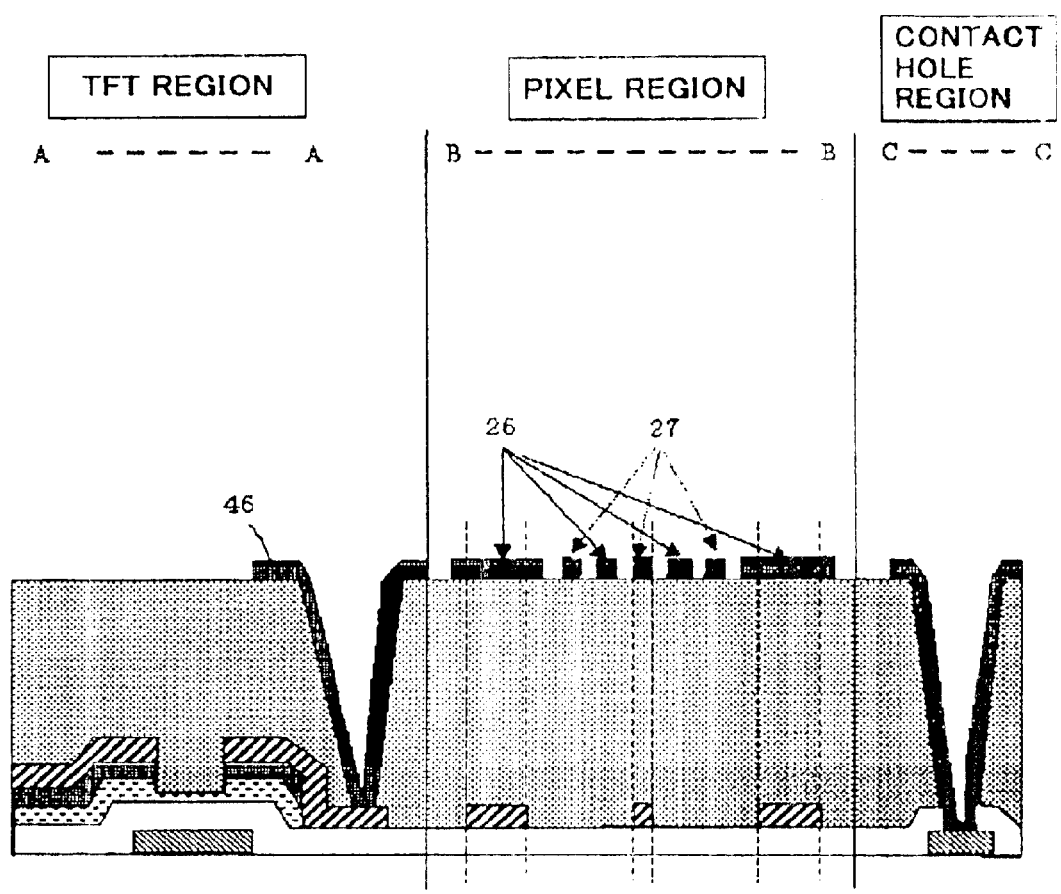

Then, as illustrated in FIG. 29I, the ITO film 46 is formed all over the resultant such that the contact holes 39a and 39b are covered at inner walls thereof with the ITO film 46. Then, the ITO film 46 is etched by photolithography and etching to thereby form the common electrode 26 and the pixel electrode 27 both composed of the ITO film 46.

THIRD EXAMPLE

FIGS. 30A to 30I are cross-sectional views of the liquid crystal display device 10, illustrating respective steps of the third example of the method of fabricating the liquid crystal display device 10 including the second interlayer insulating film 25 comprised singly of an inorganic film.

First, as illustrated in FIG. 30A, a chromium layer as the first metal layer is formed on a glass substrate as the electrically insulating transparent substrate 22, and then, is patterned by photolithography and dry etching into the gate electrode 30c and the common electrode lines 26a and 26b.

Then, as illustrated in FIG. 30B, the first interlayer insulating film 23 is formed all over the transparent substrate 22, covering the gate electrode 30c and the common electrode lines 26a and 26b therewith. The first interlayer insulating film 23 has a multi-layered structure of a silicon dioxide ($SiO_2$) film and a silicon nitride (SiNx) film.

Then, as illustrated in FIG. 30C, an amorphous silicon film comprised of an a-Si film 32 and a n+ a-Si film 33 is formed entirely on the first interlayer insulating film 23.

Then, as illustrated in FIG. 30D, the a-Si film 32 and the n+ a-Si film 33 are patterned into an island-shaped semiconductor layer by photolithography and dry etching.

Then, a chromium layer as the second metal layer is formed all over the resultant. Then, the chromium layer is patterned into the drain electrode 30a, the source electrode 30b, the data line 24, and the pixel auxiliary electrode 35 by photolithography and dry etching, as illustrated in FIG. 30E.

Then, as illustrated in FIG. 30F, the n+ a-Si film 33 and the a-Si film 32 are etched throughout an entire thickness of the +a-Si film 33 and until a certain depth of the a-Si film 32 at an opening formed between the drain electrode 30a and the source electrode 30b with the drain electrode 30a and the source electrode 30b being used as a mask, to thereby form a channel of TFT 30.

Then, as illustrated in FIG. 30G, the second interlayer insulating film 25 comprised singly of a silicon nitride film as an inorganic film is formed entirely over the resultant.

Then, as illustrated in FIG. 30H, the second interlayer insulating film 25 comprised singly of a silicon nitride film is etched by photolithography to thereby form the contact holes 39a and 39b. Then, the first interlayer insulating film 23 is etched through the contact hole 39a. Thus, the contact hole 39b reaches the source electrode 30b, and the contact hole 39a reaches the common electrode lines 26a and 26b.

Figure 30I:
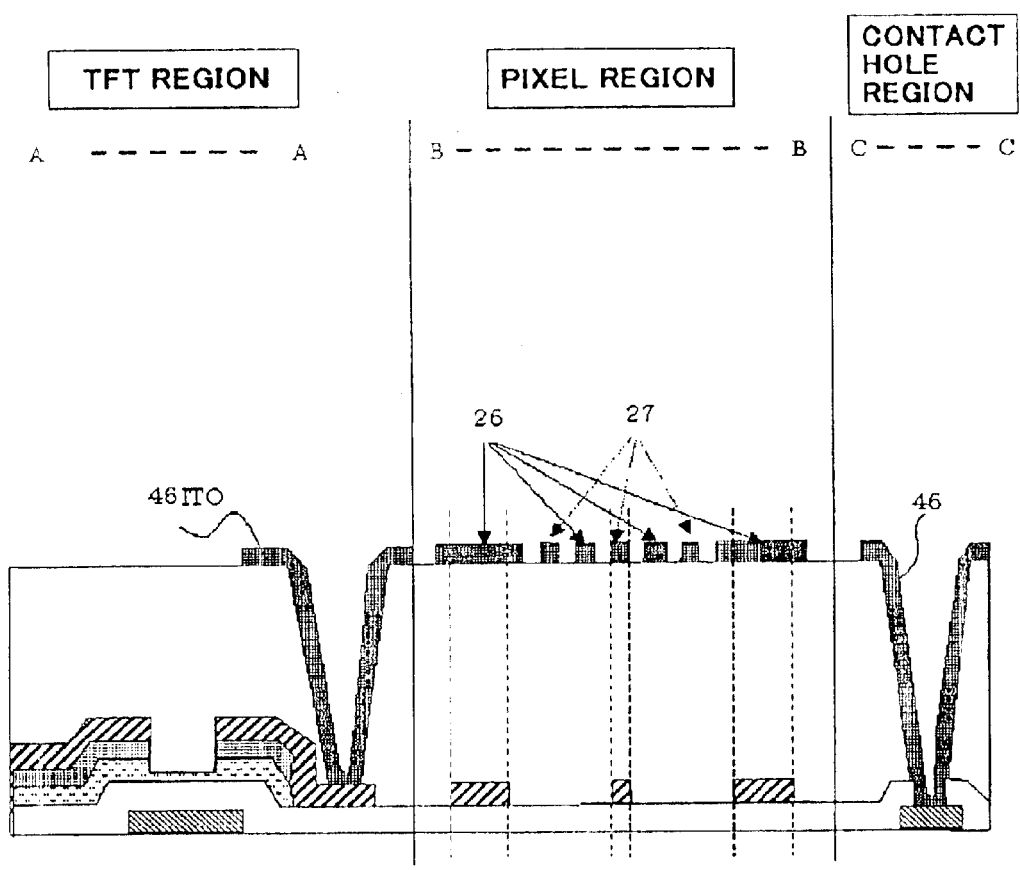

Then, as illustrated in FIG. 30I, the ITO film 46 is formed all over the resultant such that the contact holes 39a and 39b are covered at inner walls thereof with the ITO film 46.

Then, the ITO film 46 is etched by photolithography and etching to thereby form the common electrode 26 and the pixel electrode 27 both composed of the ITO film 46.

By carrying out the above-mentioned first, second or third examples of the method of fabricating the liquid crystal display device 10, a scanning line terminal, a data line terminal and a common electrode line terminal are formed around the TFT region, the pixel region and the contact hole region. Hereinbelow are explained the steps of forming those regions.

Figure 31:
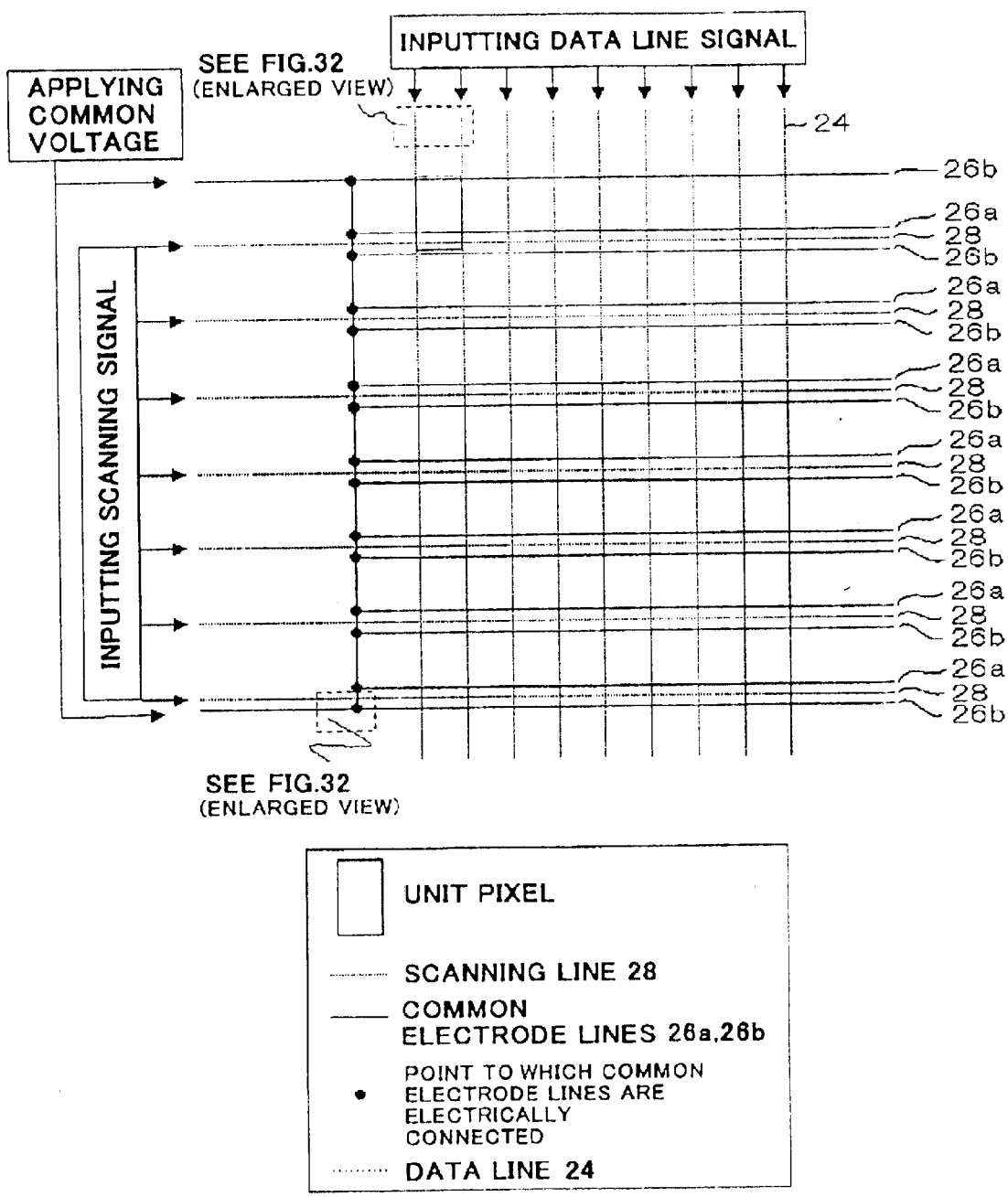
FIG. 31 is a plan view illustrating an arrangement of the scanning line, the data line and the common electrode line in the in-plane switching mode liquid crystal display device in accordance with the first embodiment.
Figure 32:
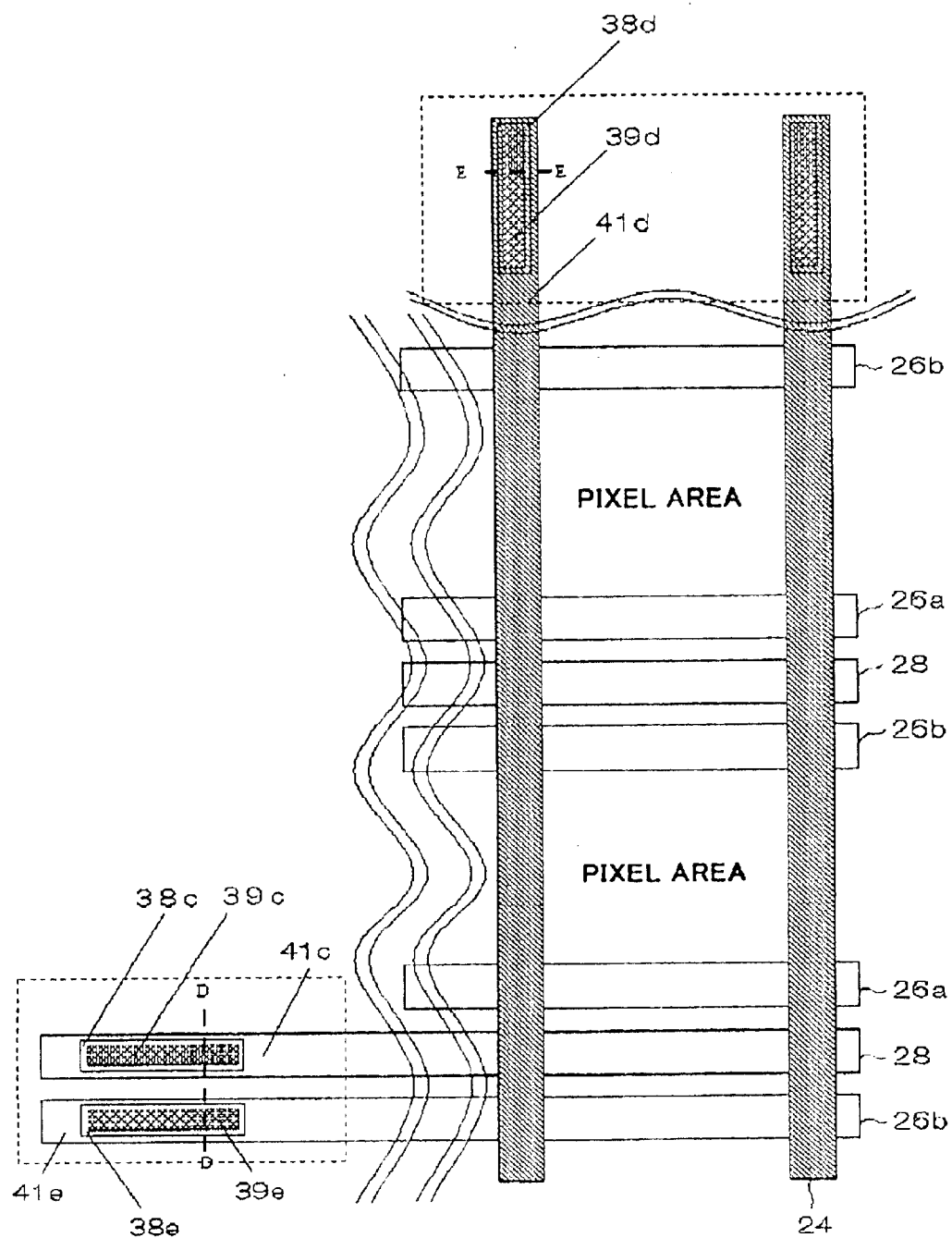
FIG. 32 is a plan view illustrating an arrangement of the scanning line terminal, the data line terminal and the common electrode line terminal in the in-plane switching mode liquid crystal display device in accordance with the first embodiment.

FIG. 31 illustrates an arrangement of the scanning line 28, the data line 24, and the common electrode lines 26a and 26b in the liquid crystal display device 10, and FIG. 32 illustrates a positional relation among a scanning line terminal 41c, a data line terminal 41d and a common electrode line terminal 41d in the liquid crystal display device 10. FIG. 32 illustrates an arrangement in which the common electrode lines 26a and 26b are formed in the vicinity of upper and lower edges in each of pixels, as illustrated in FIG. 25.

With reference to FIG. 31, the scanning line 28 horizontally extends in the vicinity of a lower edge in each of pixels, the common electrode line 26a extends immediately above and in parallel with the scanning line 28, and the common electrode line 26b horizontally extends in the vicinity of an upper edge in each of pixels. The scanning line 28 and the common electrode lines 26a and 26b are comprised of the first metal layer. In FIG. 31, the data line 24 extends perpendicularly to the scanning line 28 and the common electrode lines 26a and 26b in the vicinity of boundaries between pixels. The data line 24 is comprised of the second metal layer. The common electrode lines 26a and 26b are electrically connected to each other outside a pixel area where a plurality of pixels are arranged in a matrix.

With reference to FIG. 32, the common electrode line terminal 41e and the scanning line terminal 41c are located outside and at the left of the pixel area, and the data line terminal 41d is located outside and above the pixel area. The common electrode line terminal 41e, the scanning line terminal 41c and the data line terminal 41d are formed with contact holes 39e, 39c and 39d, respectively. The contact holes 39e, 39c and 39d are covered with ITO covers 38e, 38c and 38d, respectively.

Hereinbelow are explained three examples of a method of fabricating the liquid crystal display device 10. In the first example, the second interlayer insulating film 25 is designed to have a multi-layered structure including an inorganic film and an organic film, as illustrated in FIGS. 33A to 33J. In the second example, the second interlayer insulating film 25 is designed to be comprised singly of an organic film, as illustrated in FIGS. 34A to 34I. In the third example, the second interlayer insulating film 25 is designed to be comprised singly of an inorganic film, as illustrated in FIGS. 35A to 35H.

In FIGS. 33A to 33J, 34A to 34I and 35A to 35H, the common electrode line terminal 41e, the scanning line terminal 41c and the data line terminal 41d are all illustrated in a single drawing. The common electrode line terminal 41e and the scanning line terminal 41c are illustrated as a cross-sectional view taken along the line D—D in FIG. 32, and the data line terminal 41d is illustrated as a cross-sectional view taken along the line E—E in FIG. 32.

FIRST EXAMPLE

FIGS. 33A to 33J are cross-sectional views of the liquid crystal display device 10, illustrating respective steps of the first example of the method of fabricating the liquid crystal display device 10 including the second interlayer insulating film 25 having a multi-layered structure of an inorganic film and an organic film.

First, as illustrated in FIG. 33A, a chromium layer as the first metal layer is formed on a glass substrate as the electrically insulating transparent substrate 22, and then, is patterned by photolithography and dry etching into the common electrode lines 26a and 26b and the scanning line 28 in both the common electrode line terminal 41e and the scanning line terminal 41c.

Though only the common electrode line 26b is illustrated in FIGS. 33A to 35H, the common electrode line 26a together with the common electrode line 26b will be explained hereinbelow, because the common electrode line 26a is formed together with the common electrode line 26b.

Then, as illustrated in FIG. 33B, the first interlayer insulating film 23 is formed all over the transparent substrate 22, covering the common electrode lines 26a and 26b and the scanning line 28 therewith. The first interlayer insulating film 23 has a multi-layered structure of a silicon dioxide ($SiO_2$) film and a silicon nitride (SiNx) film.

Then, as illustrated in FIG. 33C, an amorphous silicon film (a-Si) film 32 is formed entirely on the first interlayer insulating film 23.

Then, as illustrated in FIG. 33D, a n+ a-Si film 33 is formed entirely on the a-Si film 32.

Then, the a-Si film 32 and the n+ a-Si film 33 are patterned into an island (for instance, see FIG. 28D). Then, a chromium layer as the second metal layer is formed on the transparent substrate 22, covering the island-shaped a-Si film 32 and the n+ a-Si film 33 therewith.

Then, as illustrated in FIG. 33E, the chromium layer is patterned by photolithography and dry etching into the data line 24 in the data line terminal 41d.

Then, as illustrated in FIG. 33F, the first film 25a comprised of a silicon nitride film as an inorganic film and defining the second interlayer insulating film 25 together with the second film 25b is formed all over the first interlayer insulating film 23, covering the data line 24 therewith.

Figure 33G:
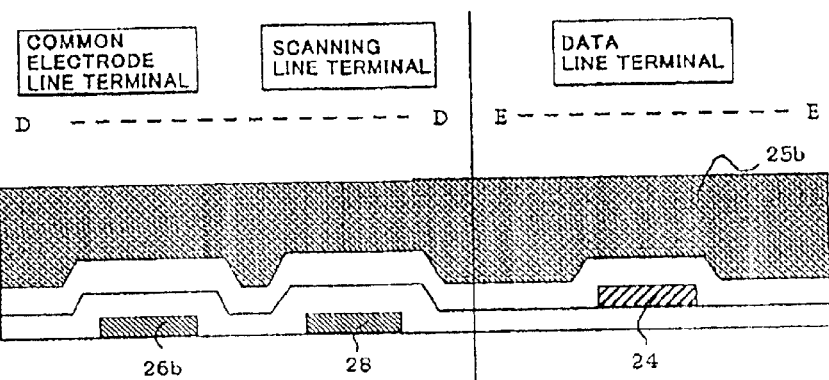

Then, as illustrated in FIG. 33G, the second film 25b comprised of a photosensitive acrylic resin film as an organic film is formed on the first film 25a.

Figure 33H:
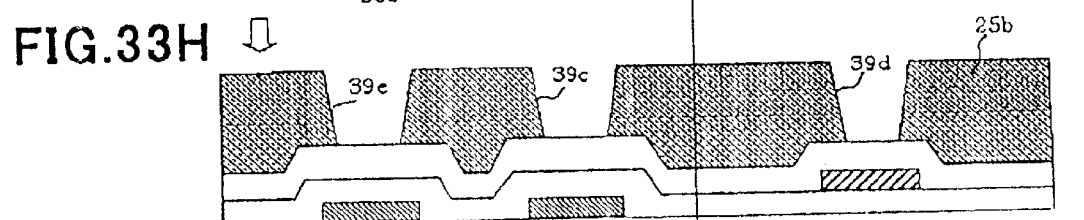

Then, as illustrated in FIG. 33H, the second film 25b of the second interlayer insulating film 25 is etched to thereby form contact holes 39e and 39c both reaching the first film 25a above the common electrode lines 26a and 26b and the scanning line 28, in both the common electrode line terminal 41e and the scanning line terminal 41c, and further form a contact hole 39d reaching the first film 25a above the data line 24, in the data line terminal 41d.

Figure 33I:
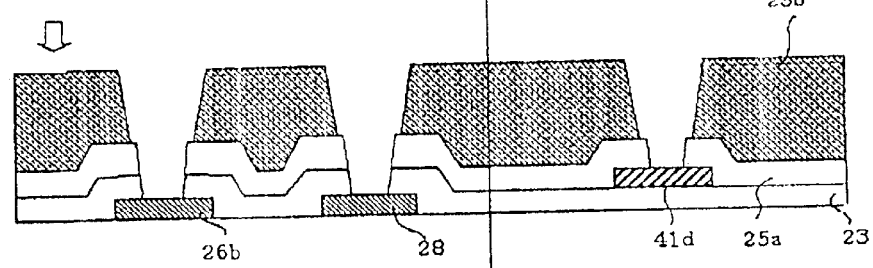

Then, as illustrated in FIG. 33I, the first film 25a exposed through the contact holes 39e, 39c and 39d and the first interlayer insulating film 23 are etched through the contact holes 39e, 39c and 39d to thereby allow the contact holes 39e, 39c and 39d to reach the common electrode line 26b, the scanning line 28 and the data line 24, respectively.

Figure 33J:
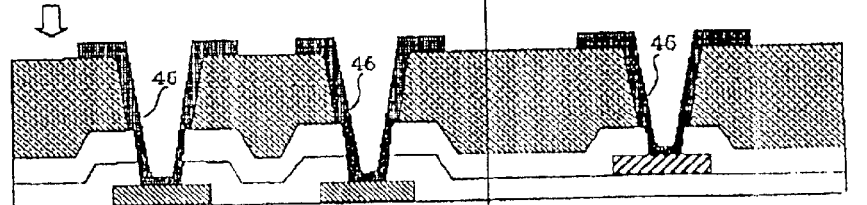

Then, the ITO film 46 is formed all over the resultant such that the contact holes 39e, 39c and 39d are covered at inner walls thereof with the ITO film 46. Then, as illustrated in FIG. 33J, the ITO film 46 is patterned by photolithography and etching such that the ITO film 46 makes electrical contact with the common electrode line 26b, the scanning line 28 and the data line 24 at bottoms of the contact holes 39e, 39c and 39d, respectively.

SECOND EXAMPLE

FIGS. 34A to 34I are cross-sectional views of the liquid crystal display device 10, illustrating respective steps of the second example of the method of fabricating the liquid crystal display device 10 including the second interlayer insulating film 25 comprised singly of an organic film.

First, as illustrated in FIG. 34A, a chromium layer as the first metal layer is formed on a glass substrate as the electrically insulating transparent substrate 22, and then, is patterned by photolithography and dry etching into the common electrode lines 26a and 26b and the scanning line 28 in both the common electrode line terminal 41e and the scanning line terminal 41c.

Then, as illustrated in FIG. 34B, the first interlayer insulating film 23 is formed all over the transparent substrate 22, covering the common electrode lines 26a and 26b and the scanning line 28 therewith. The first interlayer insulating film 23 has a multi-layered structure of a silicon dioxide ($SiO_2$) film and a silicon nitride (SiNx) film.

Then, as illustrated in FIG. 34C, an amorphous silicon film (a-Si) film 32 is formed entirely on the first interlayer insulating film 23.

Then, as illustrated in FIG. 34D, a n+ a-Si film 33 is formed entirely on the a-Si film 32.

Then, the a-Si film 32 and the n+ a-Si film 33 are patterned into an island (for instance, see FIG. 28D). Then, a chromium layer as the second metal layer is formed on the transparent substrate 22, covering the island-shaped a-Si film 32 and the n+ a-Si film 33 therewith.

Then, as illustrated in FIG. 34E, the chromium layer is patterned by photolithography and dry etching into the data line 24 in the data line terminal 41d.

Then, as illustrated in FIG. 34F, the second interlayer insulating film 25 comprised of a photo-sensitive acrylic resin film as an organic film is formed all over the first interlayer insulating film 23, covering the data line 24 therewith.

Then, as illustrated in FIG. 34G, the second interlayer insulating film 25 is etched to thereby form contact holes 39e and 39c both reaching the first interlayer insulating film 23 above the common electrode lines 26a and 26b and the scanning line 28, in both the common electrode line terminal 41e and the scanning line terminal 41c, and further form a contact hole 39d reaching the data line 24, in the data line terminal 41d.

Then, as illustrated in FIG. 34H, the first interlayer insulating film 23 exposed through the contact holes 39e, and 39c is etched through the contact holes 39e and 39c to thereby allow the contact hole 39e to reach the common electrode lines 26a and 26b, and further allow the contact hole 39c to reach the scanning line 28.

Then, the ITO film 46 is formed all over the resultant such that the contact holes 39e, 39c and 39d are covered at inner walls thereof with the ITO film 46. Then, as illustrated in FIG. 34I, the ITO film 46 is patterned by photolithography and etching such that the ITO film 46 makes electrical contact with the common electrode lines 26a and 26b, the scanning line 28 and the data line 24 at bottoms of the contact holes 39e, 39c and 39d, respectively.

THIRD EXAMPLE

FIGS. 35A to 35H are cross-sectional views of the liquid crystal display device 10, illustrating respective steps of the third example of the method of fabricating the liquid crystal display device 10 including the second interlayer insulating film 25 comprised singly of an inorganic film.

First, as illustrated in FIG. 35A, a chromium layer as the first metal layer is formed on a glass substrate as the electrically insulating transparent substrate 22, and then, is patterned by photolithography and dry etching into the common electrode lines 26a and 26b and the scanning line 28 in both the common electrode line terminal 41e and the scanning line terminal 41c.

Then, as illustrated in FIG. 35B, the first interlayer insulating film 23 is formed all over the transparent substrate 22, covering the common electrode lines 26a and 26b and the scanning line 28 therewith. The first interlayer insulating film 23 has a multi-layered structure of a silicon dioxide ($SiO_2$) film and a silicon nitride (SiNx) film.

Then, as illustrated in FIG. 35C, an amorphous silicon film (a-Si) film 32 is formed entirely on the first interlayer insulating film 23.

Then, as illustrated in FIG. 35D, a n+ a-Si film 33 is formed entirely on the a-Si film 32.

Then, the a-Si film 32 and the n+ a-Si film 33 are patterned into an island (for instance, see FIG. 28D). Then, a chromium layer as the second metal layer is formed on the transparent substrate 22, covering the island-shaped a-Si film 32 and the n+ a-Si film 33 therewith.

Then, as illustrated in FIG. 35E, the chromium layer is patterned by photolithography and dry etching into the data line 24 in the data line terminal 41d.

Figure 35F:
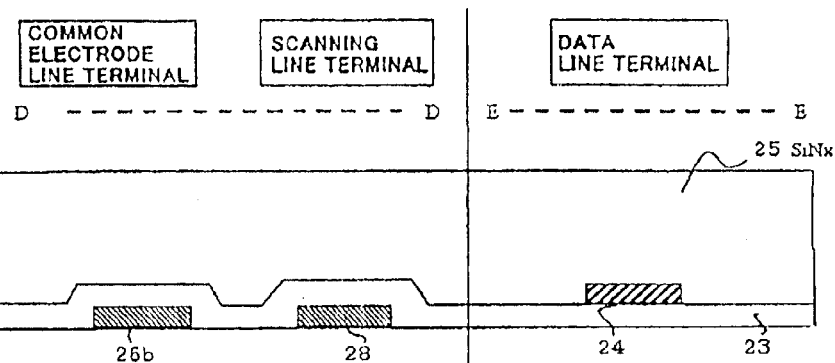

Then, as illustrated in FIG. 35F, the second interlayer insulating film 25 comprised of a silicon nitride film as an inorganic film is formed all over the first interlayer insulating film 23, covering the data line 24 therewith.

Figure 35G:
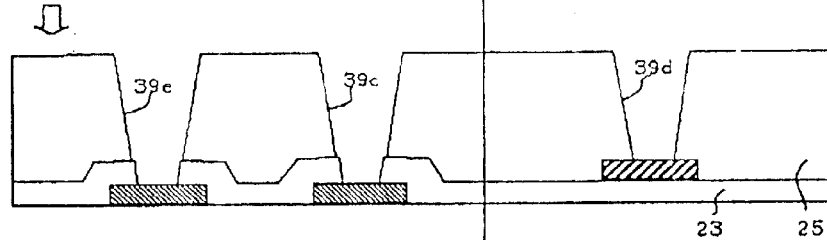

Then, as illustrated in FIG. 35G, the second interlayer insulating film 25 is etched to thereby form contact holes 39e and 39c both reaching the first interlayer insulating film 23 above the common electrode lines 26a and 26b and the scanning line 28, in both the common electrode line terminal 41e and the scanning line terminal 41c, and further form a contact hole 39d reaching the data line 24, in the data line terminal 41d.

Then, the first interlayer insulating film 23 exposed through the contact holes 39e, and 39c is etched through the contact holes 39e and 39c to thereby allow the contact hole 39e to reach the common electrode lines 26a and 26b, and further allow the contact hole 39c to reach the scanning line 28.

Figure 35H:
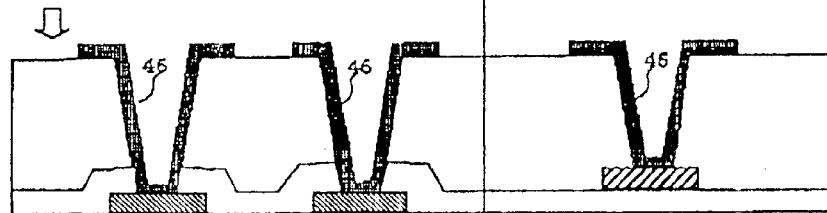

Then, as illustrated in FIG. 35H, the ITO film 46 is formed all over the resultant such that the contact holes 39e, 39c and 39d are covered at inner walls thereof with the ITO film 46. Then, the ITO film 46 is patterned by photolithography and etching such that the ITO film 46 makes electrical contact with the common electrode lines 26a and 26b, the scanning line 28 and the data line 24 at bottoms of the contact holes 39e, 39c and 39d, respectively.

[Second Embodiment]

Figure 36:
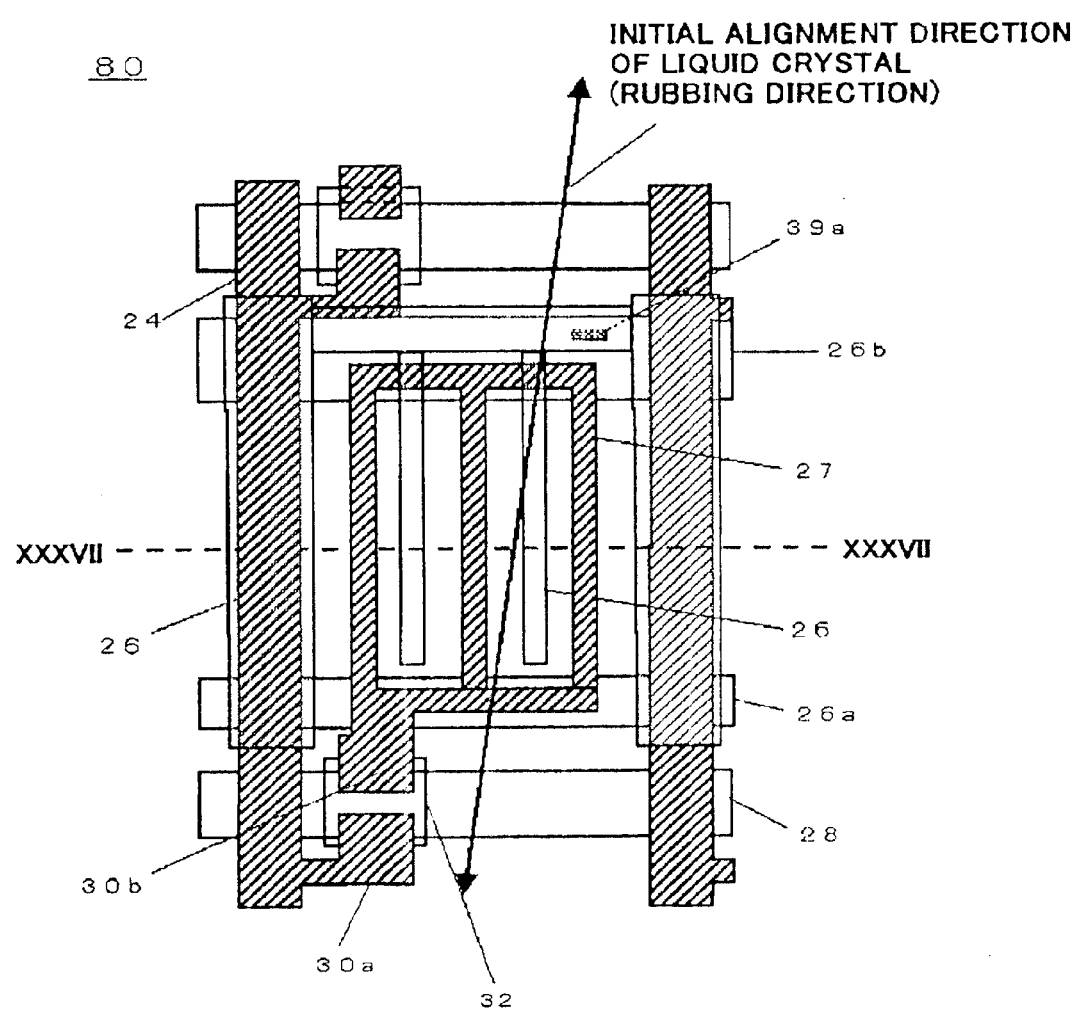
FIG. 36 is a plan view of the in-plane switching mode liquid crystal display device in accordance with the second embodiment of the present invention.
Figure 37:
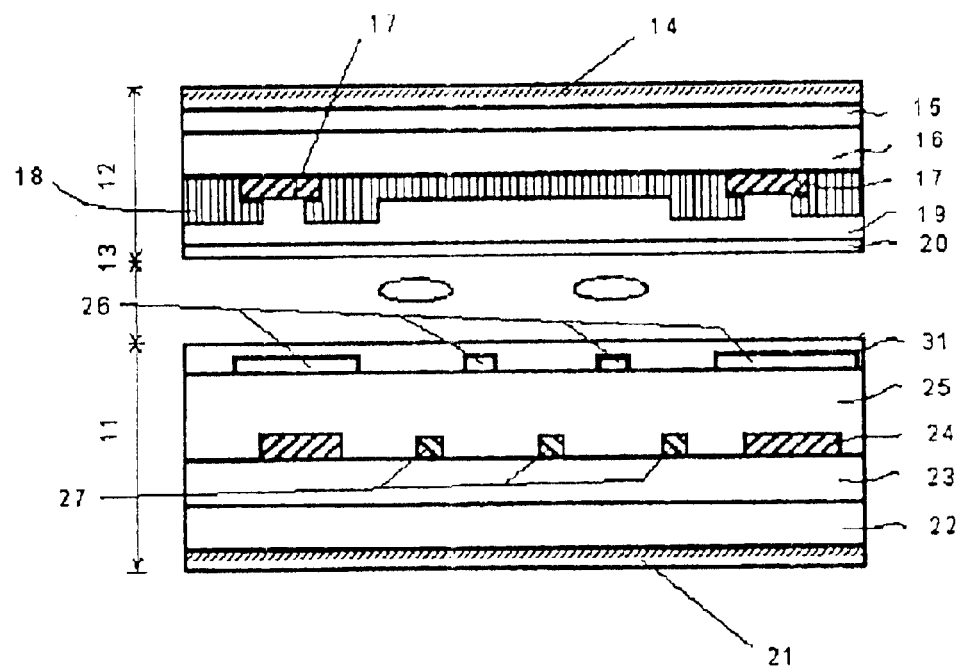
FIG. 37 is a cross-sectional view taken along the line XXX VII—XXX VII in FIG. 36.

FIGS. 36 and 37 illustrate an in-plane switching mode liquid crystal display device 80 in accordance with the second embodiment of the present invention. FIG. 36 is a plan view of the liquid crystal display device 80, and FIG. 37 is a cross-sectional view taken along the line XXX VII—XXX VII in FIG. 36.

The in-plane switching mode liquid crystal display device 80 in accordance with the second embodiment is structurally different from the liquid crystal display device 10 in accordance with the first embodiment 10 illustrated in FIGS. 4 and 5 in that the pixel electrode 27 is formed not on the second film 25b of the second interlayer insulating film 25, but on the first interlayer insulating film 23, and that, the pixel electrode 27 is comprised of the second metal layer.

Since the pixel electrode 27 is comprised of the second metal layer 27, the liquid crystal display device 80 has a smaller aperture ratio than that of the liquid crystal display device 10. However, since the pixel electrode 27 is comprised of a layer different from a layer of which the common electrode 26 is formed, in the second embodiment, the pixel electrode 27 and the common electrode 26 would not be short-circuited to each other, ensuring enhancement in a fabrication yield.

[Third Embodiment]

Figure 38:
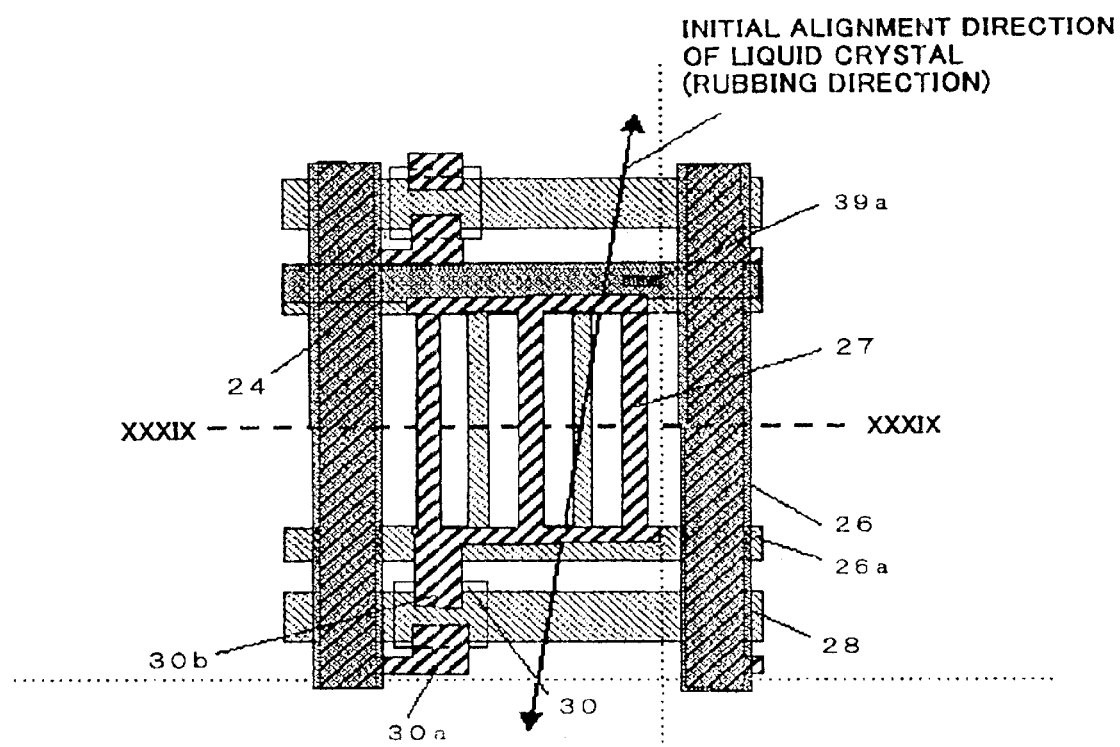
FIG. 38 is a plan view of the in-plane switching mode liquid crystal display device in accordance with the third embodiment of the present invention.
Figure 39:
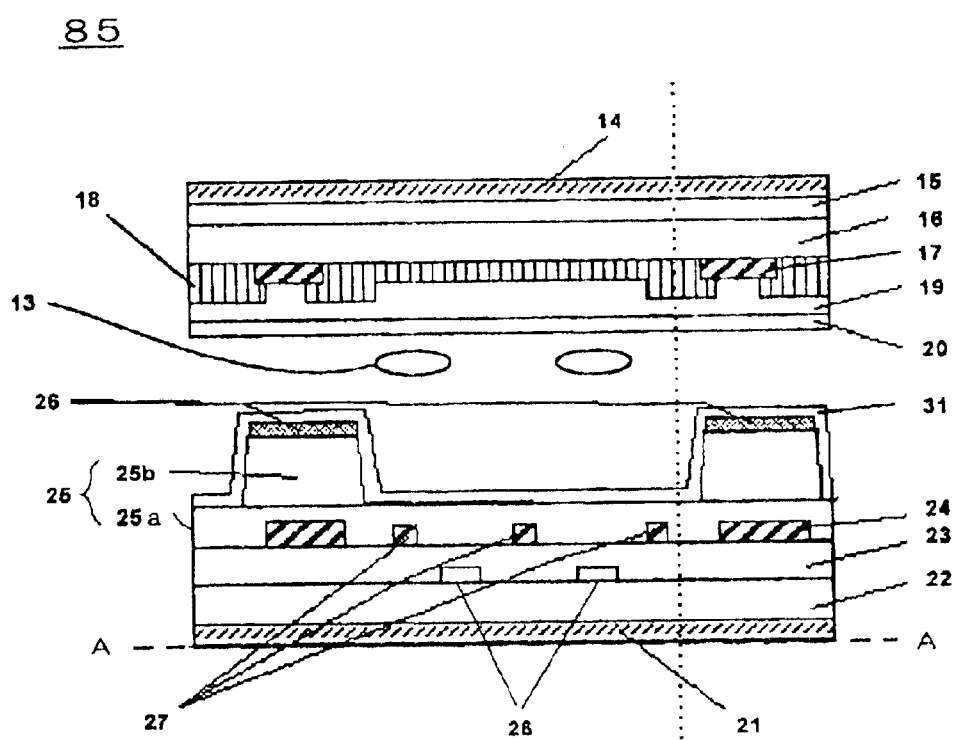
FIG. 39 is a cross-sectional view taken along the line XXX IX—XXX IX in FIG. 38.

FIGS. 38 and 39 illustrate an in-plane switching mode liquid crystal display device 85 in accordance with the third embodiment of the present invention. FIG. 38 is a plan view of the liquid crystal display device 85, and FIG. 39 is a cross-sectional view taken along the line XXX IX—XXX IX in FIG. 38.

As illustrated in FIG. 39, in the in-plane switching mode liquid crystal display device 85 in accordance with the third embodiment, the first film 25a constituting the second interlayer insulating film 25 together with the second film 25b is formed entirely over a pixel area, whereas the second film 25b is formed only below the common electrode 26.

In a display area of a pixel, the common electrode 26 is comprised of the first metal layer of which the gate electrode is formed, in an area other than an area in which the common electrode 26 is composed of transparent metal, overlapping the data line 24.

In accordance with the third embodiment, it is no longer necessary to form the second film 25b in a large area more than necessary, and thereby, it would be possible to prevent an increase in a parasitic capacity between the common electrode 26 and the data line 24.

The pixel electrode 27 may be formed on the first interlayer insulating film 23 together with the data line 24.

Since the common electrode 26 is comprised of the first metal layer in an area other than an area in which the common electrode 26 is composed of a transparent metal film formed on the second film 25b, the in-plane switching mode liquid crystal display device 85 in accordance with the third embodiment has a smaller aperture ratio than that of the liquid crystal display device 10 in accordance with the first embodiment. However, since the common electrode 26 is comprised of a layer different from a layer of which the pixel electrode 27 is formed, the common electrode 26 and the pixel electrode 27 would not be short-circuited to each other, ensuring enhancement in a fabrication yield.

[Fourth Embodiment]

Figure 40:
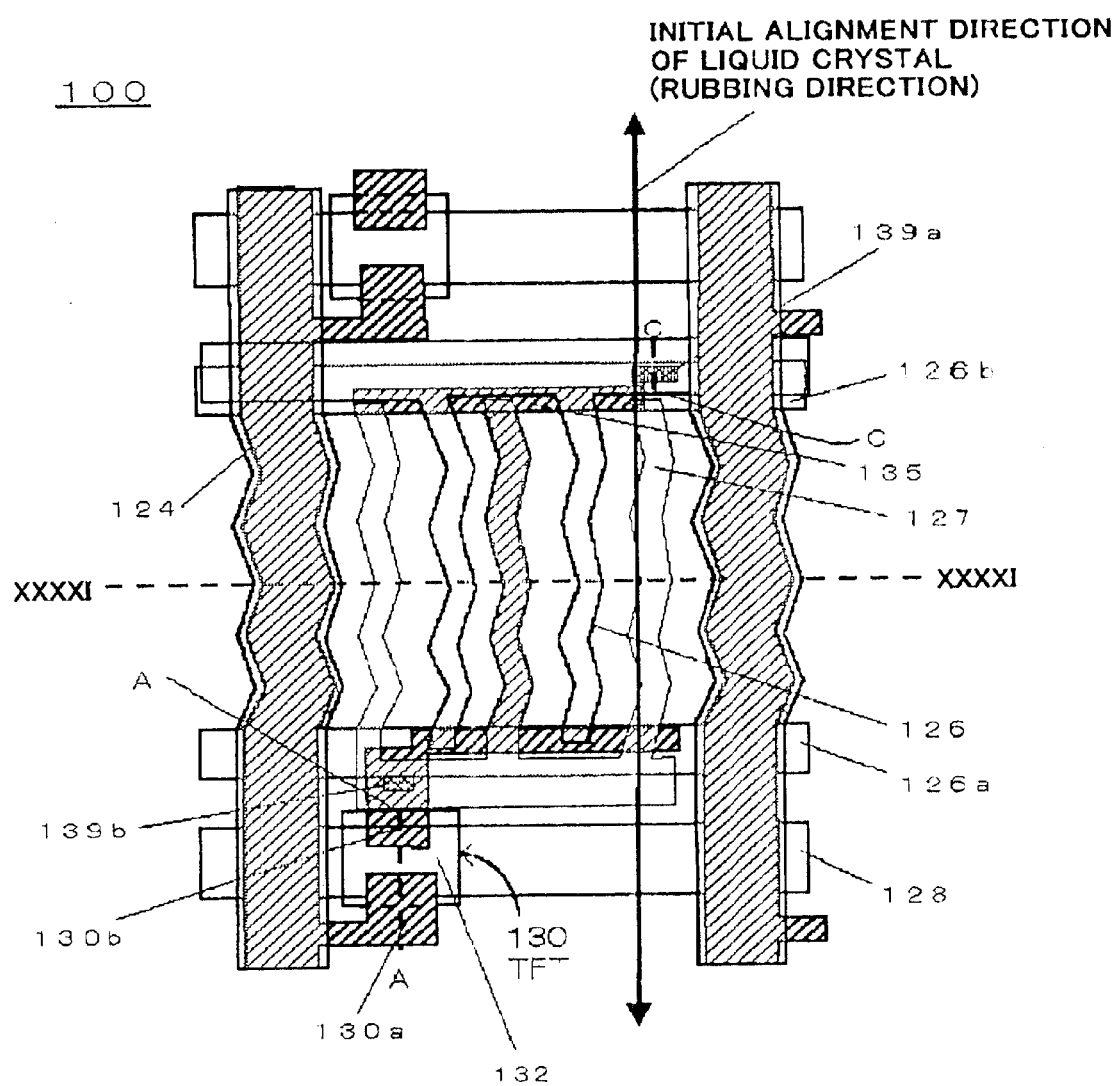
FIG. 40 is a plan view of the in-plane switching mode liquid crystal display device in accordance with the fourth embodiment of the present invention.
Figure 41:
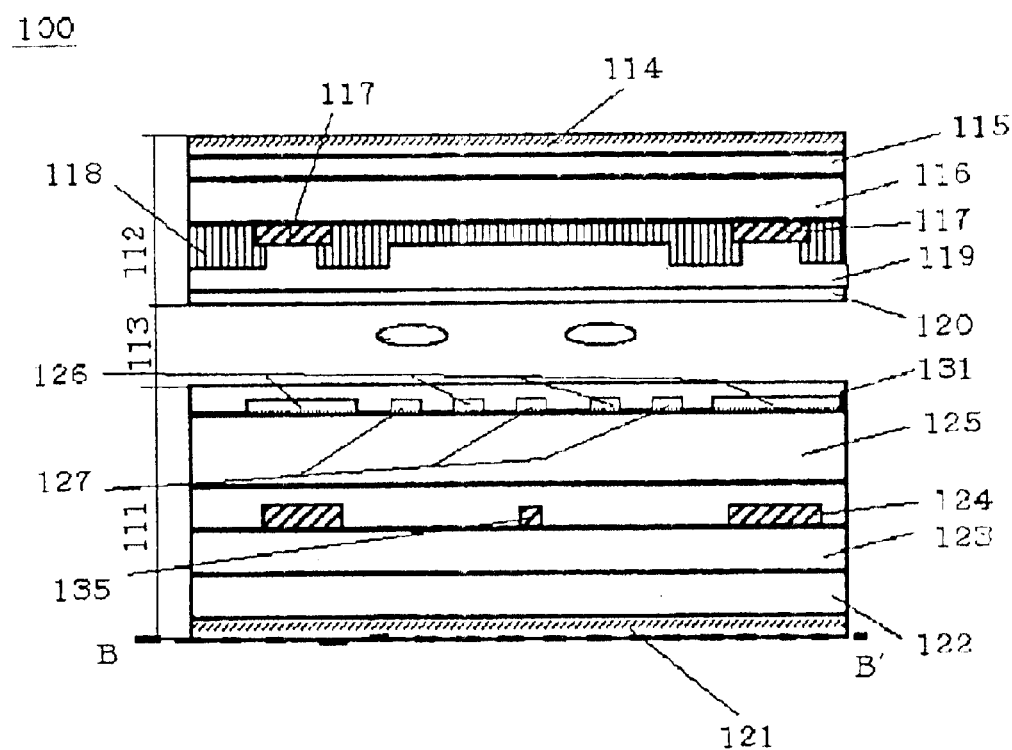
FIG. 41 is a cross-sectional view taken along the line XXXX I—XXXX I in FIG. 40.
Figure 64:
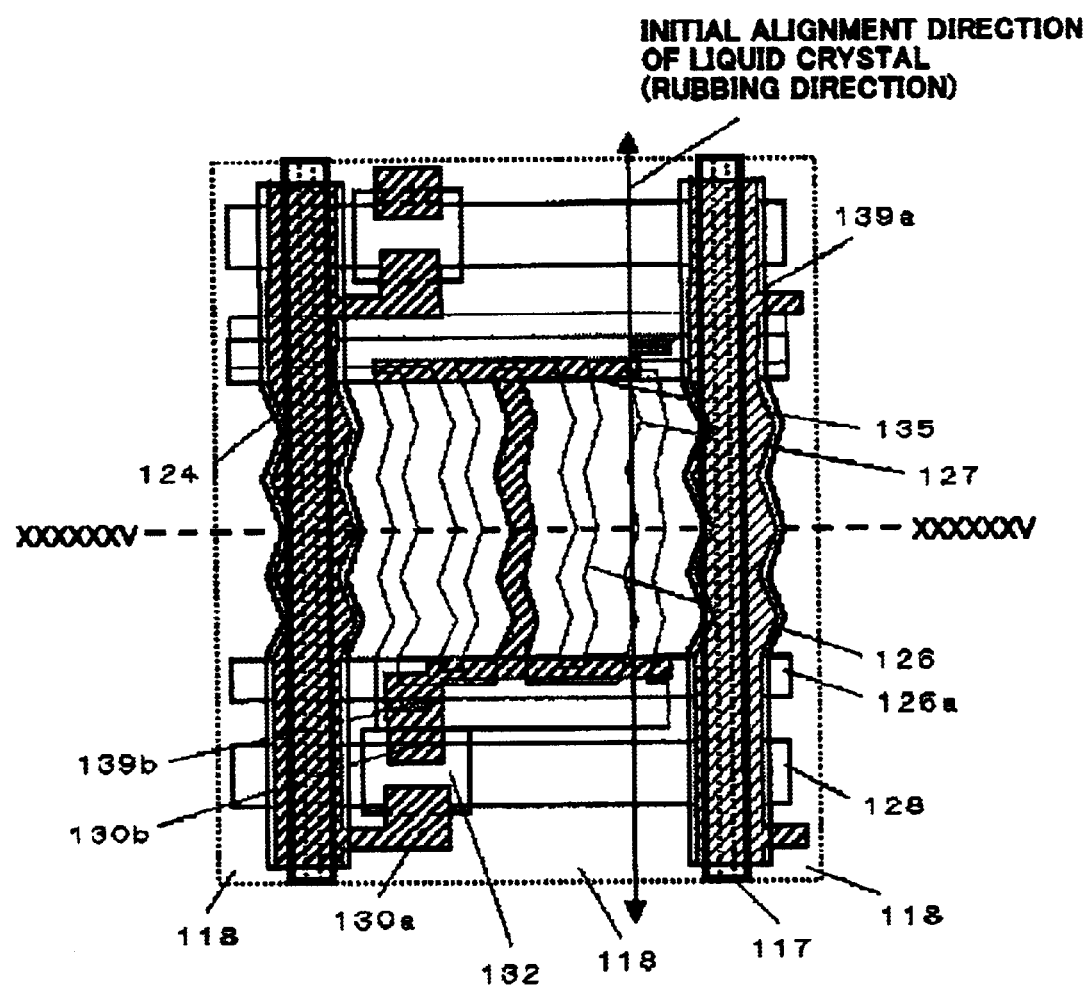
FIG. 64 is a plan view of the in-plane switching mode liquid crystal display device in accordance with the eighth embodiment of the present invention.

FIGS. 40 and 41 illustrate an in-plane switching mode liquid crystal display device 100 in accordance with the fourth embodiment of the present invention. FIG. 40 is a plan view of the liquid crystal display device 100, and FIG. 41 is a cross-sectional view taken along the line XXXX I—XXXX I in FIG. 40. In FIG. 64, a TFT region, a pixel region, and a contact hole region are illustrated all in a single drawing. The TFT region, the pixel region and the contact hole region are illustrated as cross-sectional views taken along the lines A—A, XXXX I—XXXX I, and C—C in FIG. 40, respectively.

As illustrated in FIG. 41, the liquid crystal display device 100 is comprised of an active device substrate 111, an opposing substrate 112, and a liquid crystal layer 113 sandwiched between the active device substrate 111 and the opposing substrate 112.

The opposing substrate 112 includes an electrically insulating transparent substrate 116, a black matrix layer 117 formed on a first surface of the electrically insulating transparent substrate 116 as a light-impermeable film, a color layer 118 formed on the first surface of the electrically insulating transparent substrate 116 such that the color layer 118 partially overlaps the black matrix layer 117, and a transparent over-coating layer 119 covering the black matrix layer 117 and the color layer 118 therewith.

The color layer 118 is comprised of resin films containing red (R), green (G) and blue (B) pigments.

The opposing substrate 112 further includes an electrically conductive transparent layer 115 on a second surface of the electrically insulating transparent substrate 116 in order to prevent electric charges caused by contact of a liquid crystal display panel with other materials, from exerting electrical influence on the liquid crystal layer 113.

The active matrix substrate 11 includes an electrically insulating transparent substrate 122, a first metal layer formed on the electrically insulating transparent substrate 122 and defining a scanning line 128 and a gate electrode 130c therein, a first interlayer insulating film 123 formed on the electrically insulating transparent substrate 122, an island-shaped amorphous silicon film formed on the first interlayer insulating film 123, a second metal layer defining a data line 124, and a source electrode 130b and a drain electrode 130a of a thin film transistor (TFT) 130 therein, a first film 25a formed on the first interlayer insulating film 123, a second film 125b formed on the first film 125a, and a common electrode 26 and a pixel electrode 27 formed as transparent electrodes on the second film 125b.

The island-shaped amorphous silicon film has a multi-layered structure comprised of an a-Si film 132, and a n+ a-Si film 133 formed on the a-Si film 132.

The first and second films 125a and 125b constitute a second electrically insulating film 125.

The active matrix substrate 111 further includes a pixel auxiliary electrode 135 formed on the first interlayer insulating film 123 together with the data lines 124. The data lines 124 and the pixel auxiliary electrode 135 are composed of the second metal layer.

The active device substrate 111 and the opposing substrate 112 include alignment films 131 and 132, respectively, both making contact with the liquid crystal layer 113. After being rubbed in a direction indicated in FIG. 40, the active device substrate 111 and the opposing substrate 112 are coupled with each other.

Though not illustrated, spacers are sandwiched between the active device substrate 111 and the opposing substrate 112 to ensure a thickness of the liquid crystal layer 113, and a seal is formed around the liquid crystal layer 113 between the active device substrate 111 and the opposing substrate 112 for avoiding leakage of liquid crystal molecules.

The active device substrate 111 further includes a polarizing plate 121 formed on a lower surface of the electrically insulating transparent substrate 122, and similarly, the opposing substrate 112 includes a polarizing plate 114 formed on the electrically conductive layer 115. The polarizing plate 121 of the active device substrate 111 has a polarization axis extending perpendicularly to the liquid crystal initial alignment direction, and the polarizing plate 114 of the opposing substrate 112 has a polarization axis extending in parallel to the liquid crystal initial alignment direction. The polarization axes extend perpendicularly to each other.

As illustrated in FIG. 40, the active device substrate 111 includes data lines 24 to which data signals are transmitted, a common electrode 26 to which a reference voltage is applied, a pixel electrode 27 associated with pixels in which images are to be displayed, a scanning line 28 to which a scanning signal is applied, and a thin film transistor (TFT) 130.

The thin film transistor 130 includes a gate electrode 130c, a drain electrode 130a, and a source electrode 130b.

The thin film transistor 130 is located in the vicinity of an intersection of the scanning line 128 and the data line 124 in association with a pixel.

The gate electrode 130c is electrically connected to the scanning line 128, the drain electrode 130a is electrically connected to the data line 124, and the source electrode 130b is electrically connected to the pixel electrode 127.

Figure 42A:
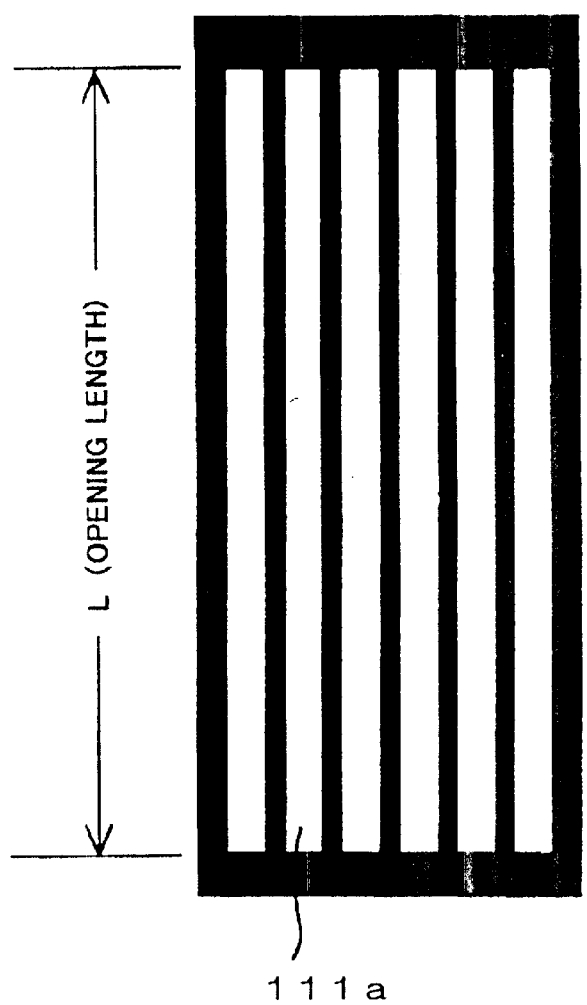
FIG. 42A shows a direction in which an opening extends.

Both the common electrode 126 and the pixel electrode 127 are designed to have a comb-teeth shape, and the comb-teeth in the common electrode 126 and the pixel electrode 127 extend in parallel with the data lines 124. That is, as illustrated in FIG. 42A, the liquid crystal display device 100 is of a type where an opening 111a of the active device substrate 111 extends in a direction in which the data line 124 also extends.

The comb-teeth in the common electrode 126 and the pixel electrode 127 in the fourth embodiment are designed to be in a zigzag form unlike the comb-teeth of the common electrode 26 and the pixel electrode 27 in the first embodiment. The comb-teeth of the common electrode 126 and the comb-teeth of the pixel electrode 127 are arranged to be in mesh with each other, and further spaced away from each other.

In the in-plane switching mode liquid crystal display device 100, an electric field is generated between the common electrode 126 and the pixel electrode 127 in parallel with the electrically insulating transparent substrates 116 and 122 in a pixel which is selected by a scanning signal transmitted through the scanning line 128 and into which a data signal transmitted through the data line 124 is written. The thus generated electric field has a direction dependent on a direction in which the common electrode 126 and the pixel electrode 127 are bent.

As illustrated in FIG. 40, an area occupied by a pixel is divided into a first pixel sub-area and a second pixel sub-area in dependence on a direction in which the common electrode 126 and the pixel electrode 127 are bent, that is, a direction of an electric field applied across the common electrode 126 and the pixel electrode 127. In the first and second pixel sub-areas, directors of liquid crystal molecules are rotated in opposite directions in accordance with the applied electric field in a plane which is parallel with a surface of the active device substrate 111, to thereby display images. That is, the liquid crystal display device 100 in accordance with the fourth embodiment is of so-called multi-domain type.

A direction of an electric field applied across the common electrode 126 and the pixel electrode 127 varies in dependence on an area therebetween. To be exact, an area occupied by a pixel can be divided into a first pixel sub-area in which directors of liquid crystal molecules rotate in a clockwise direction, and a second pixel sub-area in which directors of liquid crystal molecules rotate in a counter-clockwise direction. A pixel sub-area may be called a domain.

By designing directors of liquid crystal molecules to rotate in opposite directions to each other in the first and second pixel sub-areas, the first and second pixel sub-areas optically compensate for each other. Hence, it would be possible to prevent images from being colored when viewed obliquely, and further prevent inversion of gradation which occurs between black-display and rather dark intermediate tone, ensuring enhancement in viewing angle characteristic.

In the liquid crystal display device 100, both the common electrode 126 and the pixel electrode 127 are composed of ITO which is one of transparent materials.

As illustrated in FIG. 41, the common electrode 126 is formed on a layer other than a layer on which the data line 124 is formed, and in addition, the common electrode 126 entirely overlaps the data line 124 similarly to the first embodiment.

Figure 61:
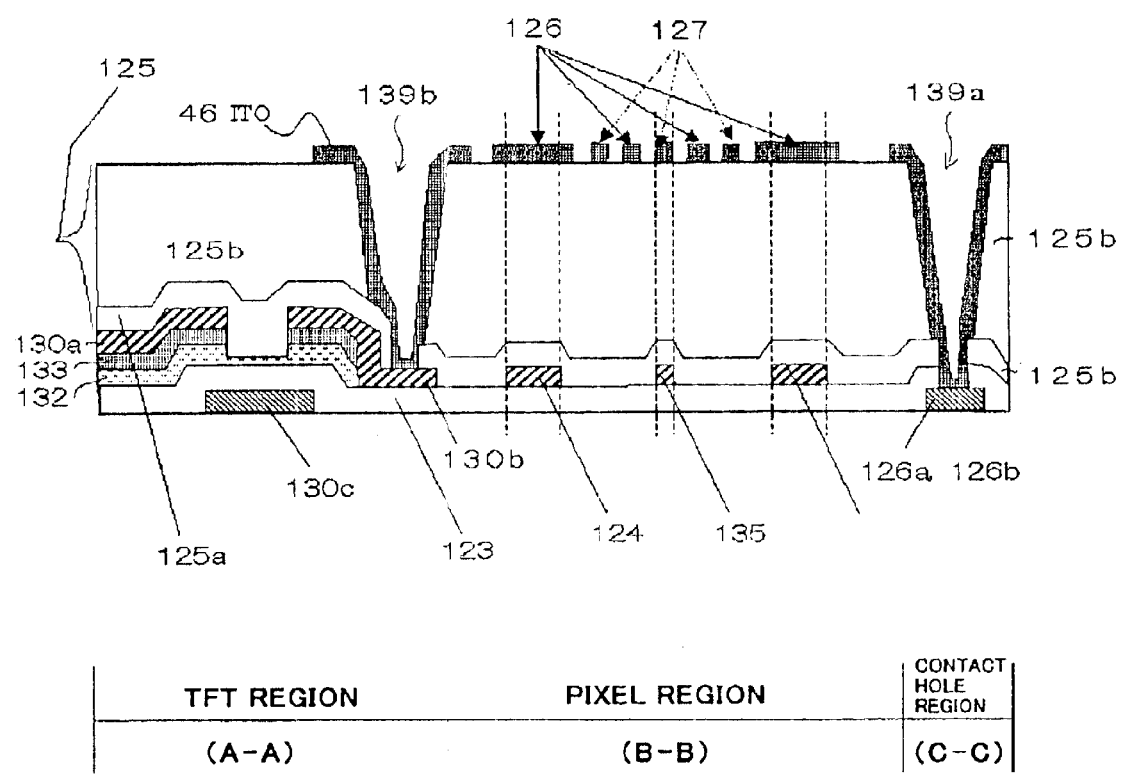
FIG. 61 is a cross-sectional view taken along the lines A—A, B—B and C—C in FIG. 60, illustrating the TFT part, the unit pixel part and the contact hole part in the unit pixel part in the in-plane switching mode liquid crystal display device in accordance with the fourth embodiment.

As illustrated in FIG. 40, the common electrode 126 is electrically connected to the common electrode line 126a or 126b through the contact hole 139a (see FIG. 61), and the pixel electrode 127 is electrically connected to the source electrode 130b through the contact hole 139b (see FIG. 61).

The black matrix layer 117 overlapping the data line 124 is designed to have a width smaller than a width f the common electrode 126.

No light-permeable film exists between a portion of the common electrode 126 which portion overlaps the data line 124 and the pixel electrode 127 located closest to the portion.

Similarly to the first embodiment, the black matrix layer 117 formed above the data line 124 overlaps the data line 124 in its entire length.

In addition, as illustrated in FIG. 40, the data line 124 in the liquid crystal display device 100 is designed to have a zigzag form.

That is, the liquid crystal display device 100 in accordance with the fourth embodiment has the same structure as that of the liquid crystal display device 10 in accordance with the first embodiment except that the liquid crystal display device 100 is of multi-domain type, and that the common electrode 126, the pixel electrode 127 and the data line 124 are zigzag-shaped.

Figure 43A:
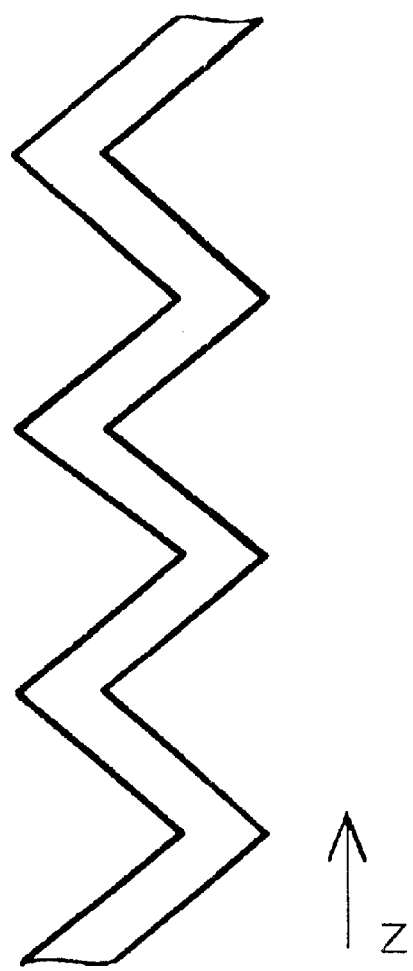
FIG. 43A is a plan view illustrating a first example of a zigzag line.
Figure 43B:
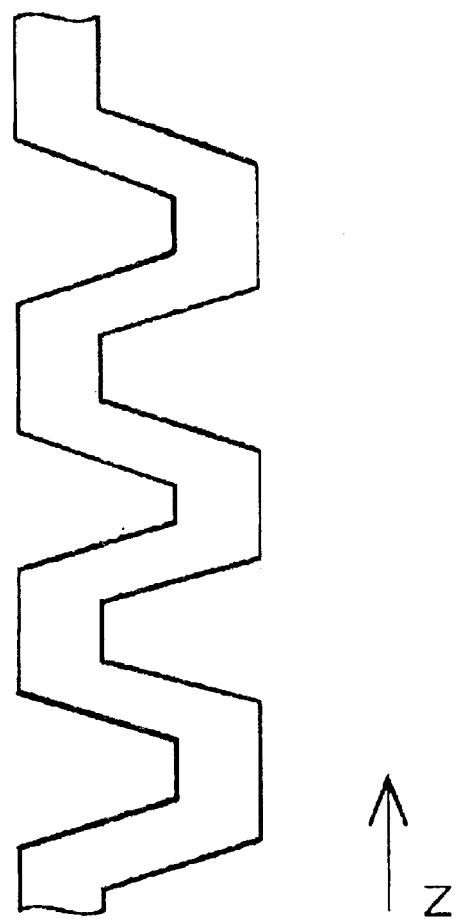
FIG. 43B is a plan view illustrating a second example of a zigzag line.

The term "zigzag" in the fourth embodiment indicates not only a shape having linear portions all inclined relative to a length-wise direction Z, as illustrated in FIG. 43A, but also a shape having both first linear portions inclined relative to a length-wise direction Z and second linear portions extending in parallel with the length-wise direction Z where the first and second linear portions are alternately connected to each other, as illustrated in FIG. 43B. In other words, the term "zigzag" includes all shapes repeating inclination alternately to the left and right relative to a length-wise direction thereof, but extending in the length-wise direction. It does not matter as to whether a "zigzag" includes a linear portion extending in parallel with a length-wise direction Z thereof. An angle by which the second linear portion inclines relative to the length-wise direction Z thereof is not to be limited to a specific angle, and in addition, it is not always necessary for angles by which the second linear portions incline relative to the length-wise direction Z to be constant.

The liquid crystal display device 100 in accordance with the fourth embodiment provides the same advantages as those obtained by the liquid crystal display device 10 in accordance with the first embodiment.

The zigzag-shaped data line 124 could increase an aperture ratio of the liquid crystal display device 100 in comparison with a liquid crystal display device having a linear data line. The reason therefor is explained hereinbelow.

Figure 44:
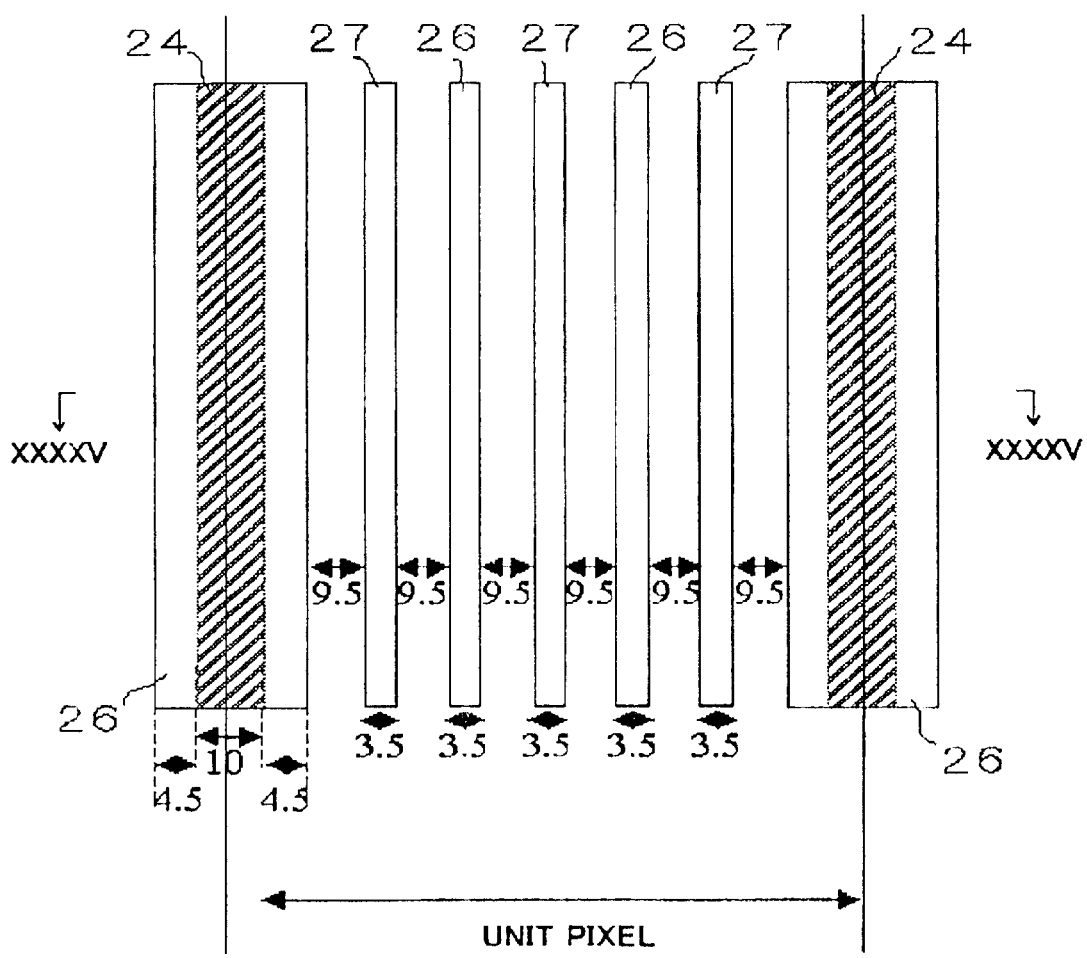
FIG. 44 is a plan view of a conventional liquid crystal display device, used for explaining an increase in an aperture ratio in the in-plane switching mode liquid crystal display device in accordance with the fourth embodiment.
Figure 45:
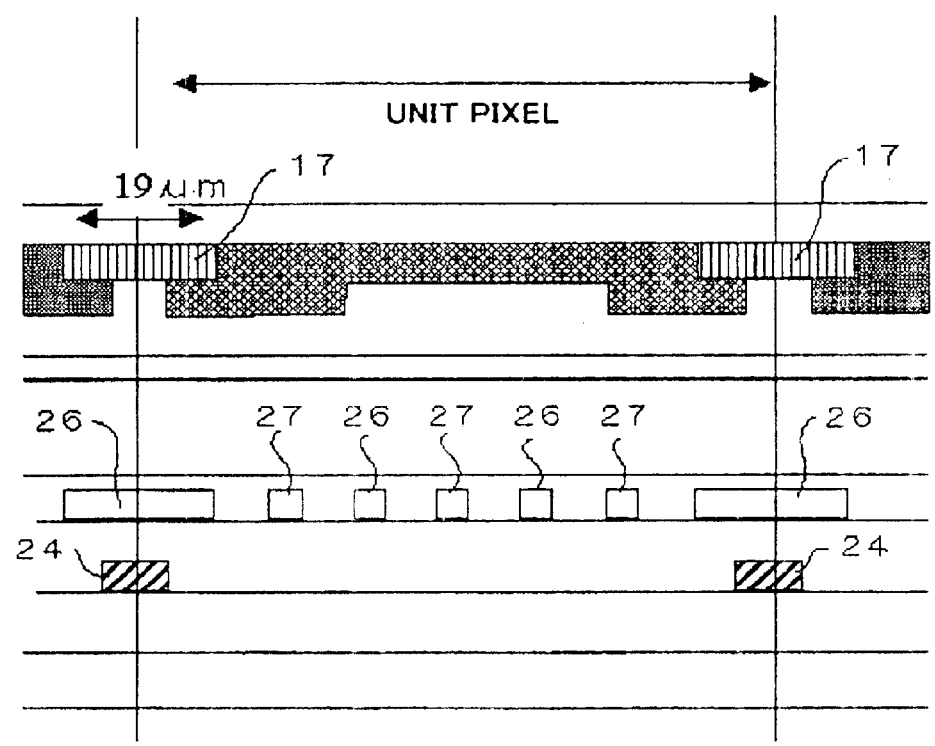
FIG. 45 is a cross-sectional view taken along the line XXXX V—XXXX V in FIG. 44.

FIG. 44 is a plan view of a liquid crystal display device 201 including a linear data line, a linear common electrode, and a linear pixel electrode, and FIG. 45 is a cross-sectional view taken along the line XXXX V—XXXX V in FIG. 44.

The electrodes and other parts constituting the liquid crystal display device 201 illustrated in FIG. 44 have dimensions as follows. Dimensions indicated hereinbelow are expressed in a unit of micrometers ($\mu$m), unless otherwise indicated.

Width of the data line 24=10
Width of the common electrode 26 located immediately above the data line 24=19
Width of other common electrodes 26 formed on a layer on which the common electrode 26 located immediately above the data line 24 is formed=3.5

Width of the pixel electrode 27=3.5

Distance between the common electrode 26 and the pixel electrode 27=9.5

Accordingly, a total area A1 of openings in the liquid crystal display device 201 illustrated in FIG. 44 is calculated as follows.

$$A1=(9.5\times6)\times L=57L$$

L indicates a longitudinal length of the openings.

Figure 46:
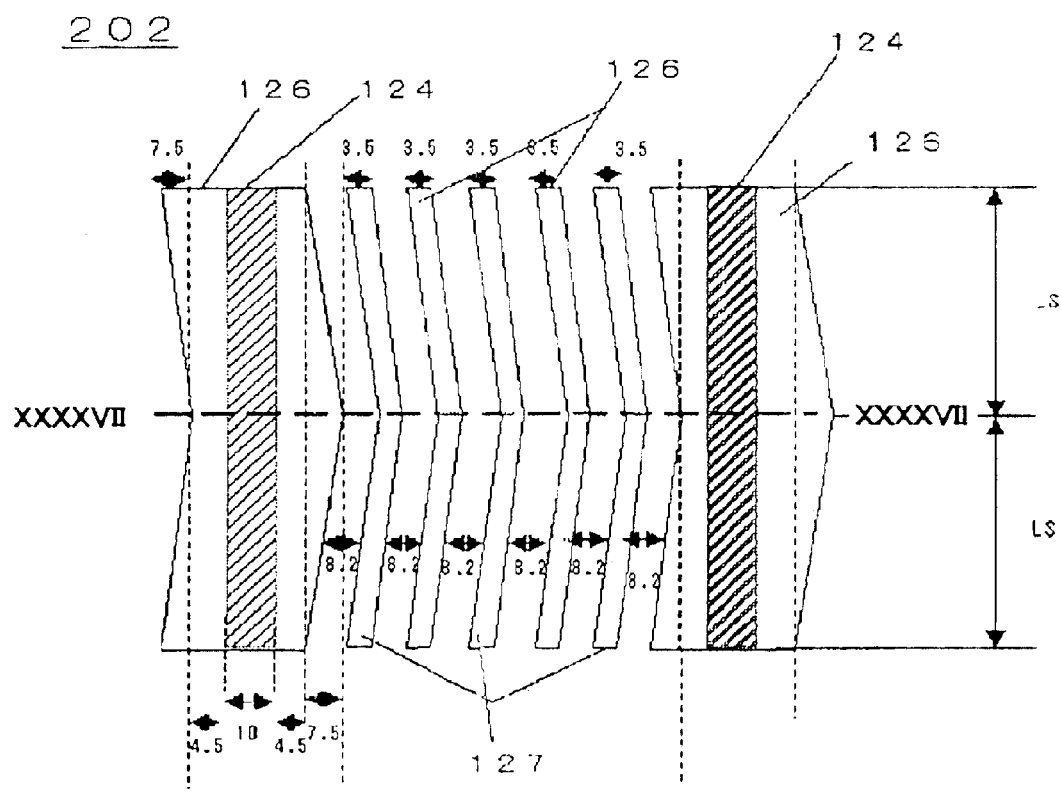
FIG. 46 is a plan view of a conventional liquid crystal display device, used for explaining an increase in an aperture ratio in the in-plane switching mode liquid crystal display device in accordance with the fourth embodiment.
Figure 47:
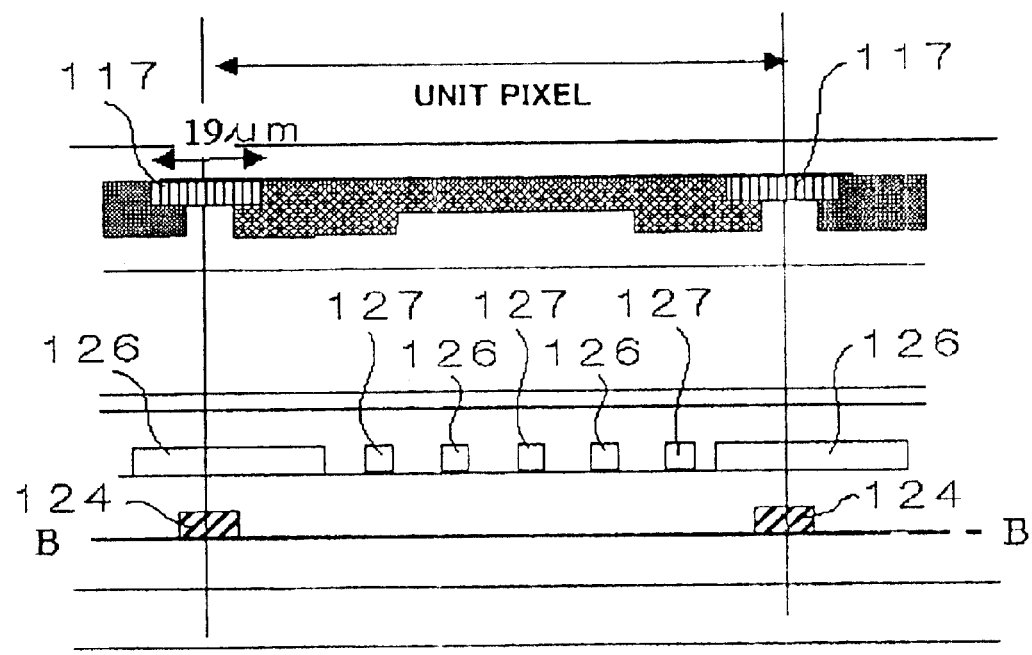
FIG. 47 is a cross-sectional view taken along the line XXXX VI—XXXX VI in FIG. 46.

FIG. 46 is a plan view of a liquid crystal display device 202 including a linear data line, a zigzag-shaped common electrode, and a zigzag-shaped pixel electrode, and FIG. 47 is a cross-sectional view taken along the line XXXX VII—XXXX VII in FIG. 46.

The electrodes and other parts constituting the liquid crystal display device 202 illustrated in FIG. 46 have dimensions as follows.

Width of the data line 124=10

Width of the common electrode 126 located immediately above the data line 124=26.5

Width of other common electrodes 126 formed on a layer on which the common electrode 126 located immediately above the data line 124 is formed=3.5

Width of the pixel electrode 127=3.5

Distance between the common electrode 126 and the pixel electrode 127=8.2

Accordingly, a total area A2 of openings in the liquid crystal display device 202 illustrated in FIG. 46 is calculated as follows.

$$A2=(8.2\times6)\times L=49.2L$$

Figure 48:
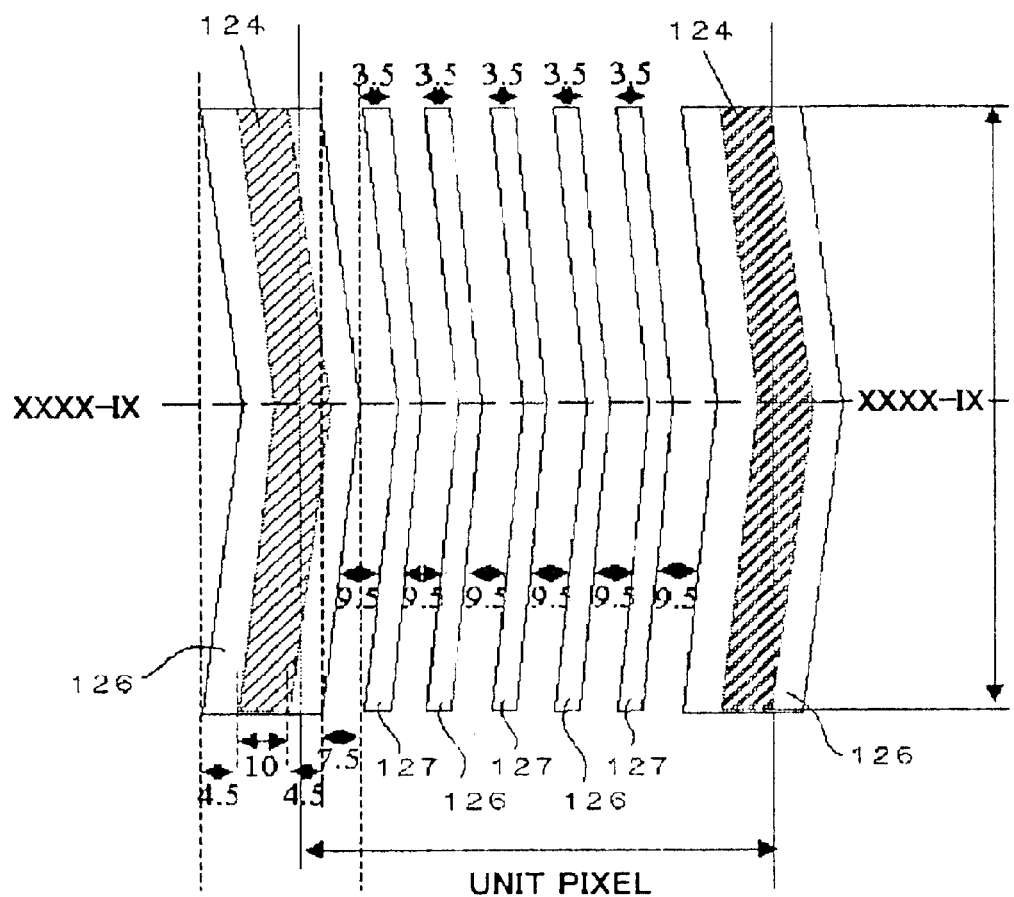
FIG. 48 is a plan view of the in-plane switching mode liquid crystal display device in accordance with the fourth embodiment, showing an increase in an aperture ratio in the same.
Figure 49:
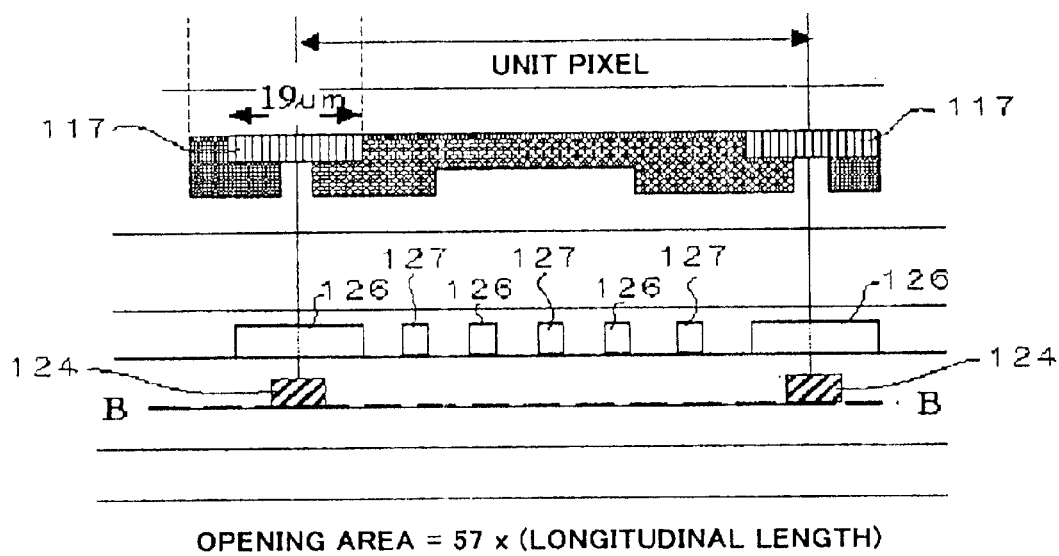
FIG. 49 is a cross-sectional view taken along the line XXXX IX—XXXX IX in FIG. 48.

FIG. 48 is a plan view of a liquid crystal display device 203 including a zigzag-shaped data line, a zigzag-shaped common electrode, and a zigzag-shaped pixel electrode, that is, a plan view of the liquid crystal display device 100 in accordance with the first embodiment, and FIG. 49 is a cross-sectional view taken along the line XXXX IX—XXXX IX in FIG. 48.

The electrodes and other parts constituting the liquid crystal display device 203 illustrated in FIG. 48 have dimensions as follows.

Width of the data line 124=10

Width of the common electrode 126 located immediately above the data line 124=19

Width of other common electrodes 126 formed on a layer on which the common electrode 126 located immediately above the data line 124 is formed=3.5

Width of the pixel electrode 127=3.5

Distance between the common electrode 126 and the pixel electrode 127=9.5

Accordingly, a total area A3 of openings in the liquid crystal display device 203 illustrated in FIG. 48 is calculated as follows.

$$A3=(9.5\times6)\times L=57L$$

As is obvious in view of comparison among the above-mentioned areas A1, A2 and A3, the area A2 of the liquid crystal display device 202 including a linear data line, a zigzag-shaped common electrode and a zigzag-shaped pixel electrode is smaller than the area A1 of the liquid crystal display device 201 including a linear data line, a linear common electrode and a linear pixel electrode, whereas the area A3 of the liquid crystal display device 203 including a zigzag-shaped data line, a zigzag-shaped common electrode and a zigzag-shaped pixel electrode is equal to the area A1.

This means that it is possible to increase an aperture ratio by designing the data line 124 to be zigzag-shaped, in comparison with a liquid crystal display device including a linear data line. This is because, in the liquid crystal display device 202 including a linear data line, a zigzag-shaped common electrode and a zigzag-shaped pixel electrode, a distance along the line XXXX VII—XXXX VII in FIG. 46 between the data line 124 located at the left and the pixel electrode 127 located adjacent to the data line 124 is longer than the same in FIG. 48 by 7.5 $\mu$m, and hence, an interval between the common electrode 126 and the pixel electrode 127 is decreased by a length of 7.5 $\mu$m/X where X indicates the number of openings, resulting in that an area of the openings is decreased accordingly.

The liquid crystal display device 100 in accordance with the fourth embodiment can be fabricated in accordance with the same method as the method of fabricating the liquid crystal display device 10 in accordance with the first embodiment. Specifically, since the data line 124, the common electrode 126 and the pixel electrode 127 in the liquid crystal display device 100 are formed to be zigzag-shaped, a pattern for forming them is changed so as to define the zigzag-shaped data line 124, the zigzag-shaped common electrode 126 and the zigzag-shaped pixel electrode 127. The steps for fabricating the liquid crystal display device 100, other than the step of patterning the data line 124, the common electrode 126 and the pixel electrode 127, remain unchanged.

Hereinbelow are explained the parts constituting the liquid crystal display device 100 in accordance with the fourth embodiment, and variants thereof.

The number of inflection of the data line 124, the common electrode 126 and the pixel electrode 127 per a pixel may be selected from any number, unless it is an odd number. This is to ensure that a region in which liquid crystal molecules are twisted in a clockwise direction is equal in both the number and an area to a region in which liquid crystal molecules are twisted in a counter-clockwise direction. This enhances symmetry in a viewing angle. Accordingly, the number of inflection is limited to an odd number such as 1, 3 or 5. As long as the number of inflection is an odd number, one (1) or any number equal to or greater than three (3) may be selected as the number of inflection of the data line 124, the common electrode 126 and the pixel electrode 127.

The smaller the number of inflection is, the higher an aperture ratio is, however, the smaller the number of inflection is, more easily a bending pattern can be seen. In addition, since the black matrix layer 117 has to be designed to follow the inflection of the data line 124, the common electrode 126 and the pixel electrode 127, it would be more difficult to pattern the black matrix layer 117, if the data line 124, the common electrode 126 and the pixel electrode 127 had a smaller number of inflections.

To the contrary, the greater the number of inflection is, more likely a bending pattern looks like a line, and the black matrix layer could be fabricated in the form of a thinner line. However, the greater number of inflection would make an aperture ratio smaller.

In view of the above-mentioned matters, the inventors had conducted the experiments to an optimal number N of inflection in the data line 124, the common electrode 126 and the pixel electrode 127. The optimal number N is determined so as to satisfy the following inequality (A).

$$30 \leq L/(N+1) \leq 40 \qquad (A)$$

L indicates a length of an opening in a unit of micrometers ($\mu$m). See FIG. 42A.

The black matrix layer 117 may be designed to be linear or zigzag-shaped. In particular, when the black matrix layer 117 is formed to be zigzag-shaped, it is preferable that the black matrix layer 117 has a zigzag shape designed in accordance with a zigzag shape of the data line 124. Though a linear black matrix layer can be fabricated more readily than a zigzag-shaped black matrix layer, the zigzag-shaped black matrix layer 117 would increase an aperture ratio of the liquid crystal display device 100.

Figure 50:
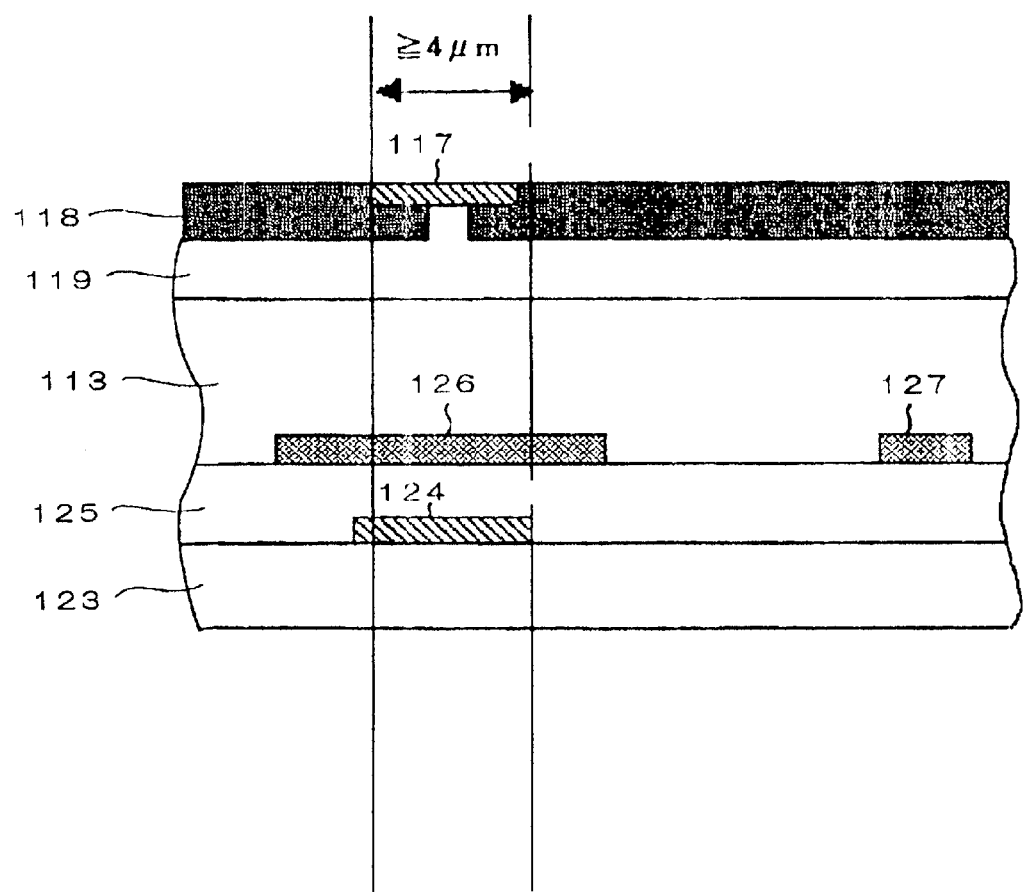
FIG. 50 is a partial cross-sectional view of a variant of the in-plane switching mode liquid crystal display device in accordance with the fourth embodiment.

As illustrated in FIG. 50, when viewed in a plan view, it is preferable that both a distance between a left end of the black matrix layer 117 and a right end of the data line 124 and a distance between a right end of the black matrix layer 117 and a left end of the data line 124 are always equal to or longer than 4 micrometers ($\mu$m).

The reason therefor is explained hereinbelow.

A distance between a surface of the black matrix layer 117, facing the liquid crystal layer 113, and a surface of the data line 124, facing the liquid crystal layer 113, is usually in the range of 3 to 4 micrometers. With reference to FIG. 50, assuming that an angle formed between a line connecting a left end of the black matrix layer 117 to a right end of the data line 124, and a surface of the substrate is expressed as "$\alpha$", an angle $\alpha$ at which incident light coming from a side of the black matrix layer is all reflected is equal to about 45 degrees. Hence, when the above-mentioned distance between a surface of the black matrix layer 117, facing the liquid crystal layer 113, and a surface of the data line 124, facing the liquid crystal layer 113 is maximum, that is, equal to 4 micrometers, it would be possible to solve the problem that a light obliquely entering in the vicinity of one of ends of the data line 124 passes over the black matrix layer 117, and causes color mixture in displayed images with the result of reduction in chromaticity, if a distance between a left end of the black matrix layer 117 and a right end of the data line 124 is equal to or greater than 4 micrometers.

In order to ensure that a distance between a left end of the black matrix layer 117 and a right end of the data line 124 and a distance between a right end of the black matrix layer 117 and a left end of the data line 124 are always equal to or longer than 4 micrometers, the black matrix layer 117 and the data line 124 have to overlap each other anywhere by 4 micrometers or greater. Since the active device substrate 111 and the opposing substrate 112 are usually designed to have an allowable process margin of 4 micrometers to absorb misregistration therebetween, it will be necessary for the black matrix layer 117 and the data line 124 to have a width equal to or greater than 8 micrometers, if the process margin of 4 micrometers is taken into consideration.

Figure 51:
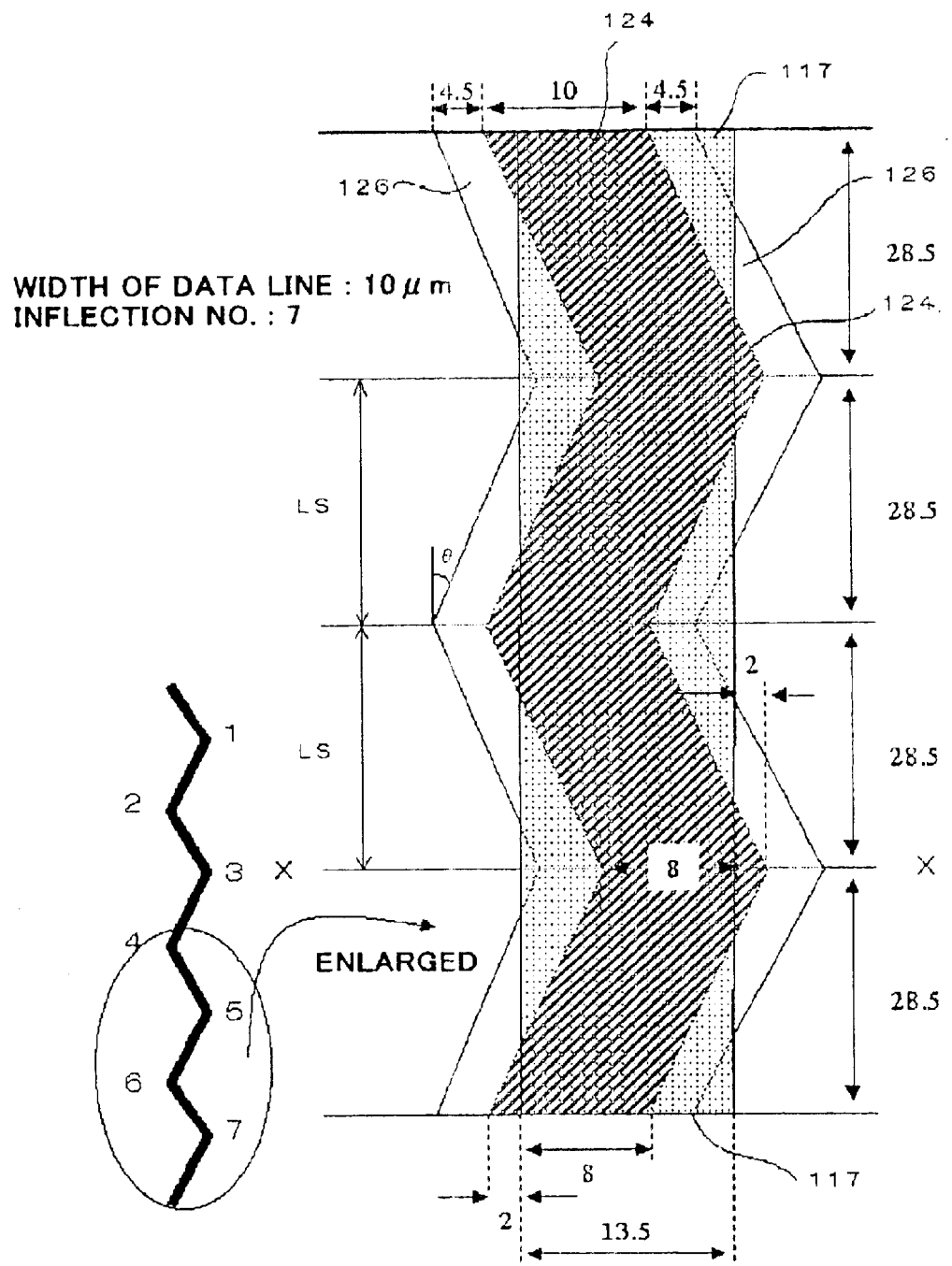
FIG. 51 is a plan view of a first example of the black matrix layer in the in-plane switching mode liquid crystal display device in accordance with the fourth embodiment.
Figure 52:
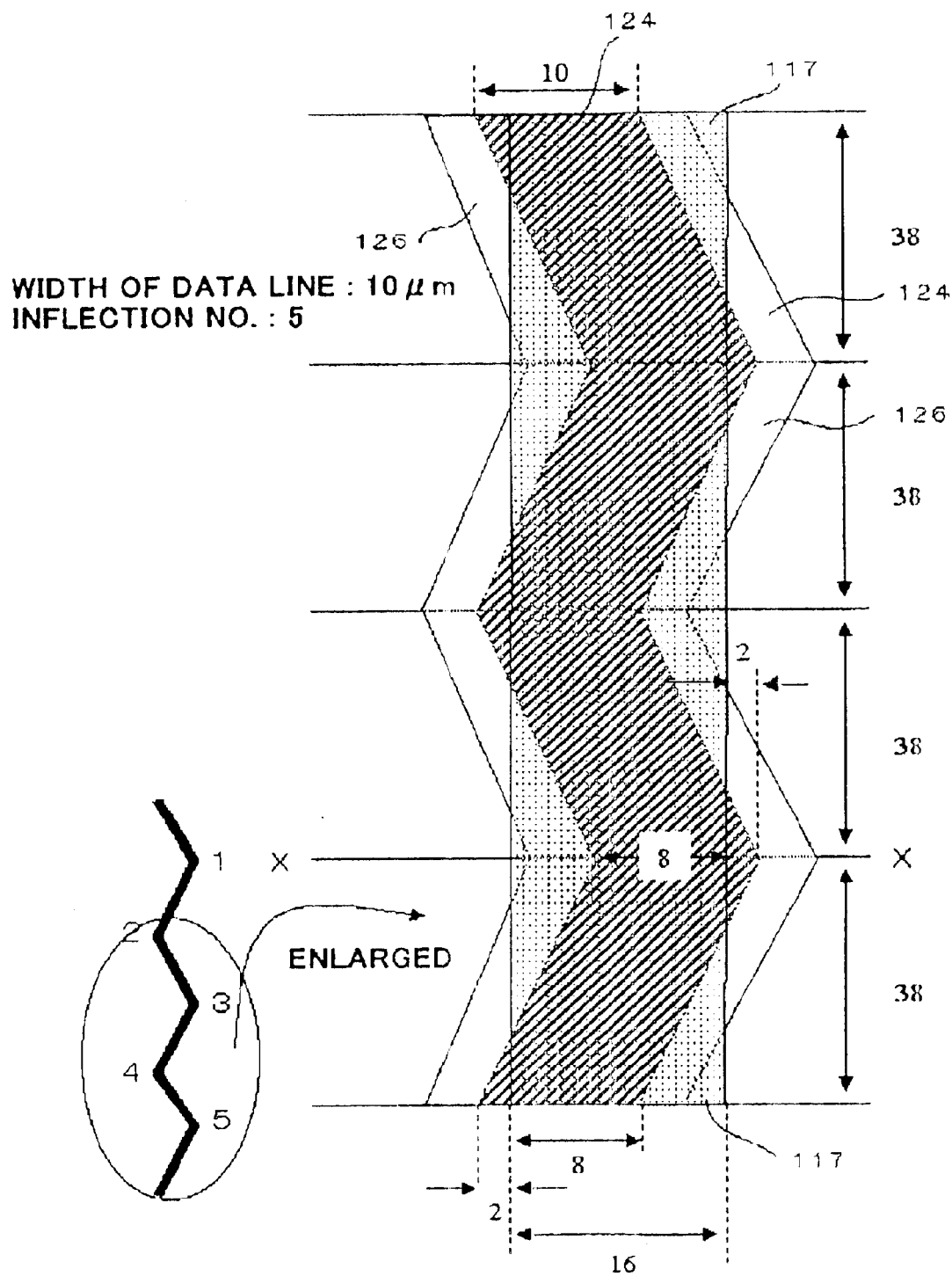
FIG. 52 is a plan view of a second example of the black matrix layer in the in-plane switching mode liquid crystal display device in accordance with the fourth embodiment.

FIGS. 51 and 52 illustrate examples of arrangement of the black matrix layer 117 in the liquid crystal display device 100 in accordance with the fourth embodiment.

In the arrangement illustrated in FIG. 51, the data line 124 is designed to have a width of 10 micrometers, the common electrode 126 is designed to have a width of 19 micrometers, the common electrode 126 having a plurality of comb-teeth is designed to have seven inflections, and the black matrix layer 117 is designed to have a width of 13.5 micrometers.

A width by which the black matrix layer 117 and the data line 124 overlap each other is minimized where the common electrode 126 or the data line 124 is bent, that is, on the line X—X. In the arrangement illustrated in FIG. 51, a minimum width in which the black matrix layer 117 and the data line 124 overlap each other is equal to 8 micrometers.

In the arrangement illustrated in FIG. 52, the data line 124 is designed to have a width of 10 micrometers, the common electrode 126 is designed to have a width of 19 micrometers, the common electrode 126 having a plurality of comb-teeth is designed to have five inflections, and the black matrix layer 117 is designed to have a width of 16 micrometers.

A width by which the black matrix layer 117 and the data line 124 overlap each other is minimized where the common electrode 126 or the data line 124 is bent, that is, on the line X—X. In the arrangement illustrated in FIG. 52, a minimum width in which the black matrix layer 117 and the data line 124 overlap each other is equal to 8 micrometers.

A minimum width of the black matrix layer 117 in the liquid crystal display device 100 in accordance with the fourth embodiment, such as the above-mentioned minimum width in the arrangements illustrated in FIGS. 51 and 52, is determined as follows.

Figure 53:
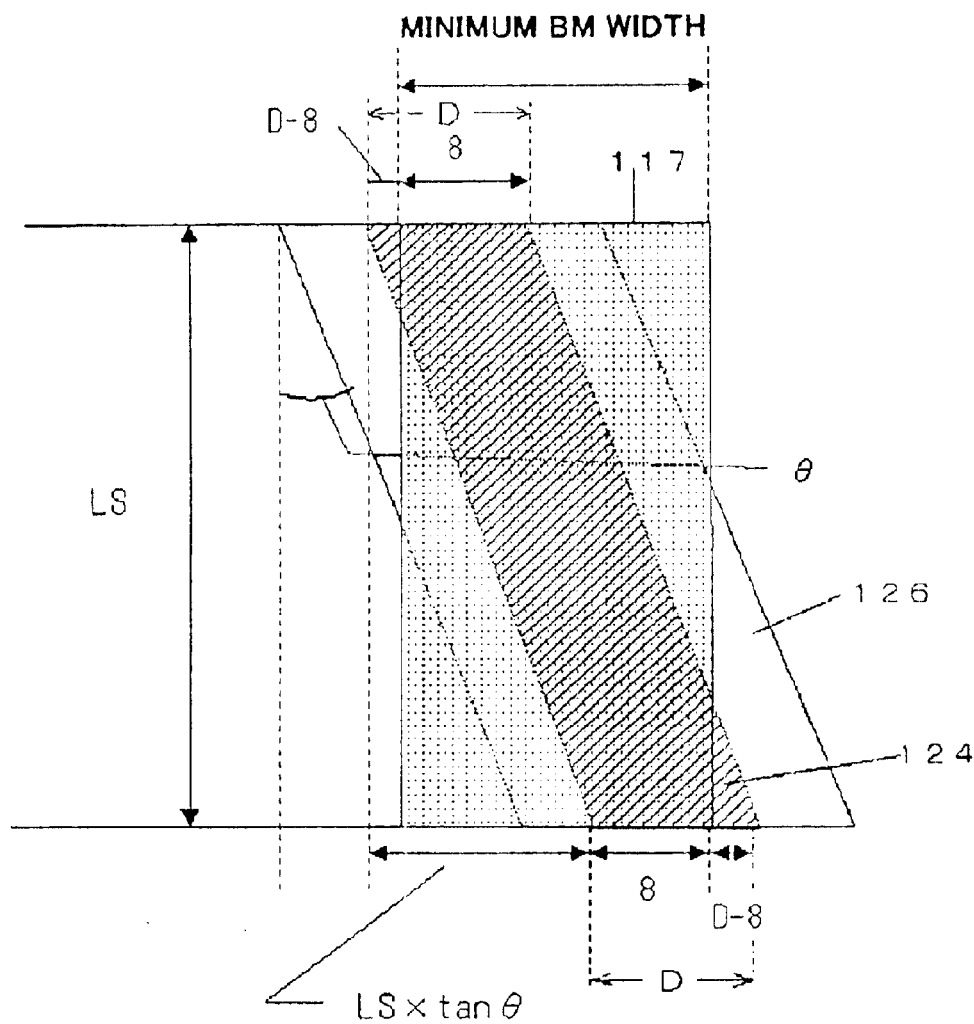
FIG. 53 is a plan view of a minimum width of the black matrix layer in the in-plane switching mode liquid crystal display device in accordance with the fourth embodiment.

FIG. 53 illustrates a positional relation among the black matrix layer 117, the data line 124 and the common electrode 126. With reference to FIG. 53, the equation for determining a minimum width of the black matrix layer 117 is determined as follows.

Assuming that a width of the data line 124 is expresses as "D", a length of inclined lines when projected into a direction in which the data line 124 extends is expressed as "LS", and an angle formed between a direction in which the data line 124 extends and inclined lines is expressed as "$\theta$", a minimum width Dmin of the black matrix layer 117 for disallowing an oblique light to enter the data line 124 is expressed as follows.

$$D\text{min}=D+LS \times \tan\theta -(D-8) \times 2 [\mu m] \tag{B}$$

Figure 54:
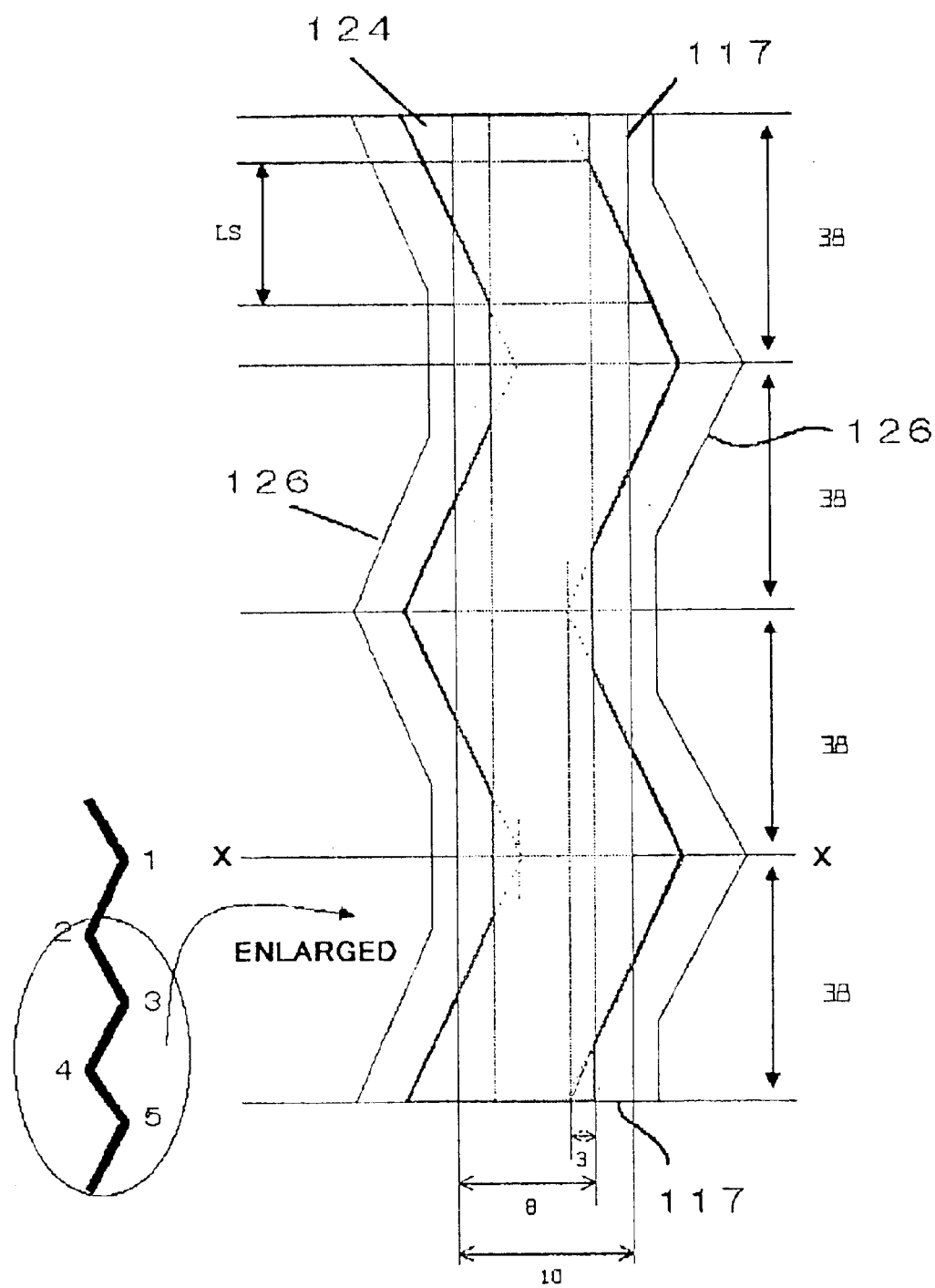
FIG. 54 is a plan view of a third example of the black matrix layer in the in-plane switching mode liquid crystal display device in accordance with the fourth embodiment.
Figure 55:
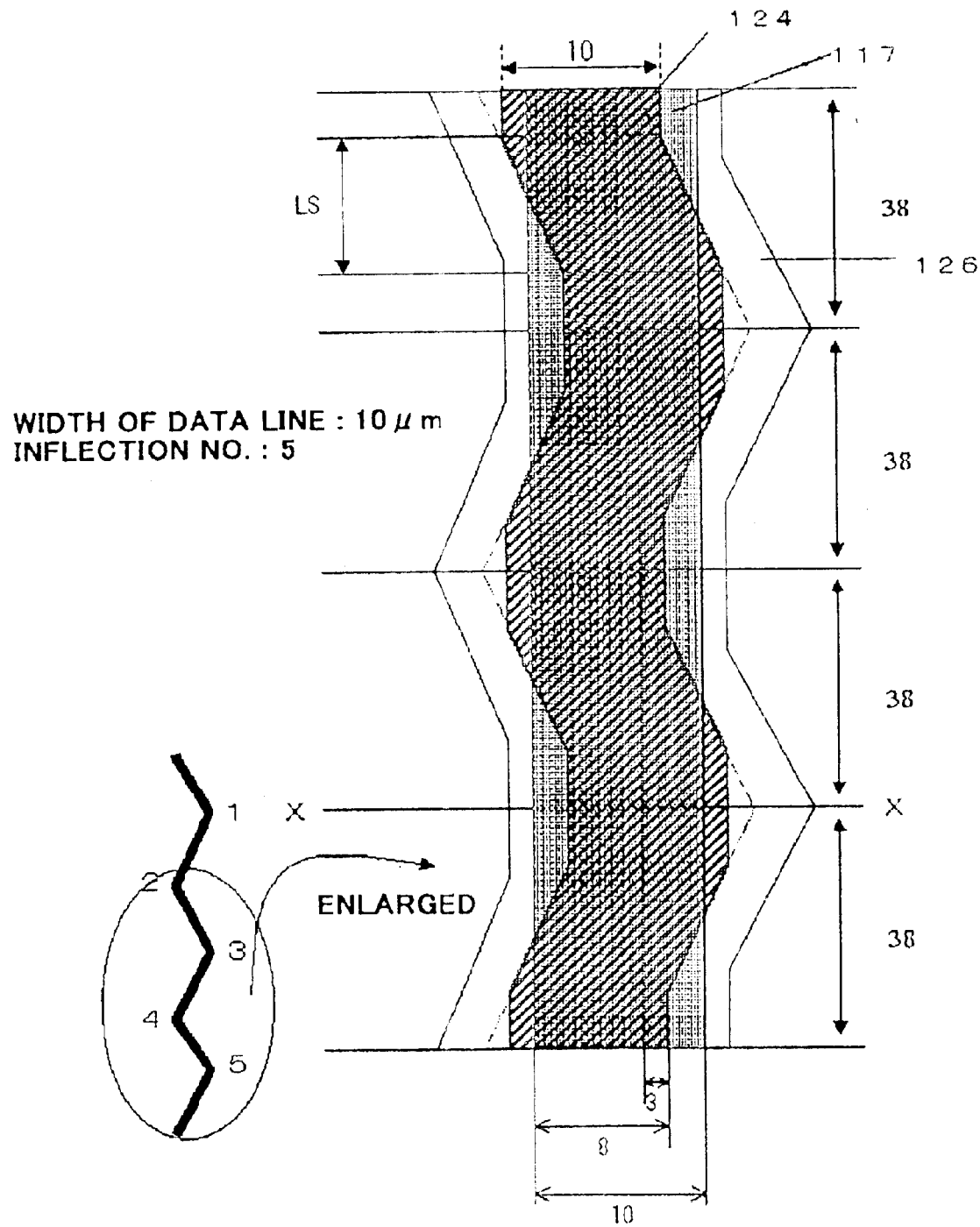
FIG. 55 is a plan view of a fourth example of the black matrix layer in the in-plane switching mode liquid crystal display device in accordance with the fourth embodiment.

In the examples illustrated in FIGS. 54 and 55, the data line 124 is designed to have a width of 10 micrometers, and further designed to be zigzag-shaped, including linear portions extending in a length-wise direction Z of the data line 124, as illustrated in FIG. 43B. The data line 124 in the examples illustrated in FIGS. 54 and 55 has edges located behind by 3 micrometers from each of bottoms of recesses in the inflections of the data line 124 illustrated in FIG. 52. The common electrode 126 has edges defined by recesses projecting beyond the data line 124 by 4.5 micrometers in comparison with the same illustrated in FIG. 52, and projections located at the same position as a position of a projection of an edge of the common electrode illustrated in FIG. 52. The common electrode 126 having a plurality of comb-teeth is designed to have a zigzag shape having five (5) inflections. Under the above-mentioned conditions, the black matrix layer 117 could have a width of 10 micrometers.

A width by which the black matrix layer 117 and the data line 124 overlap each other is minimized where the common electrode 126 or the data line 124 is bent, that is, on the line X—X. In the examples illustrated in FIGS. 54 and 55, a minimum width in which the black matrix layer 117 and the data line 124 overlap each other is equal to 8 micrometers.

Comparing to the example illustrated in FIG. 52, the black matrix layer 117 can have a width reduced by 6 micrometers, ensuring an increase in an aperture ratio.

The common electrode 126 illustrated in FIGS. 54 and 55 is bent in such a zigzag pattern as illustrated in FIG. 43A in portions other than portions overlapping the pixel electrode 127 and the data line 124.

The common electrode 126 overlapping the data line 124 has edges projecting beyond the data line 124 by 4.5 micrometers. The edges are designed to be V-shaped at summits thereof in order to apply a sufficient voltage to a display area.

As mentioned earlier, a minimum width Dmin of the black matrix layer 117 for disallowing an oblique light to enter the data line 124 is expressed as follows.

$$D\text{min}=D+LS \times \tan\theta -(D-8) \times 2 [\mu m] \tag{B}$$

In the example of the black matrix layer 117 illustrated in FIG. 55, the data line 124 is designed to have edges displaced outwardly of the data line 124 by 3 micrometers from bottoms of recesses in the inflections of the data line 124 illustrated in FIG. 52, and at the same time, summits of the projections in the inflections of the data line 124 are displaced by 3 micrometers inwardly of the data line 124, in order to form linear portions extending in a length-wise direction of the data line 124.

As an alternative, as illustrated in FIG. 54, only bottoms of recesses in the inflections of the data line 124 illustrated in FIG. 52 may be displaced outwardly of the data line 124 by 3 micrometers with the bottoms of recesses in the inflections of the data line 124 being not displaced.

In such arrangements as mentioned above, the black matrix layer 117 may be designed to have a width of 10 micrometers, ensuring an increase in an aperture ratio, similarly to the example illustrated in FIGS. 54 and 55.

Figure 56:
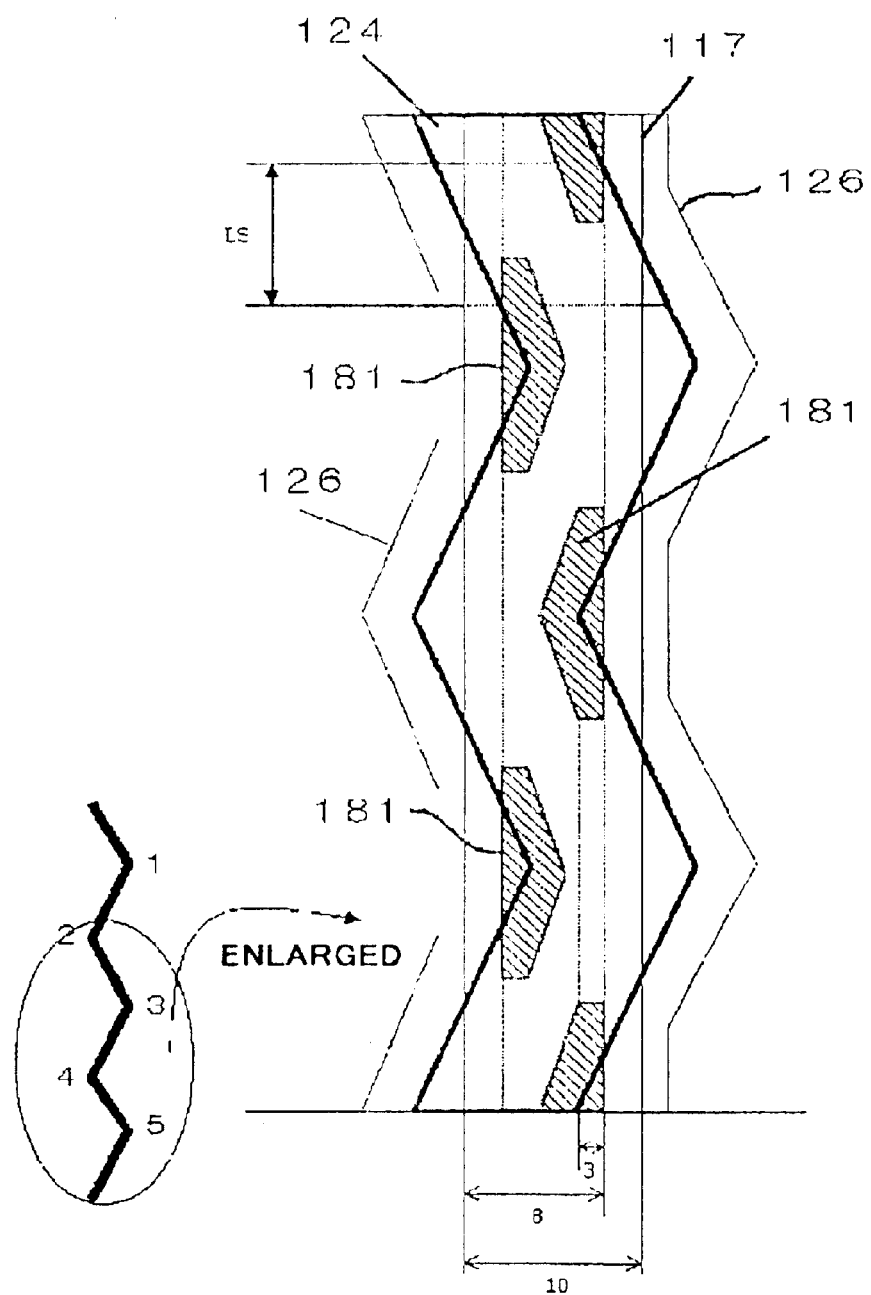
FIG. 56 is a plan view of a fifth example of the black matrix layer in the in-plane switching mode liquid crystal display device in accordance with the fourth embodiment.

As illustrated in FIG. 56, the data line 124 is formed in the same fashion as the data line illustrated in FIG. 52, and floating electrodes 181 may be formed in the vicinity of bottoms of recesses in the inflections of the data line 124. The floating electrodes 181 are comprised of the first metal layer of which the common electrode line 126 is comprised. Such floating electrodes 181 may be used for shielding light from the region indicated in FIG. 53, in which case, the black matrix layer 117 may be designed to have a width of 10 micrometers, ensuring an increase in an aperture ratio, similarly to the example illustrated in FIGS. 54 and 55.

Figure 57:
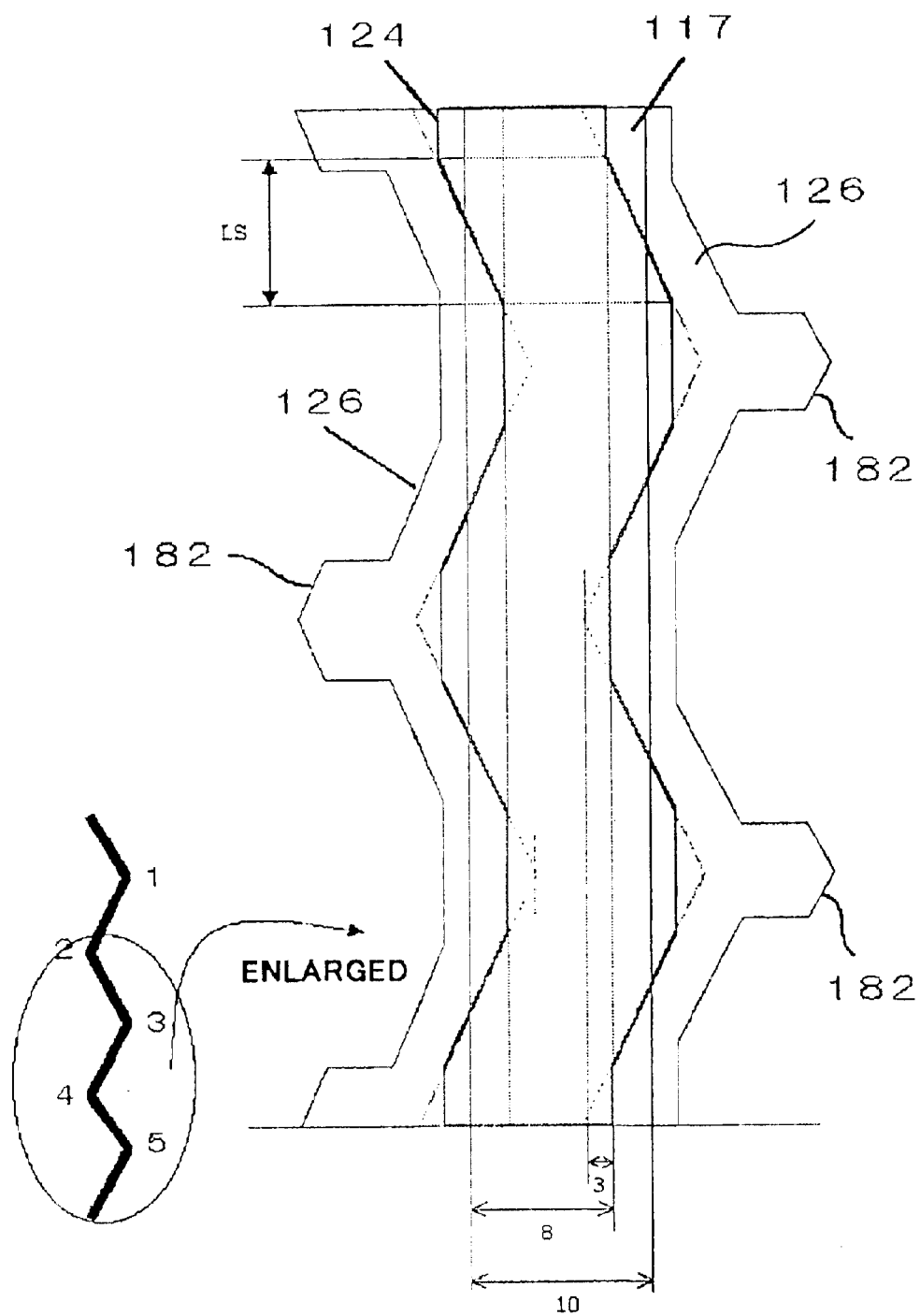
FIG. 57 is a plan view of a sixth example of the black matrix layer in the in-plane switching mode liquid crystal display device in accordance with the fourth embodiment.

In addition, as illustrated in FIG. 57, the common electrode 126 may be designed to further include projections 182 projecting from summits of the inflections of the common electrode 126 overlapping the data line 124.

Figure 58:
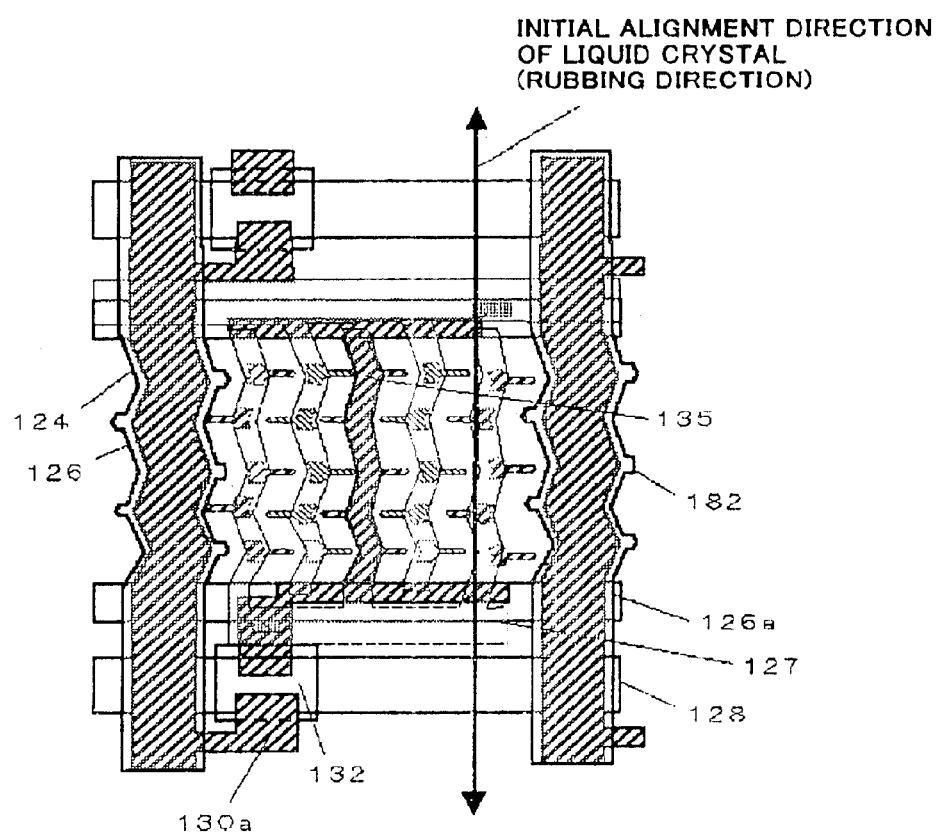
FIG. 58 is a partial plan view of another variant of the in-plane switching mode liquid crystal display device in accordance with the fourth embodiment.

FIG. 58 illustrates a pixel including the above-mentioned common electrode 126 having the projections 182. In the illustrated pixel, the projections 182 fix a location of the disclination occurring at a domain boundary including summits of the projections 182, ensuring stability in displaying images even if a display screen is pushed by a finger.

In the liquid crystal display device 100 in accordance with the fourth embodiment, the color layer 118 constituting the opposing substrate 112 may be designed to be zigzag-shaped as well as the data line 124, the common electrode 126 and the pixel electrode 127. In particular; when the color layer 118 is formed to be zigzag-shaped, it is preferable that the color layer 118 has a zigzag shape in accordance with a zigzag shape of the data line 124.

The liquid crystal display device 100 in accordance with the fourth embodiment may be designed to further include a stabilization electrode between a pixel sub-area in which liquid crystal molecules are twisted in a clockwise direction and a pixel sub-area in which liquid crystal molecules are twisted in a counter-clockwise direction, in a column of each of pixels. The stabilization electrode ensures a stable boundary between the pixel sub-areas, and thereby, stabilize alignment of liquid crystal molecules. Thus, even if a display screen were rubbed by a finger, a fingerprint would not remain on the display screen, ensuring an increase in clearness in displayed images.

Though Japanese Patent Application No. 2000-326814, which was filed by the assignee of the present application and is not published yet, is explained hereinbelow for emphasizing the advantages of the present invention, the explanation made hereinbelow does not mean that the applicant admits Japanese Patent Application No. 2000-326814 as statutory prior art to the present invention. Japanese Patent Application No. 2000-326814 is explained hereinbelow only for the purpose of better understanding of the present invention.

Japanese Patent Application No. 2000-326814 suggests a V-shaped common electrode and a V-shaped pixel electrode which have a common auxiliary electrode and a pixel auxiliary electrode extending outwardly from summits of the V-shaped common electrode and the V-shaped pixel electrode, respectively. Distal ends of the common auxiliary electrode and the pixel auxiliary electrode overlap the pixel and common electrodes.

However, the above-mentioned V-shaped common and pixel electrodes cannot be applied to the liquid crystal display device 100 in accordance with the fourth embodiment, because the pixel and common electrodes 127 and 126 are formed on a common layer in the liquid crystal display device 100. In addition, it would be necessary to prevent an increase in the number of fabrication steps for applying the V-shaped common and pixel electrodes to the liquid crystal display device 100.

Figure 59:
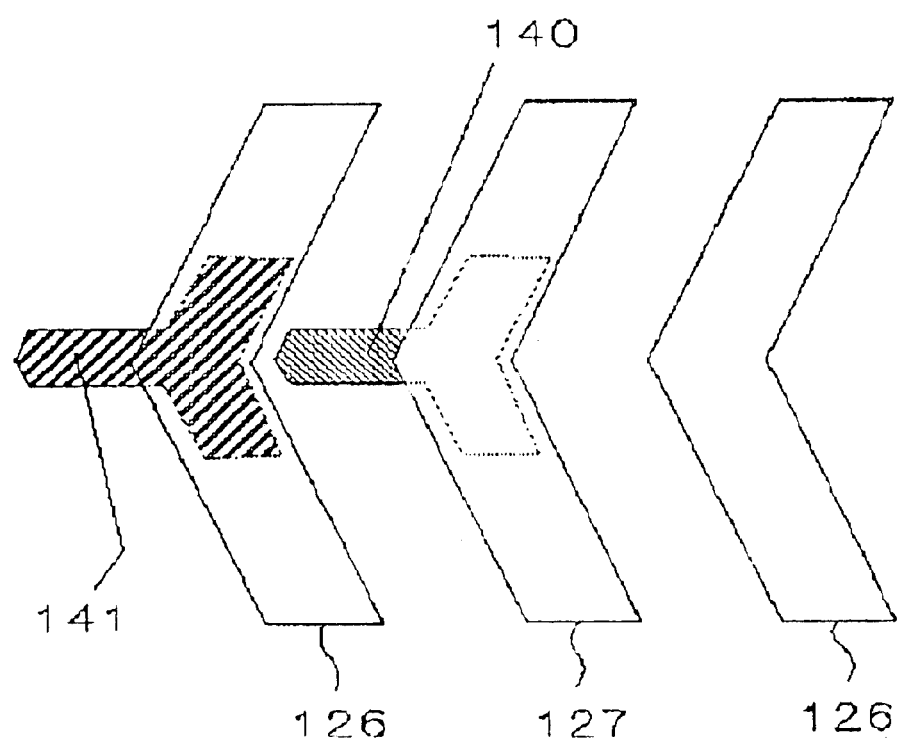
FIG. 59 is a partial plan view of still another variant of the in-plane switching mode liquid crystal display device in accordance with the fourth embodiment.

Hence, in order for the liquid crystal display device 100 to include the stabilization electrode ensuring a stable boundary between pixel sub-areas, as illustrated in FIG. 59, floating stabilizing electrodes 140 are formed below and overlapping summits of the inflections of the pixel electrodes 127. Each of the floating stabilizing electrodes 140 is comprised of the second metal layer, and hence, is not electrically connected to the pixel electrode 127. Each of the floating stabilizing electrodes 140 sufficiently overlap the pixel electrode 127, and extends towards a boundary between the pixel sub-areas.

Similarly, floating stabilizing electrodes 141 are formed below and overlapping summits of the inflections of the common electrodes 126. Each of the floating stabilizing electrodes 141 is comprised of the first metal layer. Each of the floating stabilizing electrodes 141 sufficiently overlap the common electrode 126, and extends towards a boundary between the pixel sub-areas.

The above-mentioned floating stabilization electrodes 140 and 141 ensure that an electric field in each of the pixel sub-areas is directed to a direction in which liquid crystal molecules are twisted, which further ensures stable division of the pixel sub-areas.

Figure 60:
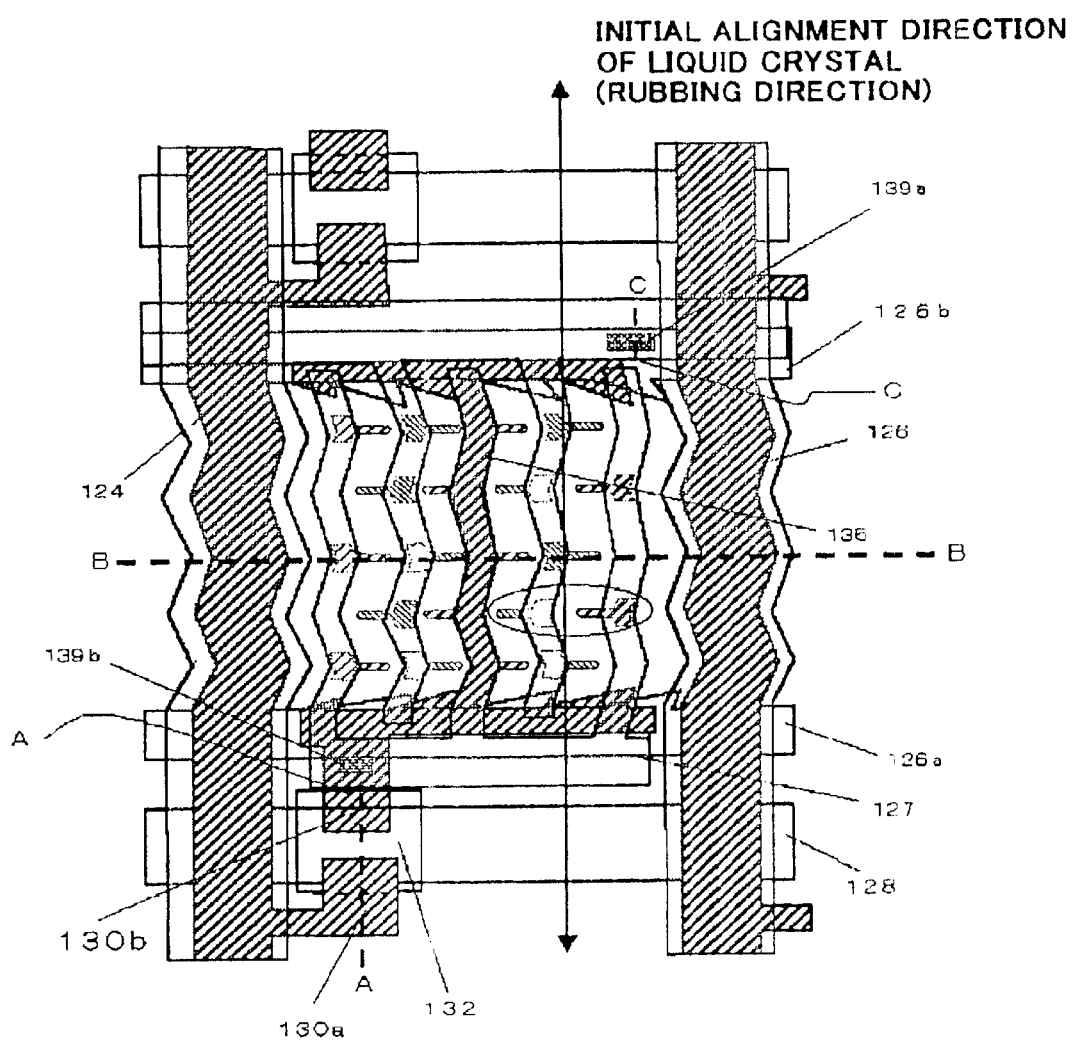
FIG. 60 is a partial plan view of yet another variant of the in-plane switching mode liquid crystal display device in accordance with the fourth embodiment, to which the floating electrode illustrated in FIG. 59 is applied.

FIG. 60 illustrates the liquid crystal display device 100 to which the floating stabilization electrodes 140 and 141 illustrated in FIG. 59 are applied.

FIG. 61 illustrates a TFT region, a pixel region, and a contact hole region of the liquid crystal display device 100 in a single drawing. The TFT region, the pixel region and the contact hole region are illustrated as cross-sectional views taken along the lines A—A, B—B, and C—C in FIG. 60, respectively.

As illustrated in FIG. 61, the liquid crystal display device 100 may be designed to include a pixel auxiliary electrode 135 below the first film 25*a* of the second interlayer insulating film 25. The pixel auxiliary electrode 135 is comprised of the second metal layer, and is formed integrally with the source electrode 130*b* of TFT 130.

Figure 62A:
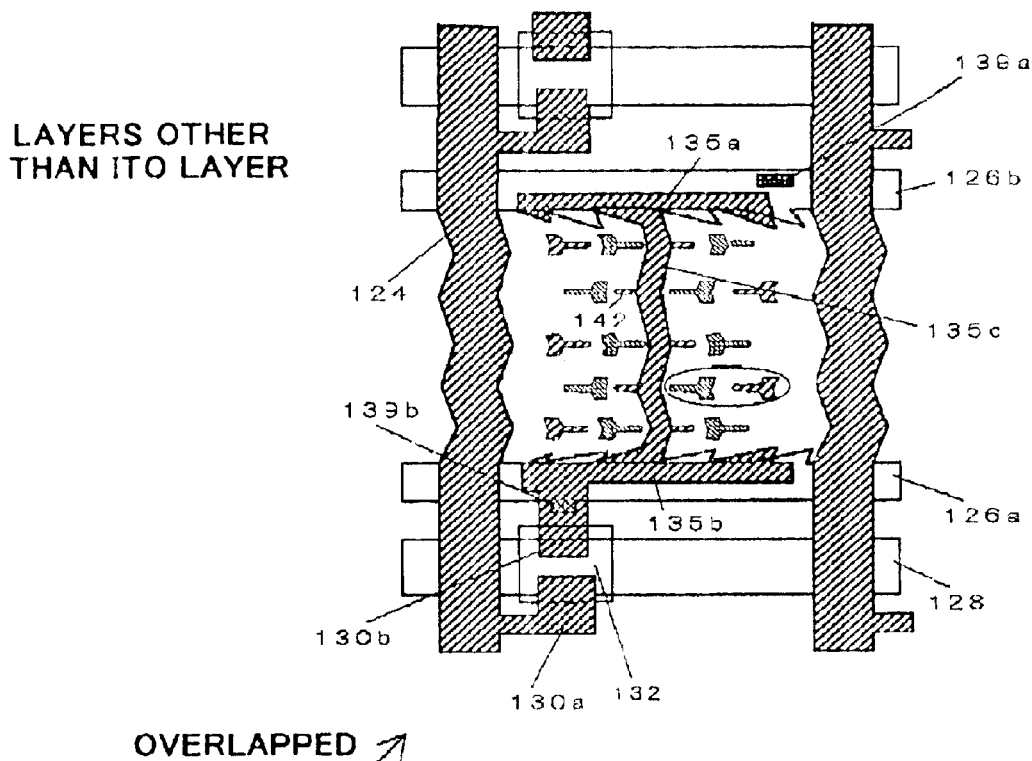
FIG. 62A is a plan view of the transparent electrodes illustrated in FIG. 60.
Figure 62B:
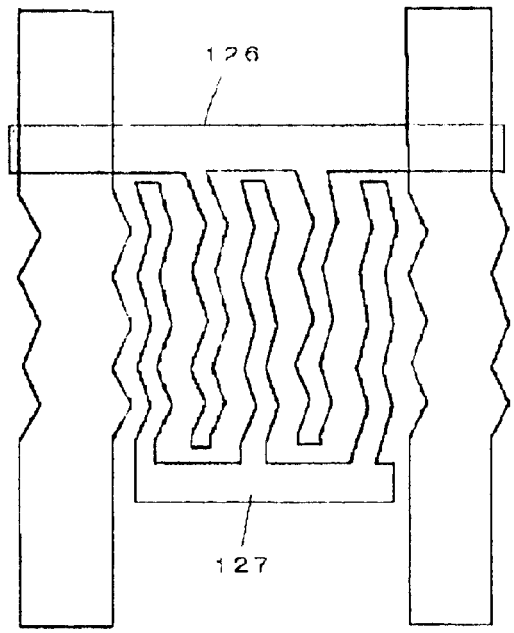
FIG. 62B is a plan view of the electrodes other than the transparent electrodes illustrated in FIG. 60.

FIG. 62B is a plan view of the ITO layer formed in the liquid crystal display device illustrated in FIG. 60, and FIG. 62A is a plan view of the layers other than the ITO layer, formed in the liquid crystal display device illustrated in FIG. 60. As illustrated in FIGS. 62A and 62B, the pixel auxiliary electrode 135 is comprised of a first portion 135*a* and a second portion 135*b* overlapping the common electrode lines 126*a* and 126*b* to thereby define a storage capacity between the first and second portions 135*a* and 135*b*, and the common electrode lines 126*a* and 126*b*, and a third portion 135c formed below the pixel electrode 127. The third portion 135c has a zigzag shape, and connects the first portion 135a and the second portion 135b to each other. The first portion 135a, the second portion 135b and the third portion 135c are arranged in the form of "I".

Similarly to the first embodiment, the pixel auxiliary electrodes 136a and 135b in the liquid crystal display device 100 may be designed to have such oblique edges in each of columns such that a relation among a rubbing direction or a liquid crystal alignment direction defined by rubbing and a direction of an electric field applied across the pixel electrode 127 (and the pixel auxiliary electrode 135 to which the same voltage as that of the pixel electrode 127 is applied) and the common electrode 126 (and the common electrode lines 126a and 126b to which the same voltage as that of the common electrode 126 is applied) is determined to ensure that the liquid crystal alignment direction would overlap the direction of the electric field, if the liquid crystal alignment direction were rotated in a clockwise direction by a certain acute angle, entirely in a display area surrounded by the pixel electrode 127 and the common electrode 126, in electrodes located adjacent to the pixel sub-area in which liquid crystal molecules are twisted in a clockwise direction, or such that the above-mentioned relation is determined to ensure that the liquid crystal alignment direction would overlap the direction of the electric field, if the liquid crystal alignment direction were rotated in a counter-clockwise direction by a certain acute angle, entirely in a display area surrounded by the pixel electrode 127 and the common electrode 126, in electrodes located adjacent to the pixel sub-area in which liquid crystal molecules are twisted in a counter-clockwise direction. This structure corresponds to the reverse-rotation preventing structure 36 having been explained in the first embodiment.

With reference to FIG. 62A, electrodes connected to summits of the inflections of the pixel auxiliary electrode 135c comprised of the second metal layer are comprised also of the second metal layer, and hence, are not floating electrodes. Such electrodes are called stabilization electrodes 142.

The stabilization electrodes 142 ensure that an electric field in each of the pixel sub-areas is stably directed to a direction in which liquid crystal molecules are twisted, which further ensures stable division of the pixel sub-areas.

In the liquid crystal display device illustrated in FIG. 60, the pixel auxiliary electrode 135 comprised of the second metal layer may be designed to include the stabilization electrodes 142 outwardly extending from summits of the inflections of the pixel auxiliary electrode 135 along a boundary between two pixel sub-areas in which liquid crystal molecules are rotated in opposite directions. The stabilization electrodes 142 are comprised of the second metal layer, and ensures stable rotation of liquid crystal molecules in each of pixel sub-areas.

The common auxiliary electrode comprised of the second metal layer also ensures stable rotation of liquid crystal molecules in each of pixel sub-areas.

Figure 42B:
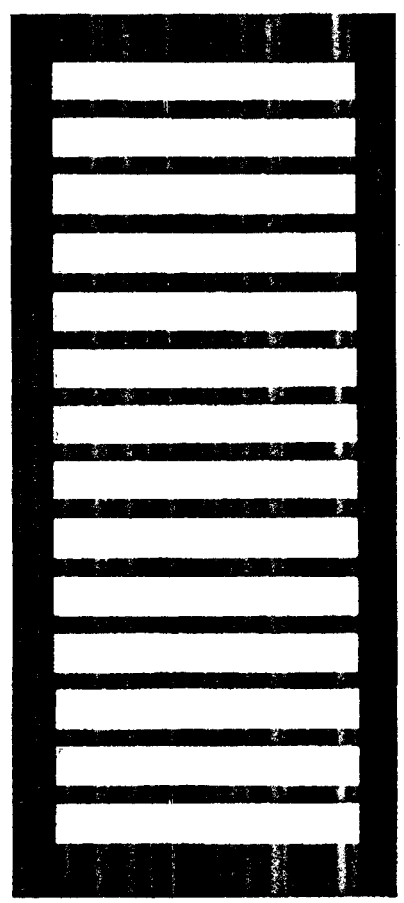
FIG. 42B shows another direction in which an opening extends.

The liquid crystal display device 100 in accordance with the fourth embodiment may be applied to a liquid crystal display device illustrated in FIG. 42B, that is, a liquid crystal display device in which an opening of the active device substrate extends in a direction perpendicular to a direction in which the data line 124 extends.

With respect to such a liquid crystal display device as illustrated in FIG. 42A, that is, a liquid crystal display device in which an opening of the active device substrate extends in the same direction as a direction in which the data line 124 extends, liquid crystal is vertically poured thereinto, whereas with respect to such a liquid crystal display device as illustrated in FIG. 42B, that is, a liquid crystal display device in which an opening of the active device substrate extends in a direction perpendicular to a direction in which the data line 124 extends, liquid crystal is horizontally poured thereinto. In the latter case, the data line 124 is formed to be linear, and a gate line defining a gate electrode is formed in a zigzag shape.

[Fifth Embodiment]

Figure 63A:
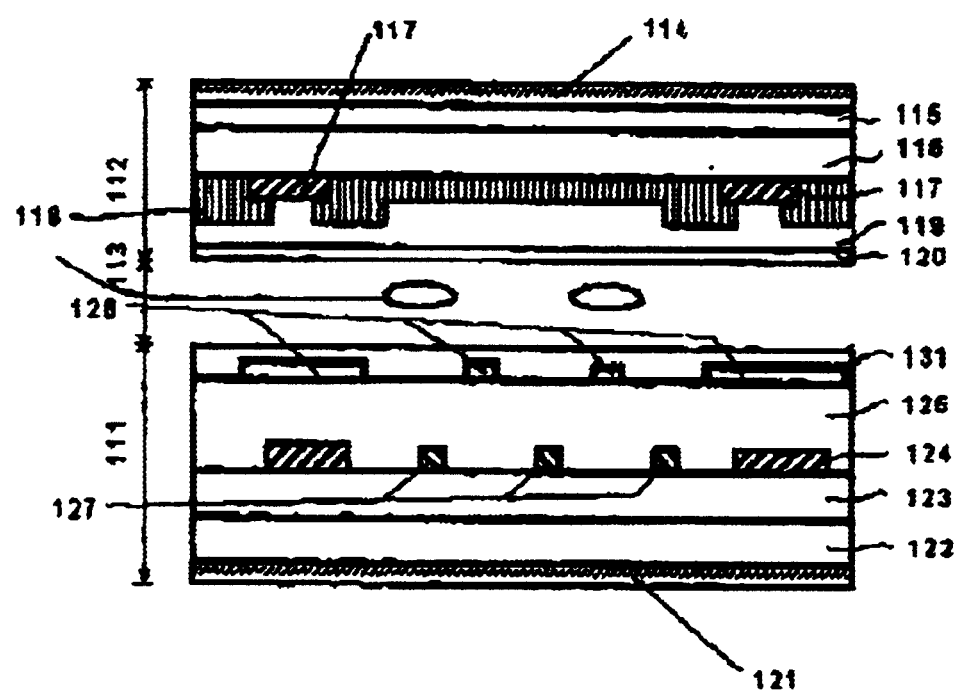
FIG. 63A is a partial cross-sectional view of the in-plane switching mode liquid crystal display device in accordance with the fifth embodiment.

FIG. 63A is a cross-sectional view of an in-plane switching mode active matrix type liquid crystal display device 180 in accordance with the fifth embodiment of the present invention, and corresponds to FIG. 41, that is, a cross-sectional view of the liquid crystal display device 100 in accordance with the third embodiment.

In the liquid crystal display device 100 in accordance with the third embodiment, the pixel electrode 127 as well as the common electrode 126 is formed on the second film 125b of the second interlayer insulating film 125.

In the liquid crystal display device 180 in accordance with the fifth embodiment, the pixel electrode 127 is formed of the second metal layer on the first interlayer insulating film 123, similarly to the liquid crystal display device 80 in accordance with the second embodiment. Since the pixel electrode 127 is comprised of the second metal layer, the liquid crystal display device 180 in accordance with the fifth embodiment has a smaller aperture ratio than the same in the liquid crystal display device 10 in accordance with the first embodiment. However, since the pixel electrode 127 is comprised of a layer different from a layer of which the common electrode 126 is formed, the pixel electrode 127 and the common electrode 126 would not be short-circuited each other, ensuring enhancement in a fabrication yield.

In addition, it is possible to form a storage capacity between the pixel electrode 127 comprised of the second metal layer and the common electrode lines 126a and 126b both comprised of the first metal layer. This ensures an increase in a total storage capacity of the liquid crystal layer 113, and stabilization in displaying images.

As mentioned earlier, the common electrode 126 may include stabilization electrodes extending outwardly from summits of the inflections of the common electrode 126 along a boundary between a pixel sub-area in which liquid crystal molecules are twisted in a clockwise direction and a pixel sub-area in which liquid crystal molecules are twisted in a counter-clockwise direction, in which case, the stabilization electrode may be comprised of the ITO layer of which the common electrode 126 is comprised. Similarly, the pixel electrode 127 may include stabilization electrodes extending outwardly from summits of the inflections of the pixel electrode 127 along a boundary between a pixel sub-area in which liquid crystal molecules are twisted in a clockwise direction and a pixel sub-area in which liquid crystal molecules are twisted in a counter-clockwise direction, in which case, the stabilization electrode may be comprised of the ITO layer of which the pixel electrode 127 is comprised. These stabilization electrodes ensure stabilization in rotation of liquid crystal molecules at the boundary of pixel sub-areas.

[Sixth Embodiment]

Figure 63B:
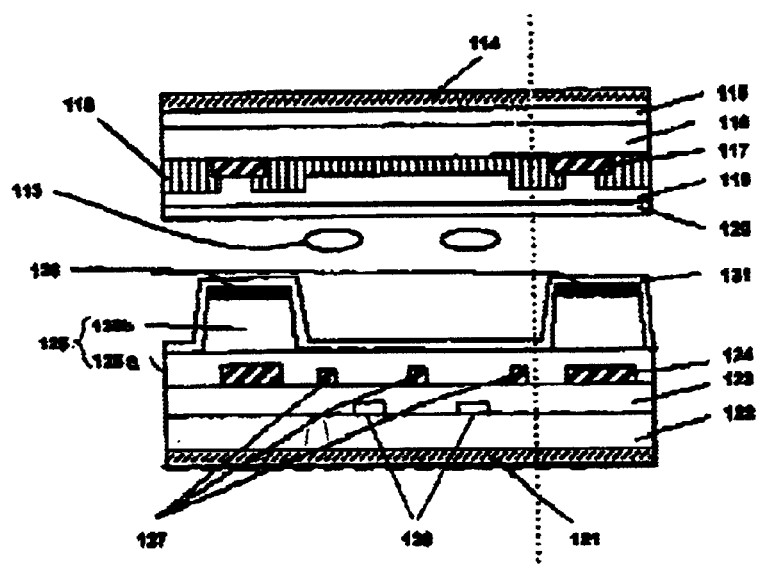
FIG. 63B is a partial cross-sectional view of the in-plane switching mode liquid crystal display device in accordance with the sixth embodiment.

FIG. 63B is a cross-sectional view of an in-plane switching mode active matrix type liquid crystal display device 185 in accordance with the sixth embodiment of the present invention, and corresponds to FIG. 41, that is, a cross-sectional view of the liquid crystal display device 100 in accordance with the third embodiment.

In the liquid crystal display device 100 in accordance with the third embodiment, the first film 125a which constitutes the second interlayer insulating film 125 together with the second film 125b is formed all over a pixel area. In contrast, the second film 125b may be formed only below the common electrode 126 overlapping the data line 124.

In a display area of a pixel, the common electrode 126 is comprised of the first metal layer of which the gate electrode is formed, in an area other than an area in which the common electrode 126 is composed of transparent metal, overlapping the data line 124.

In accordance with the sixth embodiment, it is no longer necessary to form the second film 125b in a large area more than necessary, and thereby, it would be possible to prevent an increase in a parasitic capacity between the common electrode 126 and the data line 124.

The pixel electrode 127 may be formed on the first interlayer insulating film 123 together with the data line 124.

Since the common electrode 126 is comprised of the first metal layer on the first interlayer insulating film 123 in an area other than an area in which the common electrode 126 is composed of a transparent metal film formed on the second film 125b, the in-plane switching mode liquid crystal display device 185 in accordance with the sixth embodiment has a smaller aperture ratio than that of the liquid crystal display device 100 in accordance with the fourth embodiment. However, since the common electrode 126 is comprised of a layer different from a layer of which the pixel electrode 127 is formed, the common electrode 126 and the pixel electrode 127 would not be short-circuited each other, ensuring enhancement in a fabrication yield.

The stabilization electrode to be formed between a pixel sub-area where liquid crystal molecules are twisted in a clockwise direction and a pixel sub-area where liquid crystal molecules are twisted in a counter-clockwise direction can be designed to extend outwardly from summits of the inflections of the pixel electrode 127 and the common electrode 126, similarly to the fifth embodiment, since the pixel electrode 127 is formed on a layer different from a layer on which the common electrode 126 is formed.

The in-plane switching mode active matrix type liquid crystal display device 185 in accordance with the sixth embodiment can increase an aperture ratio, similarly to the liquid crystal display device 10 in accordance with the first embodiment.

[Seventh Embodiment]

A liquid crystal display device in accordance with the seventh embodiment has the same structure as that of any one of the liquid crystal display devices in accordance with the first to sixth embodiments except that the liquid crystal display device in accordance with the seventh embodiment is designed not to include a color layer to be formed as a part of the opposing substrate. Hence, the seventh embodiment presents an in-plane switching mode active matrix type liquid crystal display device which displays images in black and white.

The liquid crystal display device in accordance with the seventh embodiment having the above-mentioned structure has a high light-use efficiency, ensuring high brightness at low power consumption.

[Eighth Embodiment]

In the above-mentioned first to seventh embodiments, the color layer and the black matrix layer are formed as parts of the opposing substrate. In an in-plane switching mode active matrix type liquid crystal display device in accordance with the eighth embodiment, a color layer, a black matrix layer, or both a color layer and a black matrix layer is(are) not formed as a part of an opposing substrate, but formed as a part of an active device substrate.

By forming a color layer, a black matrix layer, or both a color layer and a black matrix layer as a part of an active device substrate, it would be possible to increase an accuracy in registration between those layers and parts having been already formed in the active device substrate, such as the data line, which ensures that a width of the black matrix layer and other layers can be reduced, and an aperture ratio can be further enhanced.

In the first, second, fourth or fifth embodiment, a color layer and/or a black matrix layer formed as a part of the active device substrate may be covered with an organic film constituting the second interlayer insulating film. The organic film would prevent impurities contained in a color layer and/or a black matrix layer formed in the active device substrate, from eluting into the liquid crystal layer, ensuring enhancement in reliability.

In the first, second, fourth or fifth embodiment, when the second interlayer insulating film is comprised of a first film comprised of an inorganic film and a second film comprised of an organic film, a color layer and/or a black matrix layer may be sandwiched between the first and second films. The organic film would prevent impurities contained in a color layer and/or a black matrix layer formed in the active device substrate, from eluting into the liquid crystal layer, and further prevent the active device substrate from being influenced by movement of electric charges and/or ions in the color layer, ensuring enhancement in reliability.

Figure 65:
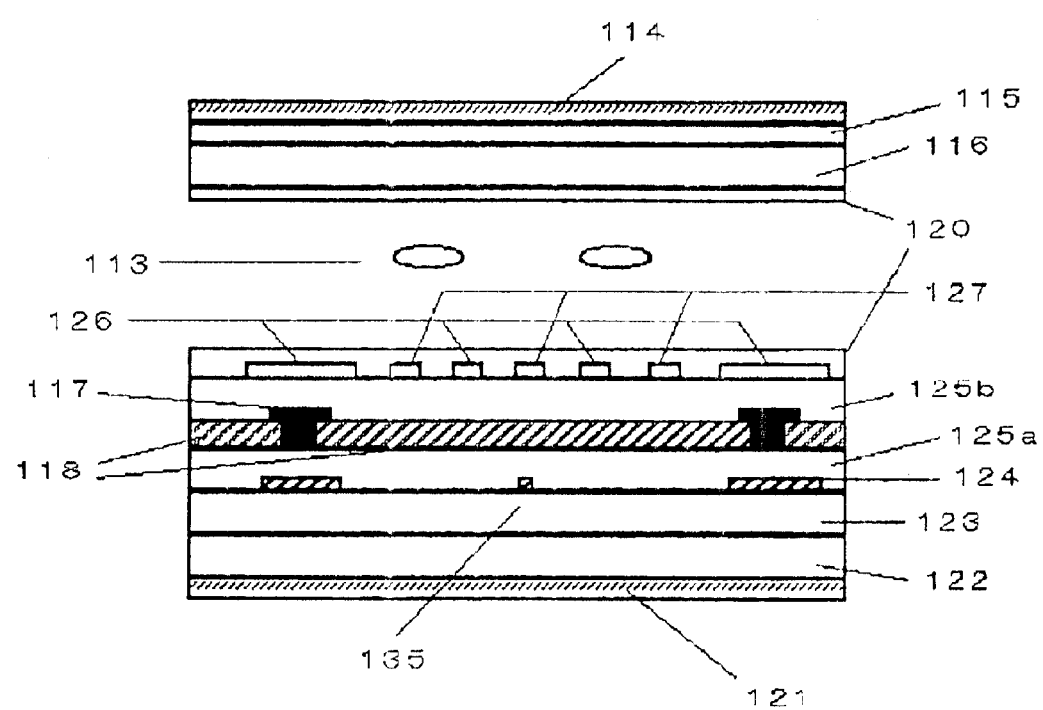
FIG. 65 is a cross-sectional view taken along the line XXXXXX V—XXXXXX V in FIG. 64.

FIGS. 64 and 65 illustrate the in-plane switching mode active matrix type liquid crystal display device in accordance with the eighth embodiment, which corresponds to the liquid crystal display device 100 in accordance with the fourth embodiment, illustrated in FIGS. 40 and 41, and in which the second interlayer insulating film 125 is comprised of the first film 125a comprised of an inorganic film and the second film 125b comprised of an organic film, and the color layer 118 and the black matrix layer 117 are sandwiched between the first film 125a and the second film 125b. FIG. 64 is a plan view of the liquid crystal display device in accordance with the eighth embodiment, and FIG. 65 is a cross-sectional view taken along the line XXXXXX V—XXXXXX V in FIG. 64.

[Ninth Embodiment]

The liquid crystal display device 10 in accordance with the first embodiment, the liquid crystal display device 80 in accordance with the second embodiment, the liquid crystal display device 85 in accordance with the third embodiment, the liquid crystal display device 100 in accordance with the fourth embodiment, the liquid crystal display device 180 in accordance with the fifth embodiment, the liquid crystal display device 185 in accordance with the sixth embodiment, the liquid crystal display device in accordance with the seventh embodiment or the liquid crystal display device in accordance with the eighth embodiment may be applied an electronic device. Hereinbelow, some examples are explained.

Figure 66:
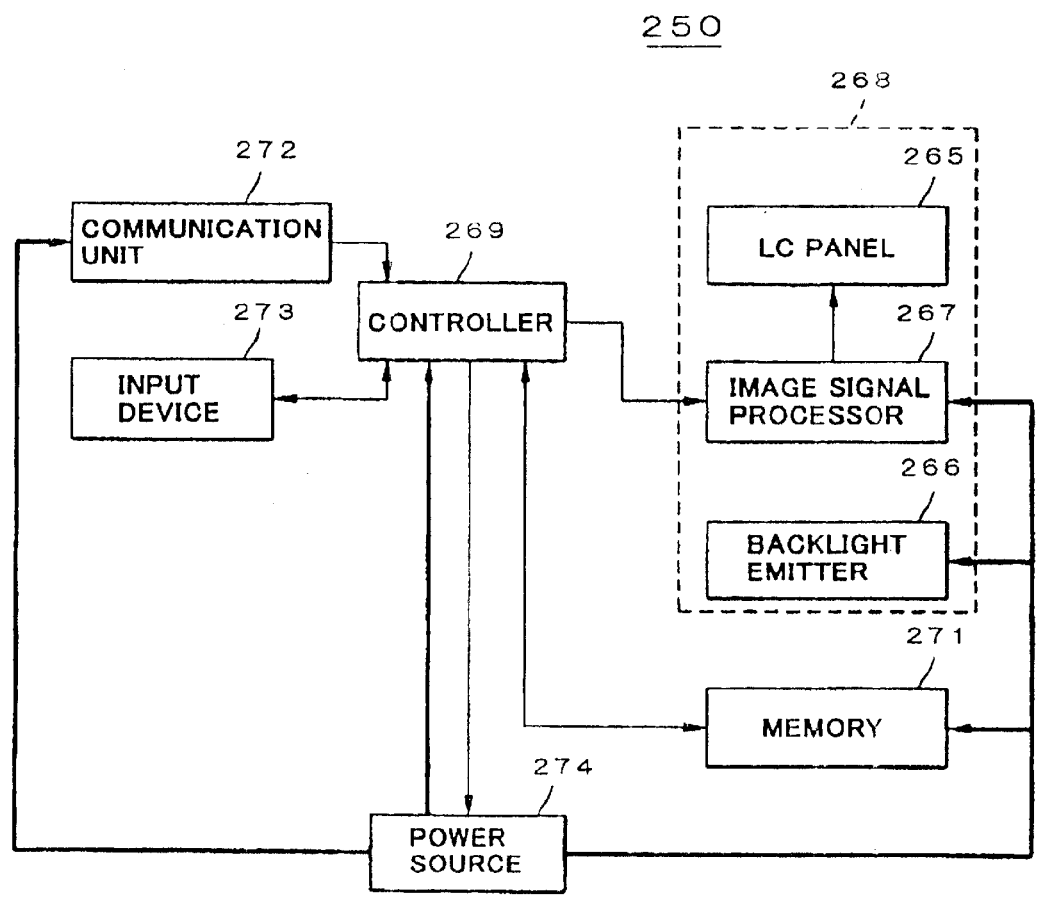
FIG. 66 is a block diagram of a first example of an electronic device to which the in-plane switching mode liquid crystal display device in accordance with one of the first to sixth embodiments is applied.

FIG. 66 is a block diagram of a portable communication device 250 to which one of the liquid crystal display devices 10, 80, 85, 100, 180 and 185 is applied. In the portable communication device 250, the liquid crystal display devices 10, 80, 85, 100, 180 or 185, the liquid crystal display device in accordance with the seventh embodiment or the liquid crystal display device in accordance with the eighth embodiment is used as a part of a later mentioned liquid crystal panel 265.

The portable communication terminal 250 is comprised of a display unit 268 including a liquid crystal panel 265, a backlight emitter 266, and an image signal processor 267, a controller 269 controlling operation of the parts constituting the portable communication terminal 250, a memory 271 storing a program to be executed by the controller 269 and various data, a communication unit 272 which makes data communication, an input device 273 comprised of a By keyboard or a pointer, and a power source 274 supplying power to the above-mentioned parts constituting the portable communication terminal 250.

The liquid crystal panel 265 including the liquid crystal display device in accordance with one of the above-mentioned embodiments enhances an aperture ratio in the display unit 268, and further enhances a brightness in the display unit 268.

The liquid crystal panel 265 including the liquid crystal display device 10, 80, 85, 100, 180 or 185 may be applied to a monitor of a portable personal computer, a note type personal computer, or a desktop type personal computer.

Figure 67:
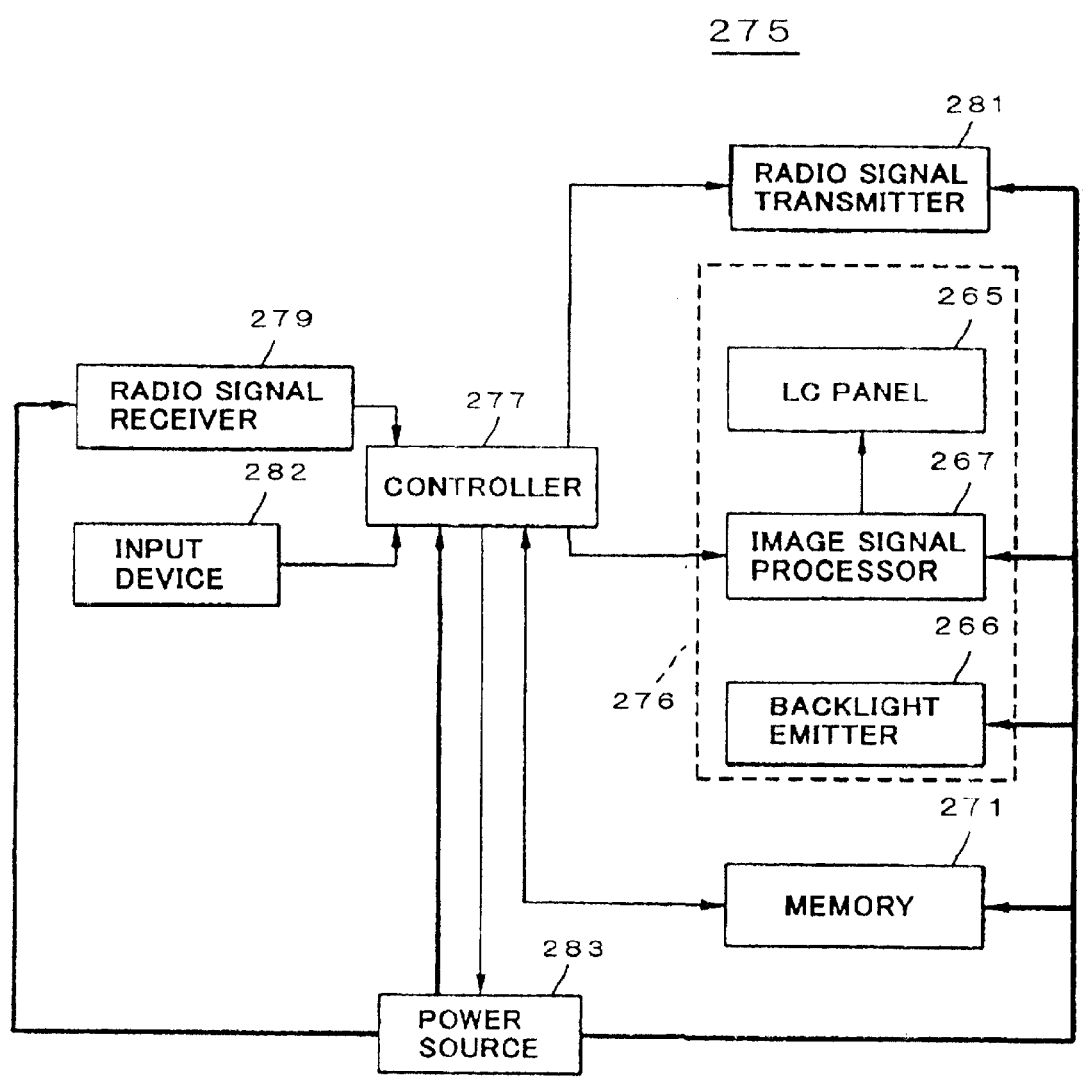
FIG. 67 is a block diagram of a second example of an electronic device to which the in-plane switching mode liquid crystal display device in accordance with one of the first to sixth embodiments is applied.

FIG. 67 is a block diagram of a cellular phone 275 to which one of the liquid crystal display devices 10, 80, 85, 100, 180 and 185 is applied.

The cellular phone 275 is comprised of a display unit 276 including a liquid crystal panel 265, a backlight emitter 266, and an image signal processor 267, a controller 277 controlling operation of the parts constituting the cellular phone 275, a memory 278 storing a program to be executed by the controller 277 and various data, a radio signal receiver 279, a radio signal transmitter 281, an input device 282 comprised of a keyboard or a pointer, and a power source 283 supplying power to the above-mentioned parts constituting the cellular phone 275.

The liquid crystal panel 265 including the liquid crystal display device in accordance with one of the above-mentioned embodiments enhances an aperture ratio in the display unit 276, and further enhances a brightness in the display unit 276.

In the above-mentioned first to ninth embodiments, the parts by which the present invention is characterized are mainly explained, and parts known to those skilled in the art are not explained in detail. However, it should be noted that the latter can be readily understood to those skilled in the art without detailed explanation.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Applications Nos. 2001-048473 and 2001-350620 filed on Feb. 23, 2001 and Nov. 15, 2001, respectively, including specification, claims, drawings and summary is incorporated herein by reference in its entirety.

What is claimed is:

1. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, wherein said data lines, said common electrode and said pixel electrode are bent by an odd number equal to or greater than 3 in each of pixels.

2. An in-plane switching mode active matrix type liquid crystal display device comprising:

a first substrate;

a second substrate located opposing said first substrate; and a liquid crystal layer sandwiched between said first and second substrates, wherein said first substrate includes;

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning lines, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, wherein said data lines, said common electrode and said pixel electrode are bent by N in each of pixels, said N being defined in accordance with the equation (A):

$$30[\mu m] \leq L(N+1)[\mu m] \leq 40[\mu m] \tag{A}$$

wherein L indicates a length of an opening.

3. An in-plane switching mode active matrix type liquid crystal display device comprising:

a first substrate;

a second substrate located opposing said first substrate; and a liquid crystal layer sandwiched between said first and second substrates, wherein said first substrate includes:

thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically, connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and the said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, wherein a distance along a substrate between one of ends of said black matrix layer facing said data lines and an end of said data lines, located opposite to said one of ends of said black matrix layer, is equal to or greater than 4 μm in a cross-section taken along a plane perpendicular to a direction in which said data lines extend.

4. An in-plane switching mode active matrix type liquid crystal display device comprising:

a first substrate;

a second substrate located opposing said first substrate; and a liquid crystal layer sandwiched between said first and second substrates, wherein said first substrate includes;

a thin film transistor having gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching made active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layer, said black matrix layer or said multi-layered color layers has a width smaller than a width of said common electrode overlapping said data lines, said data lines extend in a zigzag along said pixel electrode, wherein said black matrix layer facing said data lines is bent in line with said data lines, and wherein a distance along a substrate between one of ends of said black matrix layer facing said data lines and an end of said data lines, located opposite to said one of ends of said black matrix layer, is equal to or greater than 4 μm in a cross-section taken along a plane perpendicular to a direction in which said data lines extend.

5. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

date lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning lines, said in-plane switching mode active matrix type liquid crystal display device further includes a light-impermeable layer in an area where said common electrode entirely overlaps the date lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, wherein said black matrix layer is formed on said second substrate, and said black matrix layer facing said data lines overlaps said data lines anywhere by 4 $\mu$m or greater, when viewed from above.

6. An in-plane switching mode active matrix type liquid crystal display device comprising:

a first substrate;

a second substrate located on opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag alone said pixel electrode, wherein said black matrix layer facing said data lines is formed in zigzag, and wherein said black matrix layer is formed on said second substrate, and said black matrix layer facing said data lines overlaps said data lines anywhere by 4 $\mu$m or greater, when viewed from above.

7. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a that rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, further comprising a reverse-rotation preventing structure in a first pixel area in which all liquid crystal molecules are rotated in the same direction, for preventing liquid crystal molecules from rotating in a direction opposite to said same direction, said reverse-rotation preventing structure including an auxiliary electrode to which a voltage equal to a voltage of at least one of said pixel electrode and said common electrode is applied such that an initial alignment orientation of liquid crystal molecules overlaps a direction of an electric field generated in said first pixel area in all areas in said pixel areas, if said initial alignment orientation rotates by an acute angle.

8. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlays said data lines with an insulating layer being sandwiched therebetween except an area where said data lines are located in the vicinity of said scanning line, said in-plane switching mode active matrix type liquid crystal display device further includes a light-permeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, further comprising an isolated floating electrode composed of a layer of which both said gate electrode and said drain electrode are composed, said isolated floating electrode overlapping said common or pixel electrode at bending portions of said zigzag-shaped common or pixel electrode with said insulating layer being sandwiched therebetween, and having an extension extending in a direction in which said bending portions project, along an boundary between said first and second sub pixel areas.

9. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, wherein said zigzag-shaped data lines include linear portions inclining towards the left and right from a direction in which said data lines extend, and wherein said black matrix layer is formed on said second substrate, and said black matrix layer facing said data lines and formed in a line has a width greater anywhere than a minimum width Dmin defined by the following equation:

$$Dmin \approx D + LS \times \tan\theta - (D-8) \times 2 [\mu m]$$

wherein D indicates a width of said data lines, LS indicates a length obtained when said linear portions are projected towards said direction in which said data lines extend, and θ indicates an angle formed between said direction in which said data lines extend and said linear portions.

10. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric field, almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning lines, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag alone said pixel electrode, wherein said zigzag-shaped data lines includes first linear portions extending in parallel with a direction in which said data lines extend, and second linear portions inclining towards the left and right from said direction in which said data lines extend, and wherein said black matrix layer is formed on said second substrate, and said black matrix layer facing said data lines and formed in a line has a width greater anywhere than a minimum width Dmin defined by the following equation:

$$Dmin \approx D + LS \times \tan\theta - (D-8) \times 2 [\mu m]$$

wherein D indicates a width of said data lines, LS indicates a length obtained when said second linear portions are projected towards said direction in which said data lines extend, and θ indicates an angle formed between said direction in which said data lines extend and said second linear portions.

11. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, wherein said zigzag-shaped data lines include linear portions inclining towards the left and right from a distance in which said data lines extend, and further comprising a floating light-impermeable film composed of opaque metal, said floating light-impermeable film overlapping said data lines at recessions of bending portions of said data lines.

12. An in-plane switching mode active matrix type liquid crystal display device comprising:

a first substrate;

a second substrate located opposing said first substrate; and a liquid crystal layer sandwiched between said first and second substrates, wherein said first substrate includes;

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag alone said pixel electrode, further comprising a projection projecting from a bending portion of each of said zigzag-shaped common electrode overlapping said zigzag-shaped data lines.

13. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, wherein said common electrode is wider than said data lines at opposite ends in a width-wise direction thereof by 1.5 $\mu$m or greater.

14. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix lever or multi-layered color layers, said black matrix layer or said multi-layered color layers has a width smaller than a width of said common electrode overlapping said data lines, said data lines extend in a zigzag along said pixel electrode, wherein said black matrix layer has a width smaller than a width of said data lines, and overlaps said data lines in its entire length.

15. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied; data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a, width of said common electrode overlapping said data lines, said data lines extend in a zigzag along said pixel electrode, further comprising an interlayer insulating layer formed in a layer located immediately below said common electrode, and a pixel auxiliary electrode comprised of a single or a plurality of layer(s) formed below said interlayer insulating layer, said pixel auxiliary electrode being electrically connected to said source electrode, and being kept at a voltage equal to a voltage of said pixel electrode, said pixel auxiliary electrode being composed of opaque metal.

16. The in-plane switching mode active matrix type liquid crystal display device as set forth in claim 15, wherein said pixel auxiliary electrode is at least partially formed below said pixel electrode formed in a layer in which said common electrode is formed, and having a plurality of comb-teeth.

17. The in-plane switching mode active matrix type liquid crystal display device as set forth in claim 16, further comprising a reverse-rotation preventing structure in a first pixel area in which all liquid crystal molecules are rotated in the same direction, for preventing liquid crystal molecules from rotating in a direction opposite to said same direction,
at least a part of edges of said pixel auxiliary electrodes and said common electrode lines being formed oblique such that an initial alignment orientation of liquid crystal molecules overlaps a direction of an electric field generated in said first pixel area in all areas in said pixel areas, if said initial alignment orientation rotates by an acute angle.

18. The in-plane switching mode active matrix type liquid crystal display device as set forth in claim 16, wherein said zigzag-shaped common and pixel electrodes define a first pixel area in which liquid crystal molecules rotate in two directions in a pixel,
some of said pixel auxiliary electrodes having a projection projecting from a bending portion of each of said zigzag-shaped pixel electrode and in a direction in which said bending portion projects, along a boundary between two different pixel areas in which liquid crystal molecules rotate in different directions.

19. The in-plane switching mode active matrix type liquid crystal display device as set forth in claim 15, wherein a storage capacity is formed between said common electrode lines comprised of a first metal layer of which said gate electrode is formed, and a pixel auxiliary electrode comprised of a second metal layer of which said drain electrode is formed.

20. An in-plane switching mode active matrix type liquid crystal display device comprising:
a first substrate;
a second substrate located opposing said first substrate; and
a liquid crystal layer sandwiched between said first and second substrates,
wherein said first substrate includes:
a thin film transistor having a rate electrode, a drain electrode and a source electrode;
a pixel electrode each associated to a pixel to be driven;
a common electrode to which a reference voltage is applied;
data lines;
a scanning line; and
common electrode lines,
said gate electrode is electrically connected to said scanning line, said drain electrode is electrically connected to said data lines, said source electrode is electrically connected to said pixel electrode, and said common electrode is electrically connected to said common electrode lines,
said pixel electrode is in a zigzag form and almost equally spaced away from adjacent ones,
said common electrode is in a zigzag form and almost equally spaced away from adjacent ones,
two-directional electric fields almost parallel with a surface of said first substrate are applied across said pixel electrode and said common electrode,
said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate,
said common electrode is composed of transparent material, and is formed on a layer located closer to said liquid crystal layer than said data lines,
said common electrode entirely overlaps said data lines with an insulating layer being sandwiched therebetween except an area where said data lines are located in the vicinity of said scanning line,
said in-plane switching mode active matrix type liquid crystal display device further includes a light-impermeable layer in an area where said common electrode entirely overlaps the data lines,
said light-impermeable layer is formed on said second substrate or on said first substrate such that said light-impermeable layer and said liquid crystal layer are located at the same side with respect to said data lines and that said light-impermeable layer faces said data lines,
said light-impermeable layer is comprised of a black matrix layer or multi-layered color layers,
said black matrix layer or said multi-layered color layers has a width smaller than a width of said common electrode overlapping said data lines,
said data lines extend in a zigzag alone said pixel electrode,
further comprising an interlayer insulating layer formed in a layer located immediately below said common electrode, and a common auxiliary electrode comprised of a single or a plurality of layer(s) formed below said interlayer insulating layer,
said common auxiliary electrode being electrically connected to said common electrode lines, and being kept at a voltage equal to a voltage of said common electrode,
said common auxiliary electrode being composed of opaque metal.

21. An in-plane switching mode active matrix type liquid crystal display device comprising:
a first substrate;
a second substrate located opposing said first substrate; and
a liquid crystal layer sandwiched between said first and second substrates,
wherein said first substrate includes;
a thin film transistor having a gate electrode, a drain electrode and a source electrode;
a pixel electrode each associated to a pixel to be driven;
a common electrode to which a reference voltage is applied;
data lines;
a scanning line; and
common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, wherein said common auxiliary electrode is formed below said common electrode having a plurality of comb-teeth.

22. The in-plane switching mode active matrix type liquid crystal display device as set forth in claim 21, wherein said zigzag-shaped common and pixel electrodes define a first pixel area in which liquid crystal molecules rotate in two directions in a pixel, some of said common auxiliary electrodes having a projection projecting from a bending portion of each of said zigzag-shaped common electrode, in a direction in which said bending portion projects, along a boundary between two different pixel areas in which liquid crystal molecules rotate in different directions, for stabilizing rotation of said liquid crystal molecules between said two different pixel areas.

23. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layer, said black matrix layer or said multi-layered color layers has a width smaller than a width of said common electrode overlapping said data lines, said data lines extend in a zigzag along said pixel electrode, wherein said pixel electrode is formed of a second metal layer of which said data lines are formed, and wherein said pixel electrode is formed of a second metal layer of which said drain electrode is formed, in an area in which an image is displayed, and a portion of said common electrode other than a portion composed of transparent metal and overlapping said data lines is formed of a first metal layer of which said gate electrode is formed.

24. The in-plane switching mode active matrix type liquid crystal display device as set forth in claim 23, further comprising an interlayer insulating film sandwiched between said data lines and said common electrode overlapping said data lines and composed of transparent metal, said interlayer insulating film being formed only below said common electrode.

25. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, further comprising an interlayer insulating film sandwiched between said data lines and said common electrode overlapping said data lines and composed of transparent metal, said interlayer insulating film being comprised of a first film comprised of an inorganic film and a second film comprised of an organic film and covering said first film therewith.

26. The in-plane switching mode active matrix type liquid crystal display device as set forth in claim 25, further comprising an interlayer insulating film formed between said data lines and said common electrode, said interlayer insulating film being comprised of a first film comprised of an inorganic film, and a second film covering said first film therewith and comprised of an organic film, said first film having a thickness equal to or greater than 0.25 $\mu$m.

27. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, wherein said pixel electrode is formed of a second metal layer of which said data lines are formed, and wherein a storage capacity is formed between said pixel electrode comprised of said second metal layer of which said drain electrode is formed, and said common electrode lines comprised of said first metal layer of which said gate electrode is formed.

28. An in-plane switching mode active matrix type liquid crystal display device comprising:

a first substrate;

a second substrate located opposing said first substrate; and a liquid crystal layer sandwiched between said first and second substrates, wherein said first substrate includes:

a thin film transistor having a gate electrode, a drain electrode and a source electrode;

a pixel electrode each associated to a pixel to be driven;

a common electrode to which a reference voltage is applied;

data lines;

a scanning line; and common electrode lines, said gate electrode is electrically connected to said scanning line, said drain electrode is electrically connected to said data lines, said source electrode is electrically connected to said pixel electrode, and said common electrode is electrically connected to said common electrode lines, said pixel electrode is in a zigzag form and almost equally spaced away from adjacent ones, said common electrode is in a zigzag form and almost equally spaced away from adjacent ones, two-directional electric fields almost parallel with a surface of said first substrate are applied across said pixel electrode and said common electrode, said in-plane switching mode active matrix type liquid crystal display device includes a first pixel area to which an electric field having a first direction is applied and in which molecular axes of liquid crystal in said liquid crystal layer are rotated in a first rotational direction in a plane parallel with a surface of said first substrate, and a second pixel area to which an electric field having a second direction is applied and in which said molecular axes are rotated in a second rotational direction which is different from said first rotational direction, in a plane parallel with a surface of said first substrate, said common electrode is composed of transparent material, and is formed on a layer located closer to said liquid crystal layer than said data lines, said common electrode entirely overlaps said data lines with an insulating layer being sandwiched therebetween except an area where said data lines are located in the vicinity of said scanning line, said in-plane switching mode active matrix type liquid crystal display device further includes a light-impermeable layer in an area where said common electrode entirely overlaps the data lines, said light-impermeable layer is formed on said second substrate or on said first substrate such that said light-impermeable layer and said liquid crystal layer are located at the same side with respect to said data lines and that said light-impermeable layer faces said data lines, said light-impermeable layer is comprised of a black matrix layer or multi-layered color layers, said black matrix layer or said multi-layered color layers has a width smaller than a width of said common electrode overlapping said data lines, said data lines extend in a zigzag along said pixel electrode, wherein said pixel electrode is formed of a second metal layer of which said data lines are formed, and wherein said zigzag-shaped common and pixel electrodes define a first pixel area in which liquid crystal molecules are rotated in two directions in a pixel, and some of at least one of said common and pixel electrodes have a projection projecting from a bending portion of each of said zigzag-shaped common electrode, in a direction in which said bending portion projects, along a boundary between two different pixel areas in which liquid crystal molecules rotate in different directions, for stabilizing rotation of said liquid crystal molecules between said two different pixel areas.

* * * * *

UNITED STATES PATENT AND TRADEMARK OFFICE
CERTIFICATE OF CORRECTION

PATENT NO.       : 6,924,863 B2                                          Page 1 of 1
APPLICATION NO. : 10/081800
DATED            : August 2, 2005
INVENTOR(S)      : Nishida et al.

It is certified that error appears in the above-identified patent and that said Letters Patent is hereby corrected as shown below:

Claim 2, Column 62, Line 5, "30 [μm] $\leq$ L(N+1) [μm] $\leq$ 40[μm]" should be --30 [μm] $\leq$ L/(N+1) [μm] $\leq$ 40 [μm]--.

Claim 7, Col. 66, line 48, "pixel electrode" should be --a pixel electrode--.

Claim 10, Col. 70, line 43, "field," should be --fields--.

Claim 10, Col. 70, line 52, "substrate" should be --first substrate--.

Claim 10, Col. 71, line 14, "alone" should be --along--.

Signed and Sealed this

Twenty-ninth Day of August, 2006

JON W. DUDAS
*Director of the United States Patent and Trademark Office*